(12) United States Patent
Crohn

(10) Patent No.: US 7,114,154 B1
(45) Date of Patent: Sep. 26, 2006

(54) AUTOMATING TIME SEQUENCED TASKS

(76) Inventor: Mark Ira Crohn, 109 2nd St. S., #429, Kirkland, WA (US) 98033

( * ) Notice: Subject to any disclaimer, the term of this patent is extended or adjusted under 35 U.S.C. 154(b) by 955 days.

(21) Appl. No.: 09/625,774

(22) Filed: Jul. 26, 2000

Related U.S. Application Data

(60) Provisional application No. 60/145,633, filed on Jul. 26, 1999.

(51) Int. Cl.
 G06F 9/46 (2006.01)
 G06F 9/44 (2006.01)
 G06F 17/00 (2006.01)
 G06F 3/00 (2006.01)
 G05B 19/418 (2006.01)
 G09G 5/08 (2006.01)
 G06F 7/00 (2006.01)

(52) U.S. Cl. .............. 718/100; 705/7; 705/8; 705/9; 715/709; 715/751; 715/790; 715/810; 345/163; 707/102

(58) Field of Classification Search .......... 709/100, 709/101, 102; 718/100–108; 715/709–810; 705/7–9; 707/102; 345/163
See application file for complete search history.

(56) References Cited

U.S. PATENT DOCUMENTS

| | | | | |
|---|---|---|---|---|
| 4,931,783 | A * | 6/1990 | Atkinson | 345/163 |
| 5,369,570 | A * | 11/1994 | Parad | 705/8 |
| 5,479,343 | A * | 12/1995 | Matoba et al. | 700/106 |
| 5,530,861 | A * | 6/1996 | Diamant et al. | 705/8 |
| 5,557,747 | A * | 9/1996 | Rogers et al. | 709/223 |
| 5,596,750 | A * | 1/1997 | Li et al. | 718/101 |
| 5,678,002 | A * | 10/1997 | Fawcett et al. | 715/709 |
| 5,748,930 | A * | 5/1998 | Prakash | 715/751 |
| 5,898,434 | A * | 4/1999 | Small et al. | 715/810 |
| 6,086,630 | A * | 7/2000 | Williams et al. | 716/15 |
| 6,101,481 | A * | 8/2000 | Miller | 705/9 |
| 6,240,421 | B1 * | 5/2001 | Stolarz | 707/102 |
| 6,249,769 | B1 * | 6/2001 | Ruffin et al. | 705/7 |
| 6,263,358 | B1 * | 7/2001 | Lee et al. | 718/100 |
| 6,549,944 | B1 * | 4/2003 | Weinberg et al. | 709/224 |
| 6,658,586 | B1 * | 12/2003 | Levi | 714/4 |
| 6,750,858 | B1 * | 6/2004 | Rosenstein | 715/790 |

OTHER PUBLICATIONS

Tim Pyron, "Using Microsoft Project 98", 1997, Que, Special Edition, pp. 201-203, 209, 406, 450, 748, 800-801, 902, 943.*

(Continued)

*Primary Examiner*—Meng-Al T. An
*Assistant Examiner*—Jennifer N. To
(74) *Attorney, Agent, or Firm*—Mark I. Crohn

(57) ABSTRACT

Methods and systems are provided to develop and use complex automated tasks sequences. The tasks sequences are assembled graphically by assigning Actions to Action-Dates. An Action is a component that performs a specific task such as preparing a document or making a database entry. An ActionDate includes the date on which an Action is to be performed. Actions and ActionDates may be grouped using an ActionList. Graphic representations of these ActionList can be added to ActionDates so that groups of tasks and the dates on which they are to be performed can be added to the task sequence for activities that are repeated at different points in the task list. The dates set in the ActionDate are computed and set dynamically from the ActionDate's relationship with other ActionDates in the task sequence. Once the task sequence is graphically assembled, instances of it are used to automatically perform the task sequence. Generally, the automated task sequence is displayed as an automated checklist with which as user can interact.

21 Claims, 60 Drawing Sheets

OTHER PUBLICATIONS

Lau et al., "Development of an Intelligent Task Management System in a Manufacturing Information Network", 1998, Elsevier Science Ltd., Expert Systems With Applications, pp. 165-179.*

Gelinas, "The Just-In-Time Implementation Project", 1998, International Journal of Project Management vol. 17, No. 3, pp. 171-179.*

* cited by examiner

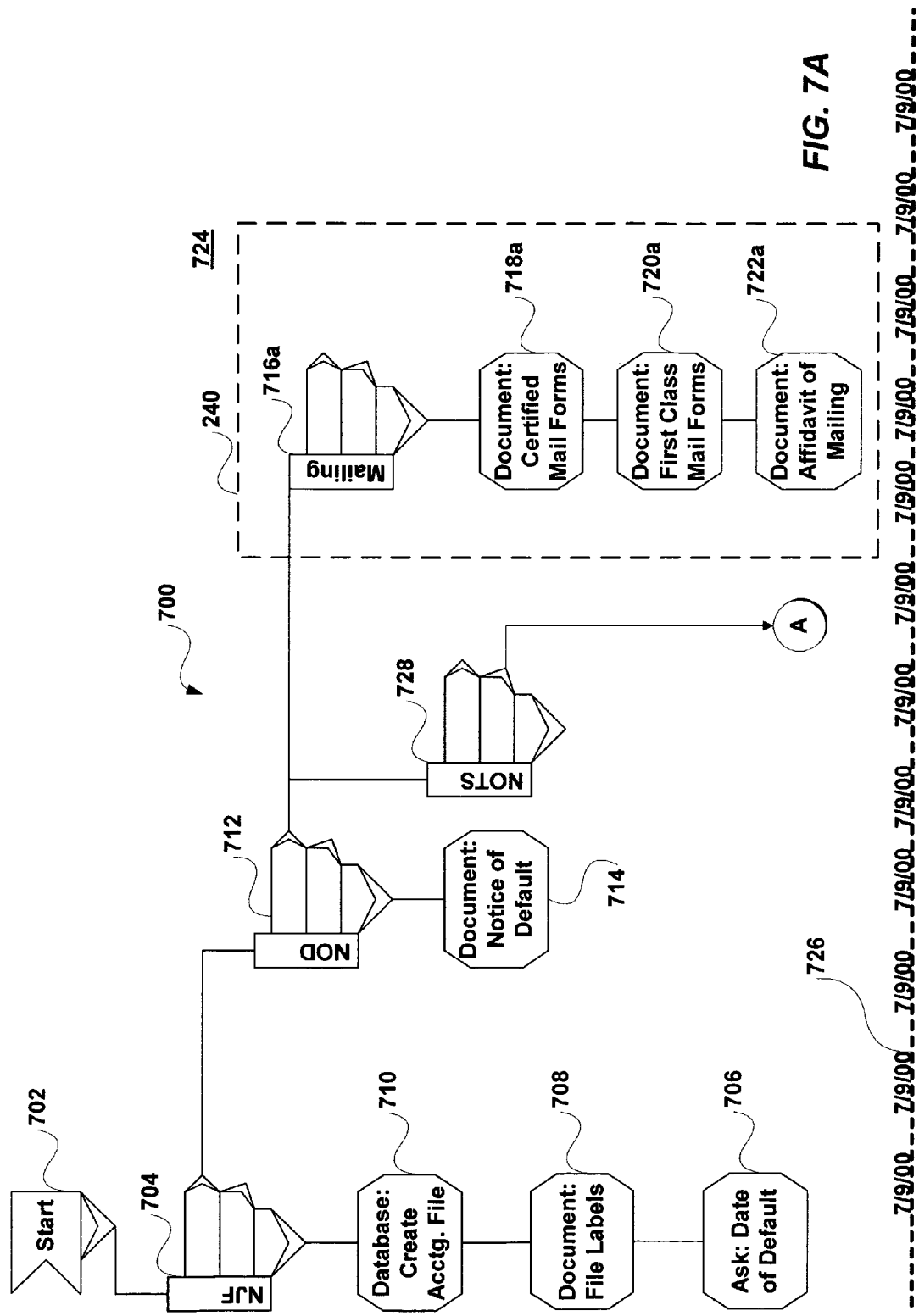

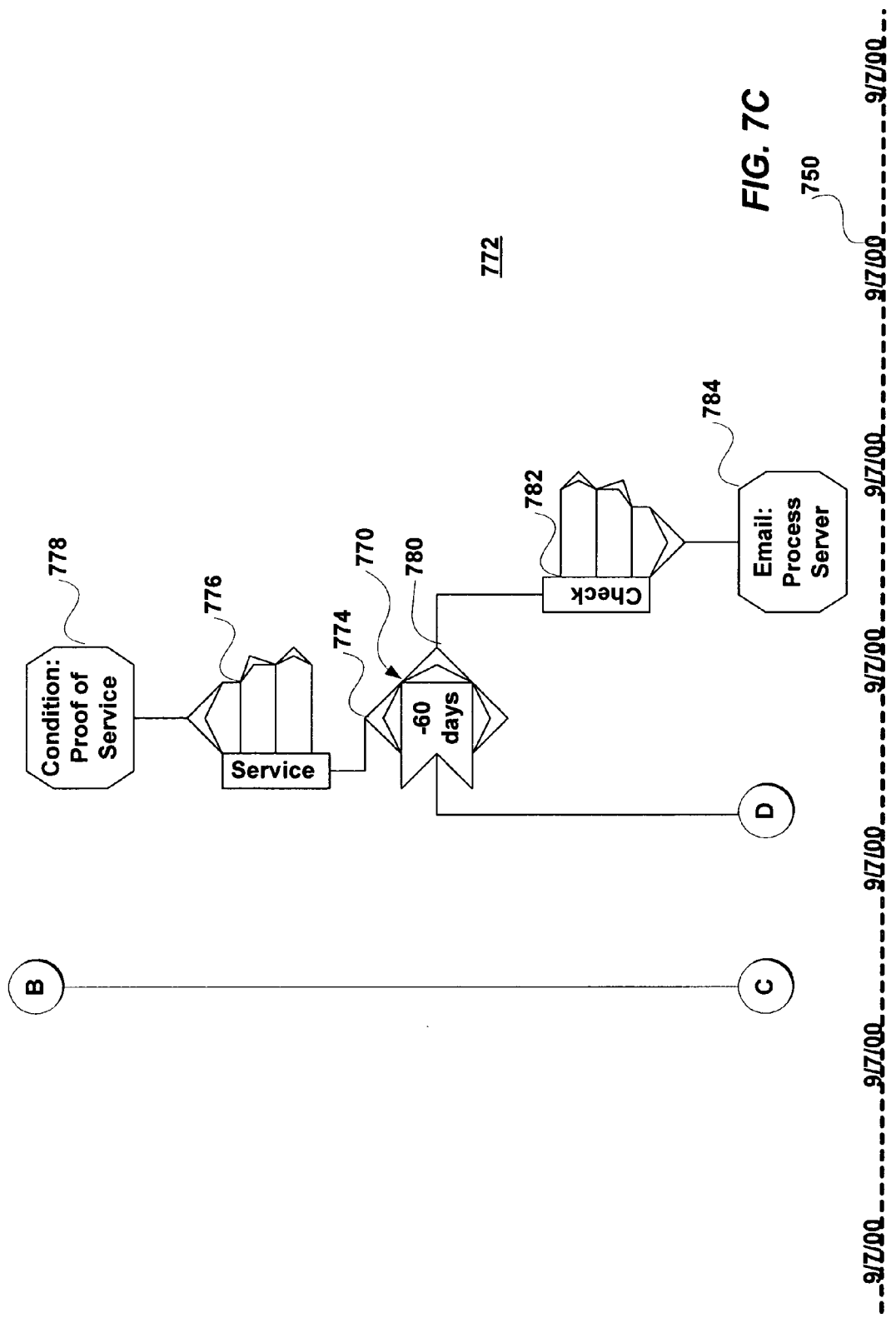

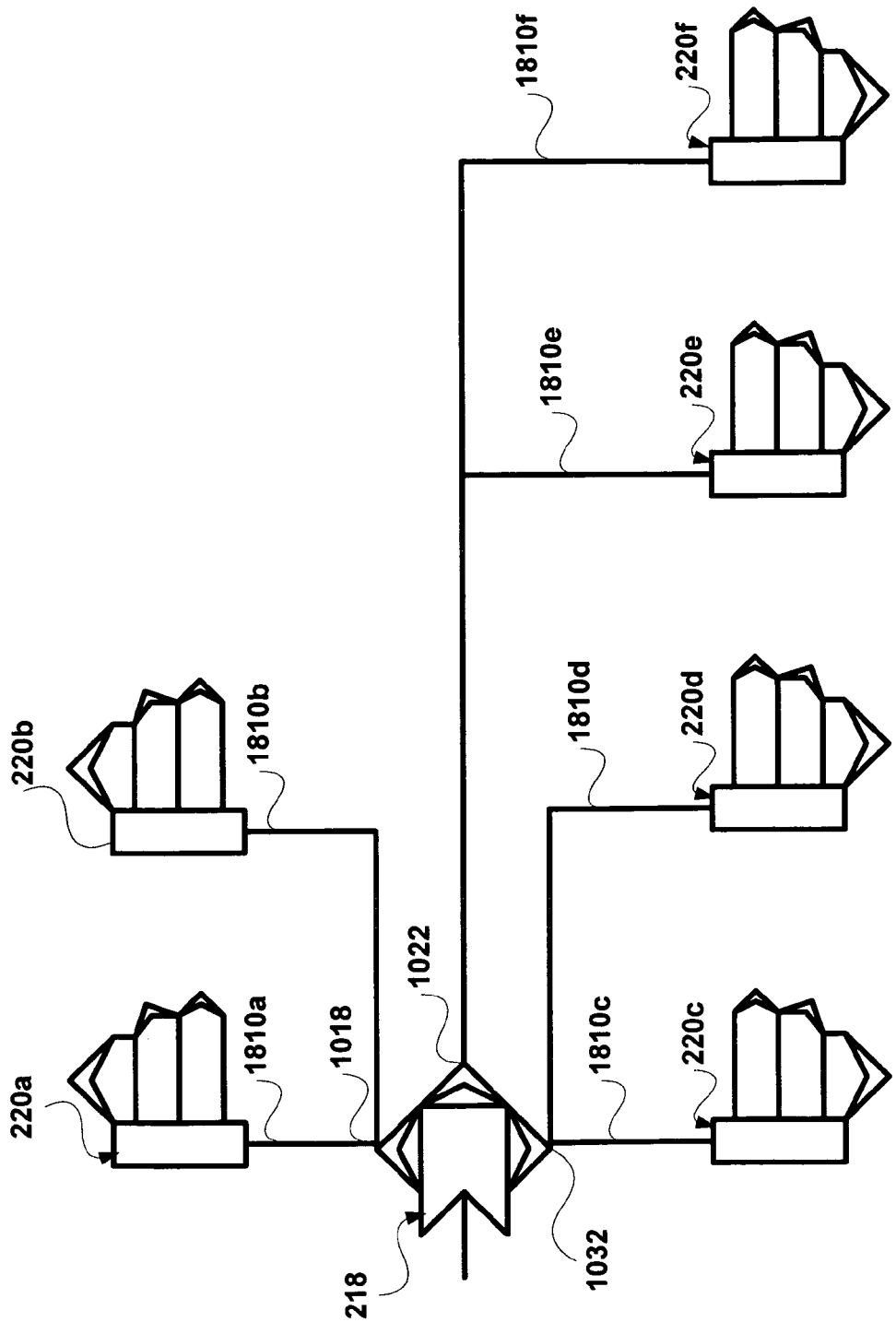

AL Input

Identification
- Name: Filing
- Graphic ID: AL.15
- UniqueID: {BBC24B75-5E64-11D4-9289-444553540000}
- Text: Initial Filing of Foreclosure Documents Status
- ☐ Active?
- ☑ Visible?
- ☐ Completed?
- Completed Reference:

Grid
- XCount: 2
- XPos: 1
- YCount: 2    YLocalCount: 2
- YPos: 2     YLocalPos: 2

OK
Close
Parent
Children

AC Input

Identification
- Name: Notice of Foreclosure
- GraphicID: AC.16
- UniqueID: {BBC24B76-5E64-11D4-9289-444553540000}
- Text: Notice of Foreclosure

Behaviour
- App: Word
- Template: c:\forms\nof.doc
- AppAction: create
- DataSource: Start.Datasource
- SQL: GET * from Contacts OK
Close
Parent
Condition

Status
- Active? — 3010
- Execute when activated?
- ☑ Visible?   ☐ Completed?
- Completed Reference: 0.0000

Grid
- XCount: 1
- XPos: 1
- YLocalCount: 0.0000
- YLocalPos: 3
- YCount: 1
- YPos: 3

*FIG. 30A*

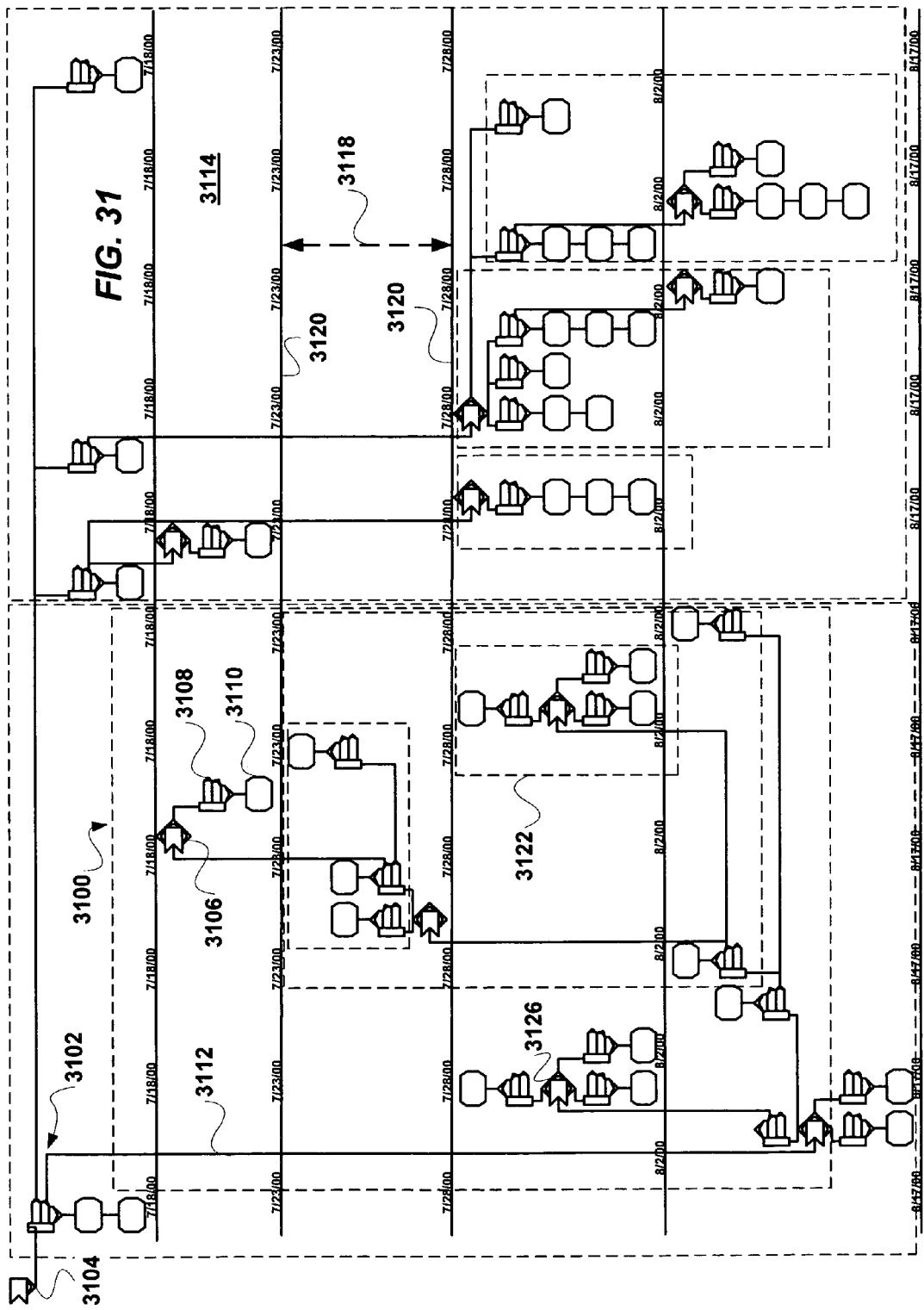

AUTOMATING TIME SEQUENCED TASKS

CROSS-REFERENCE TO RELATED APPLICATIONS

This patent application claims the benefit of provisional patent application Ser. No. 60/145,633 filed Jul. 26, 1999.

FIELD OF THE INVENTION

The present invention relates to the field of computer software and, in particular, to methods and systems for the design and implementation of intelligent automated checklists.

COPYRIGHT NOTICE

©1998-2000 Mark I. Crohn. A portion of the disclosure of this patent document (including the drawings and individual graphic images therein) is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The computer has become the "engine" of many enterprises by facilitating the use of computer applications to create, produce and track the work product of a business. Computer applications are available for use in a wide variety of business activities. Among the more popular of these computer applications are groups of general office computer programs that are sold together in "office suites" for use by a broad range of business types. These office suites typically include a word-processing program for creating and editing documents, a spreadsheet program for manipulating numerical or other data and a database program for the storage and retrieval of all types of data. Used alone or in combination, the programs in these office suites (and other computer programs marketed individually) have the potential to enable a wide range of business activities. However, the full potential offered by computer programs is often not realized because of the difficulty in adapting the computer programs for the specific needs of the business.

The power of many general office computer programs has grown dramatically over the last number of years, with many functions having been added to each program that blurs the distinction between individual applications. Some of these added functions are duplicative of functions offered in other programs. This often adds to the complexity of using the applications. Further complicating the use of individual functions is that the method accessing similar functions in different programs is often different-even though the same result may be obtained.

The common wisdom asserts, with not totally unfounded cynicism, that the great majority of users of office suite type computer programs (and other computer programs) learn only a small percentage of the available functions of each program, trading the inefficiencies of doing a task with a program by using the functions that they know against the investment in time and effort that would be necessary to learn how to do that same task in a more efficient way. When a task is performed infrequently, this efficiency tradeoff may make little difference, but for tasks that are performed repeatedly the loss of efficiency in doing something as "I know a way to do it" rather than how it most efficiently could be done might be significant over time.

Many computer applications sold in office suites and separately allow the user to customize a generalized program to the specific tasks required by the business. This customization is done using a variety of tools ranging from those that might be relatively accessible to moderately sophisticated user to tools only suitable for very sophisticated users. For instance, a moderately sophisticated user may be comfortable creating templates and recording macros, while a very sophisticated user might use a high level programming language to directly access the functions of the computer application through an application programming interface ("API") exposed by a computer application for that purpose. Generally, the greater the customization desired, the more sophistication of the user that is required and the greater the investment in time and effort that is required to accomplish the customization.

While the office suite and other computer applications provide a wide range of functions for a broad range of uses, the "one size fits all" approach provides a great deal of potential for addressing the specific tasks of many different types of businesses, often the potential is unrealized because of the effort and expertise that is necessary for customizing these "general" computer applications to the "specific" uses of the business. In some cases and often at significant expense, the business will turn to a professional programmer or consultant to customize the programs from an office suite or other "general" application to the specific uses of the business. In other cases, the business may commission a professional programmer or consultant to program a custom computer program directed to the needs business. Between these two alternatives, a custom program directed to a particular business type may be available for purchase by the business from a developer, but these applications are often are much more expensive and sometimes less reliable than the mass marketed general applications provided.

Many business activities require that a sequence of tasks be performed. Often this sequence of tasks must be performed over time, with a task or group of tasks being performed on a given day (or other time unit) and another task or group of tasks performed on a later day (or other time unit). For example, a series of loan documents might be prepared and forwarded to a customer for signature. Ten days later the business would like to send a follow-up letter if the loan documents had not been returned, or to forward the loan documents to the loan underwriter if the loan documents had been returned. As indicated by this example, the next task in the sequence may be conditional on whether the previous task was completed or directional in that the next task is dependant on what happened with the previous task. Because of the complexity and expense of creating custom programs or the customization of general office programs, user's often use the computer for the individual tasks and take on the sequencing and decisions on what tasks to complete themselves.

There are many other real world examples of time sequenced tasks. While the production and tracking of documents may be sequenced in terms of days, tasks on a manufacturing line might be sequenced in terms of seconds/microseconds, etc. For example, in a given unit, a hole is drilled, one second later the conveyor belt moves the unit under a painting spray gun, which is activated once second later. Customizing computer applications for automating a sequence of tasks in a manufacturing process also require a greater level of sophistication than is possessed by many users. While the following discussion will be framed in the context of an office producing documents, it should be understood that any time sequenced task might be substituted in that discussion.

There is a long-felt and unmet need for methods and systems that provide a quick and straightforward way to create or customize computer applications that automate time sequenced tasks in a way that meets the specific needs of a business or other user. These methods and systems should allow a user with average or better computer skills to easily assemble sequences of tasks into complex customized applications. The methods and systems should provide an easily understandable and intuitive interface that can be easily grasped by the user to assemble and automate complex tasks while insulating the user from much of the underlying programming necessary to implement the task.

SUMMARY OF THE INVENTION

In accordance with the present invention, methods and systems for creating and utilizing automated task lists are provided. An automated task list not only defines the composition and order of tasks that will (or might) be performed, but also performs the task. An automated task list may perform different tasks depending on conditions defined for that task, which may take into account the other tasks in the automated task list, or other external conditions.

In accordance with the invention, an automated task list may be assembled from one or more constituent automated task lists, with multiple instances of each constituent automated task list allowed to be added to the automated task list. Addition or subtraction of a constituent task list causes the appropriate tasks in the task list to update to reflect the change in the composition of the parent task list. As described in detail below, in an actual embodiment of the invention the date on which tasks are to be performed are set either manually or automatically based on other tasks or task lists that are part of to the parent task list.

In accordance with the present invention, an object model is provided for the construction of automated task lists. The provided object model is comprised of three primary objects: an ActionDate object, an ActionList object, and an Action object. From the objects provided by the invention automated tasks lists of almost unlimited intricacy and functionality can be created, displayed and utilized.

In accordance with the present invention, an ActionDate object includes zero or more ActionList objects and, alternatively, zero or more Action objects and zero or more ActionDate objects. The ActionDate object has an ADate property that is set manually or by the methods and systems of the present invention to a time in which an Execute method of the ActionDate will be triggered. When run, the Execute method of the ActionDate selectively triggers the Execute method of Action objects associated with the ActionDate. The triggering of the Action object's Execute method may be contingent on conditions checked in the Execute method of the ActionDate object.

In accordance with the invention, the ADate property may be set by methods and systems of the invention that use an Offset property to add or subtract a time interval to or from the ADate property of another ActionDate object. The ActionList objects included in the ActionDate object may be grouped into collections that are selectively executed by the Execute method of the ActionDate object. In an embodiment of the invention, three collections are provided: an AutoActionLists collection that is always triggered when the ActionDate is executed, a TrueActionLists collection that is triggered when the Execute method of the ActionDate evaluates its conditions to True; and, a FalseActionLists that is triggered when the Execute method of the ActionDate evaluates its conditions to False. Custom ActionList collections may also be defined by a user and activated with or through the ActionDate object.

In accordance with the present invention, an ActionList object includes zero or more ActionDate objects, zero or more ActionList objects and zero or more Action objects. Since ActionList objects may contain other ActionList objects, many child processes (each represented by a child ActionList object) may be combined to create a parent process and many instances of a child process may appear at different places in the parent process. Methods and systems of the present invention activate and/or execute the child ActionLists depending on their position in the parent process or relationships to other objects in the parent process, as is described in detail below. An ActionList may also include many ActionDate objects that can each be independently be activated or executed by an Execute method of the ActionList, for instance, according to the ADate property of the ActionDate.

In accordance with the present invention, an Action object provides access to any task that the computer can accomplish. Action objects with predefined capabilities may be sub-classed from the general Action object class, for instance, by customizing an Execute method of the Action object. These specific Action objects may employ proprietary processes or may harness the functionality of third party programs, for instance, by employing an application programming interface. Examples of Action objects are, Action objects that produce documents by accessing a database and merging data into a template document, Action objects that create and send email messages to predefined individuals, or that make database entries. Action objects of different specific tasks may be added to the Actions collection of an ActionList object, depending on the Actions necessary to accomplish one or more tasks in the process.

In accordance with the present invention, a visual programming interface is provided to speed the development of automated time-sequenced task lists. The visual programming interface provides a graphical element associated with each of the primary objects included in the object model provided by the present invention. Graphically inter-linking the graphical elements associates the objects in a manner that allows the methods of the objects to compute and set certain of their own properties based on the relationship that is graphically illustrated through the visual programming interface. In an embodiment of the invention, one of the properties that can be computed and set based on a relationship graphically created by and illustrated through the visual programming interface is an object's ADate property. For instance, the ADate property may be computed by offsetting (e.g., adding or subtracting) a value of an Offset property of a subject object from the ADate (or other) property of another object that has been related using the visual programming interface to the subject object. The ADate (or other) property may be updated whenever the relationship between the subject object and any other directly or indirectly related object is changed, e.g., but adding/subtracting a related object or changing a property of a related object.

In accordance with other aspects of the invention, the visual programming interface provides for the graphical assembly of units or sub-units of automated time sequenced task lists, which are referred to herein as "bolts" because of their resemblance to the patterns formed by lightening bolts when the graphic representation of the objects are shown graphically by the visual programming interface. Bolts may be combined to form larger bolts. For instance, a bolt representing a time-sequence of tasks that is included in a larger process may be graphically combined with other bolts to form a larger process. If a bolt represents a series of time-sequenced tasks that is performed at different times in a larger process (a "parent bolt"), the bolt may be added as many times as necessary at various positions of the parent bolt. A method and system provided by the invention updates certain properties of the bolt to reflect the addition of the bolt to the parent bolt. For instance, an ADate property for relevant objects represented by the bolt may be computed and/or set based on an offset from the ADate property of a related object in the parent bolt. The ADate property of any object may also be set to a date that is not computed using an offset (a "hard date") from which the ADate property of related objects may be computed using an offset.

In accordance with further aspects of the invention, one or more bolts may be associated with each other and graphically presented in a store. Selecting a bolt from the store creates an instance of the bolt (including its constituent objects), which may be added graphically to a parent bolt. Each instance of the bolt may be added by creating a relationship between the instance of the bolt and a parent bolt. The visual programming interface may access as many different stores as is desired and different stores may be presented to the user depending on the subject matter of project.

In accordance with other aspects of the invention, the visual programming interface has a bolt graphical display option that presents the objects in bolt form. The bolt graphical display may be used during a design process during which an automated time sequence of tasks is defined. With the bolt display option, a time sequenced list of tasks of almost unlimited complexity can be graphically displayed in an easily understandable format. This display also allows the user to create visually a process of almost unlimited complexity. Among other things, the bolt display graphically illustrates the relationship of alternative process that may execute depending on conditions associated with the object. The bolt display option may display all or portions of the bolt, according the preferences of the user and the requirement of the project.

In accordance with other aspects of the invention, the visual programming interface also has a task list graphical display option that presents the objects in a task list or checklist form. This task list format displays the time-sequenced task list provides the option to display all tasks, tasks that are "active" as a result of the result of previously preformed tasks (e.g., satisfied/unsatisfied conditions), or display any combination of tasks according to the preferences of the user or requirements of the project. Typically, the task list format is used during the performance of an instance of bolt. Individual or groups of tasks can be selected from task list and performed according to the actions defined for that object. As tasks appearing in the task list, the objects displayed in the task list may be updated to additionally show newly active tasks and/or remove newly inactivated tasks. The user may switch between the display of multiple task lists. Multiple bolts may be individually or concurrently displayed and may be associated for display with parent objects. For instance, an object representing a client may have one or more instances of a patent application matter bolt (associated with an ActionList object) with each instance of the patent application bolt representing a task list for a different patent application owned by the client. By collapsing/expanding the individual tasks lists, the user can manually trigger tasks or view the progress of the bolt as it takes automated actions.

BRIEF DESCRIPTION OF THE DRAWINGS

FIGS. 7A–D are a pictorial representation illustrating an exemplary bolt in accordance with the present invention;

FIG. 11A is a pictorial representation of the graphic connection of components that can be made to an ActionDate component in accordance with the present invention;

FIG. 17B is a pictorial representation of a user interface for configuring a Start component in accordance with the present invention;

FIG. 23 is a pictorial representation of a user interface for configuring an ActionList component in accordance with the present invention;

FIG. 30A is a pictorial representation of a user interface for configuring an Action component in accordance with the present invention;

FIG. 31 is a pictorial representation of a bolt display format in accordance with the present invention;

DETAILED DESCRIPTION

Exemplary Computer System and Network

Figure 1:
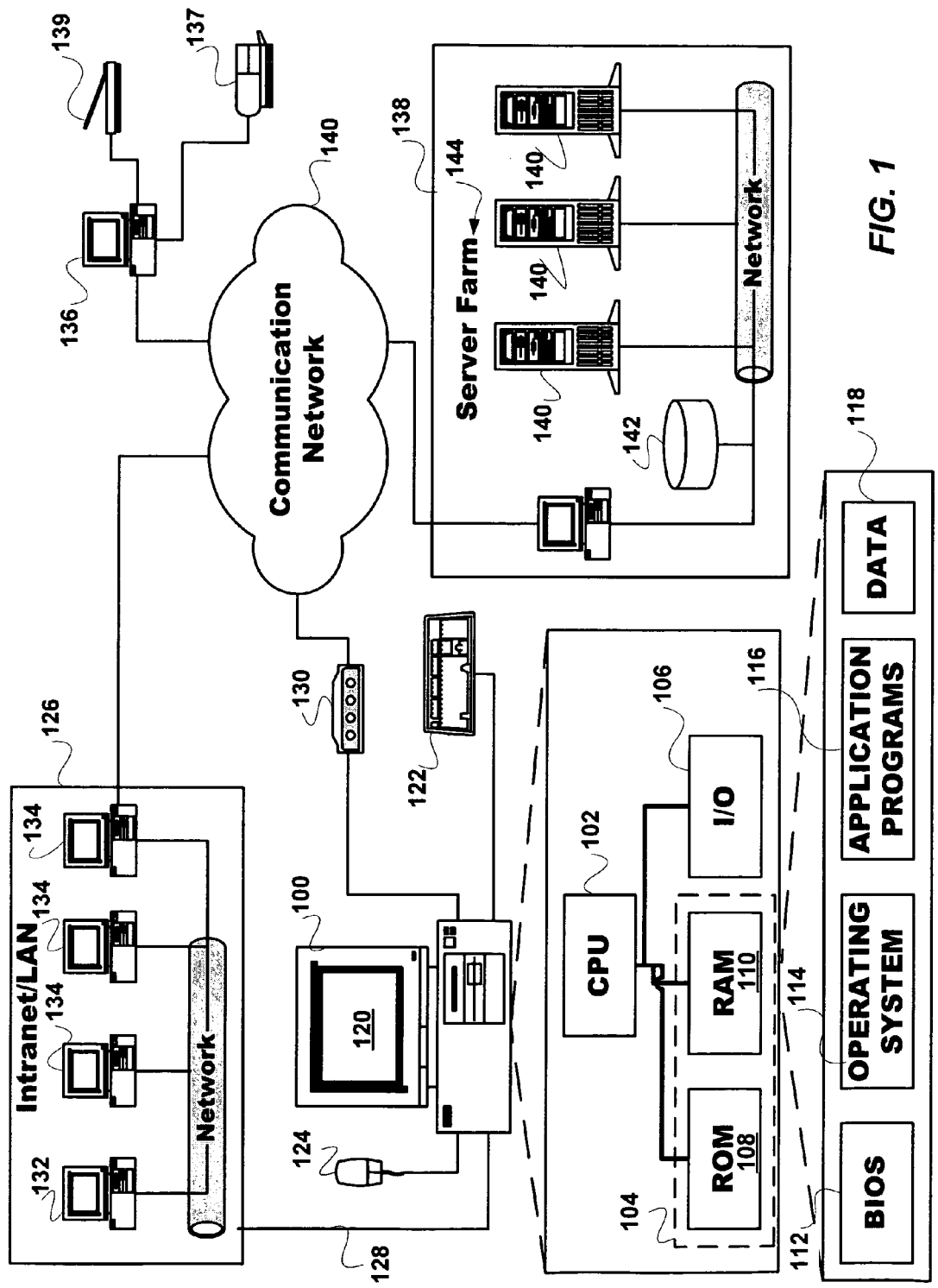
FIG. 1 is a block diagram of a general purpose computer system suitable for implementing the present invention.

The block diagram shown in FIG. 1 illustrates an exemplary computer system suitable for practicing the present invention. A computer 100 comprises a central processing unit (CPU) 102, a system memory 104 and input/output (I/O) ports 106. The system memory includes non-volatile memory (ROM) 108 and volatile memory (RAM) 110. The system memory 104 contains a basic input/output system (BIOS) 112 for administering the basic input and output between components of the computer, an operating system 114 for providing the basic software services provided by the computer and application programs 116 that provide the functionality for performing specific tasks with the computer. Data may be stored and manipulated in the system memory 104 by any of the BIOS 112, operating system 114 and application programs 116.

The computer 100 has a display 120 for output of information and input devices such as a keyboard 122 or a pointer device such as a mouse 124. Computers suitable for practicing the present invention include conventional personal computers, server computers, notebook computers, hand-held computers, personal digital assistants, personal information managers and hybrid devices incorporating computer capabilities such as cable boxes, newer cellular telephones and pagers.

The computer may be connected to a local area network (LAN or intranet) 126 through a network connector 128 or through a modem 130. A LAN 126 comprises a server computer 132 and a plurality of client computers 134, which are all functionally similar to computer 100. The computer 100 and/or the LAN 126 may be connected to other computers 136 or other networks 138 through a communication network 140 to form a wide area network (WAN). The Internet is an example of a large scale WAN that connects together many computers 100.

Server computers 140 (functionally similar to computer 100 but generally more powerful) store application programs 116 and data 118 that are communicated to other computers (e.g., 100, 134 and 136) connected to a network. In some cases, a client computer runs a browser application or "thin client" operating system 114 that only handles input and output under the control of one or more server computers that runs the application program 116 and maintains the data 118 in a centralized database 142. For instance, an application program that runs on a server 140 may instruct a remote computer 136 to print a document to a printer 137 or receive input from an input device such as a keyboard 122, mouse 124 or scanner 139. When the application program 114 is run by a server computer 140, the program is said to be provided by an application service provider (ASP) who will generally have multiple server computers 140 organized into server farms 144 capable of handling large processing loads. The present invention may be installed as an application program 114 or other process on an individual computer 100 or be run from a server computer 140 on a LAN or WAN that is provided to an end user's computer 136 by an ASP.

Overview of the Invention

Figure 2:
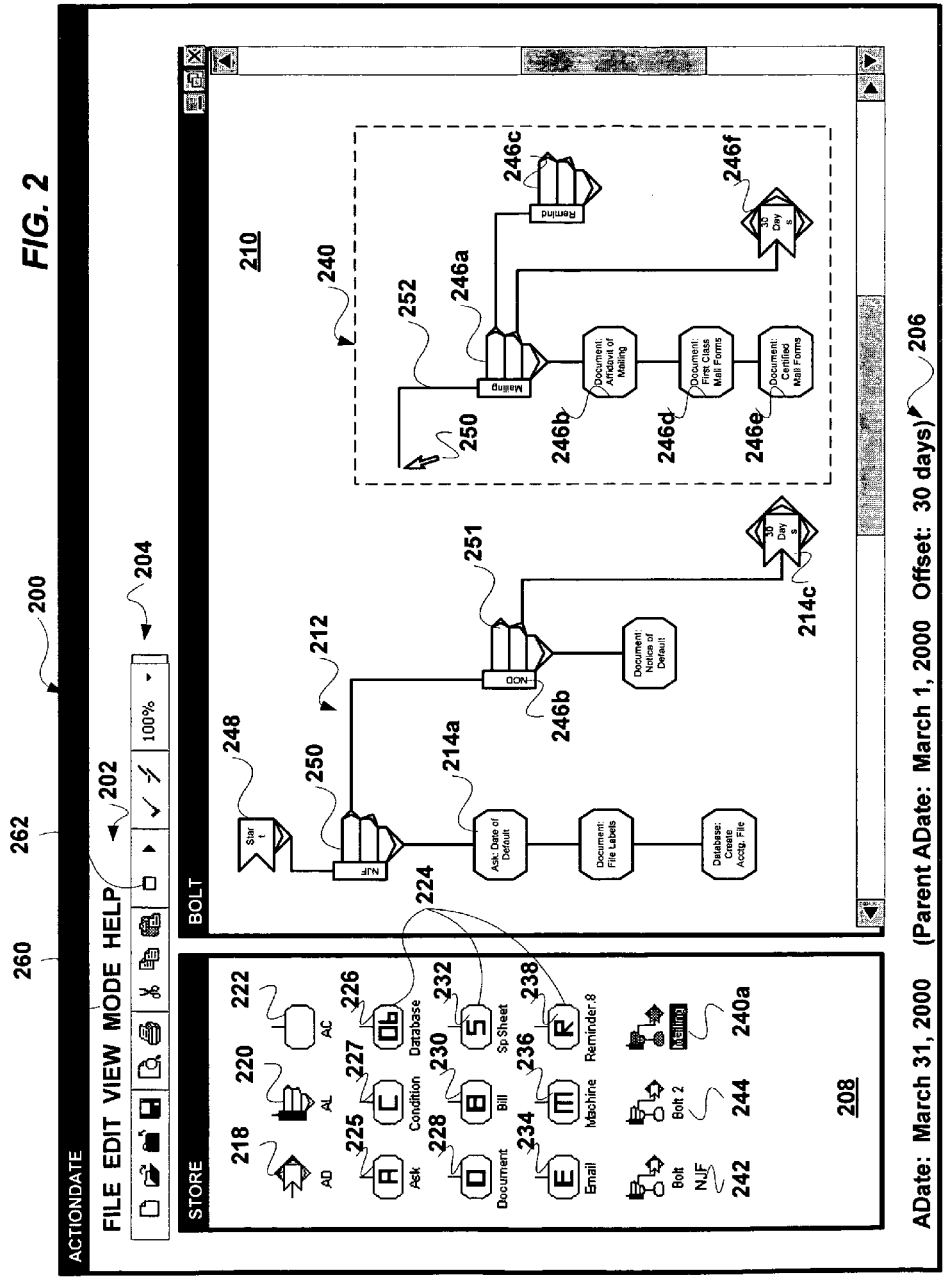
FIG. 2 is a pictorial representation of a user interface in accordance with the present invention.

An overview of the invention is provided by a design mode user interface 200 shown in FIG. 2. The design mode user interface 200 includes a menu bar 202, a toolbar 204, a status bar 206, a STORE window 208, and a BOLT window 210. In a design mode (discussed in detail below), a bolt 212 is constructed to represent a sequence of tasks in a process such as a business process or a set of machine steps. The bolt 212 includes a plurality of graphic representations of components (e.g. 214a–c) provided by the invention. To construct the bolt 212, a graphic representation of a component is selected (e.g., using mouse 124, keyboard 122 or programmatically) from a store of graphic components 216 shown in the STORE window 208 and added to the bolt 212 in the BOLT window 210.

The invention provides three primary components, illustrated graphically as an ActionDate ("AD") 218 (FIG. 10), an ActionList ("AL") 220 (FIG. 18) and an Action ("AC") 222. As described in detail below, customized Actions 224 are derived (e.g., subclassed) from the general Action 222 to automate tasks that are to be performed in the sequence of tasks. The STORE window 208 contains customized Actions 224 that are relevant to the subject matter of the sequence of tasks that are being assembled into the bolt 212.

Their may be a plurality of stores, with each store containing a grouping of components that are relevant to the assembly of a bolt in a general subject area and may be displayed in its own STORE window 208 in the user interface 200. For example, in FIG. 2 the store 216 shown in the STORE window 208 includes customized Actions 224 that might be used in the design of a bolt 212 by a law firm to automate a sequence of tasks in a statutory non-judicial foreclosure proceeding. As illustrated, the customized actions 224 include a Database action 226 (e.g., a database entry is made), a Document Action 228 (e.g., a document is created by merging data and printed), a Bill Action 230 (e.g., an entry is made to a billing system), a Spreadsheet Action 232 (e.g., the result of a cell in a spreadsheet is retrieved), an Email Action 234 (e.g., a email message is created from merged data and sent), a Machine Action (e.g., a drill starts), or a Reminder Action 238 (e.g., a reminder is set in a personal information manager). Also provided are an Ask Action 225 (e.g., pop-up a user interface to request information from the user) and a Condition Action 227 (e.g., checks conditions including the completion of other Actions and used in conjunction with the AD Conditions method discussed below in FIG. 14). Many other customized actions are possible and within the intended scope of the invention. Generally, the customized Actions 224 are created during the development mode by an application developer or third party practicing the invention and provided to the end user as part of a pre-configured store 216 of actions.

In addition to constructing the bolt 212 from individual components (e.g., 214a–c), pre-constructed child bolts 240 may be added to the bolt 212. The child bolts 240 may be thought of as a sub-sequence of tasks to the more general sequence of tasks represented by the bolt 212. Using child bolts is particularly advantageous when a sub-sequence of tasks repeat in different portions of the bolt 212. For example, the child bolt 240 represents a sequence of tasks that take place when a mailing is made and is repeated several times in the exemplary bolt illustrated in FIGS. 7A–D, which is discussed in detail below. The child bolt 240 is saved in the Store 216 as an icon 240a, together with other child bolts 242, 244. A child bolt 240–244 may be pre-configured during the development mode and provided as part of the store 216 or may be created and stored in the store 216 by the end user during the design mode. For instance, a child bolt is stored in the store 216 by selecting all of the components 246a–f in the sub-process and dragging them together to STORE window 208 where they where they are dropped. The icon 240a for a pre-configured child bolt may alternatively be displayed as a customized Action (e.g. 226) or a logo icon representing the action or a third party application that services the Action (e.g., a stylized "W" for a word processing application).

The assembly of the bolt 212 begins with a Start component 248 to which one or more AL components 250 is joined. Every bolt 212 has a Start component 248 that is an ancestor of every other component joined to the bolt. A child bolt 240 is saved with an implied Start component for which the Start component 248 is substituted when the child bolt 240 is joined to the bolt 212. Starts components are discussed in detail below with reference to FIG. 17B. Joining a component to the bolt may be done graphically through user interface 200 or programmatically through an application programming interface ("API") (discussed below with reference to an object model incorporating the invention). For example, to join the child bolt 240 to the bolt 212, the child bolt component icon 240a is selected with the cursor 250 and dragged from the STORE window 208 to the BOLT window 210, where a copy (instance) of the child bolt 240 is dropped. A connector 252 from child bolt is then selected using the cursor 250 and pulled to join bolt 212 at the appropriate position in the sequence of tasks, such as joining connector 252 to AL 246b at connection point 250. Individual components 218, 220, 222, 226, etc. are similarly joined to the bolt 212.

Figure 3:
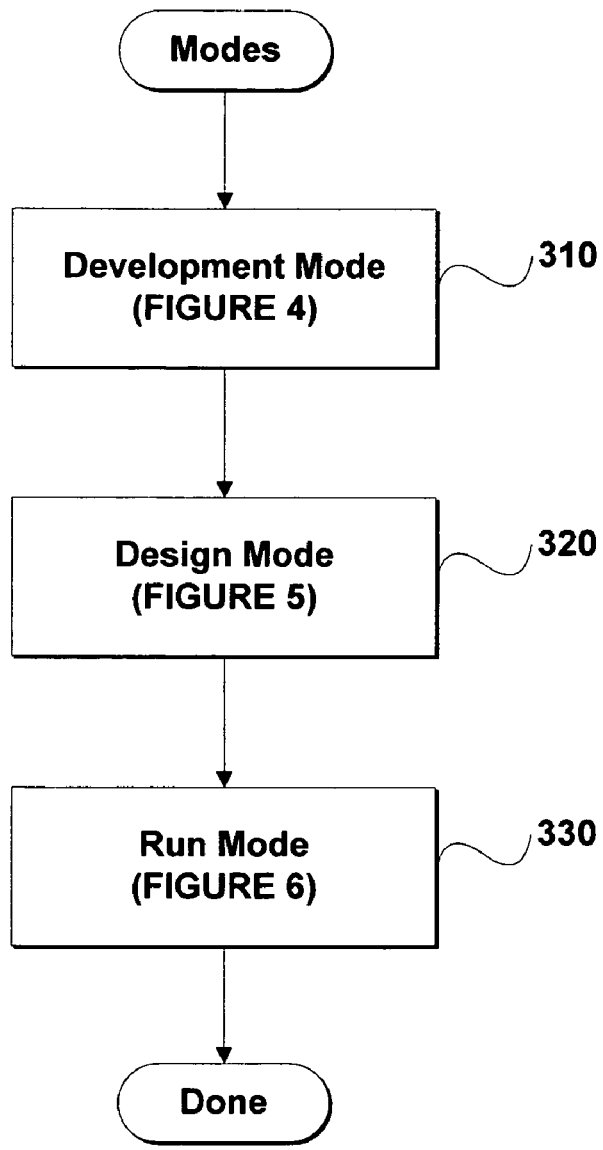
FIG. 3 is a functional flow diagram and illustrating a modes processing procedure in accordance with the present invention.
Figure 4:
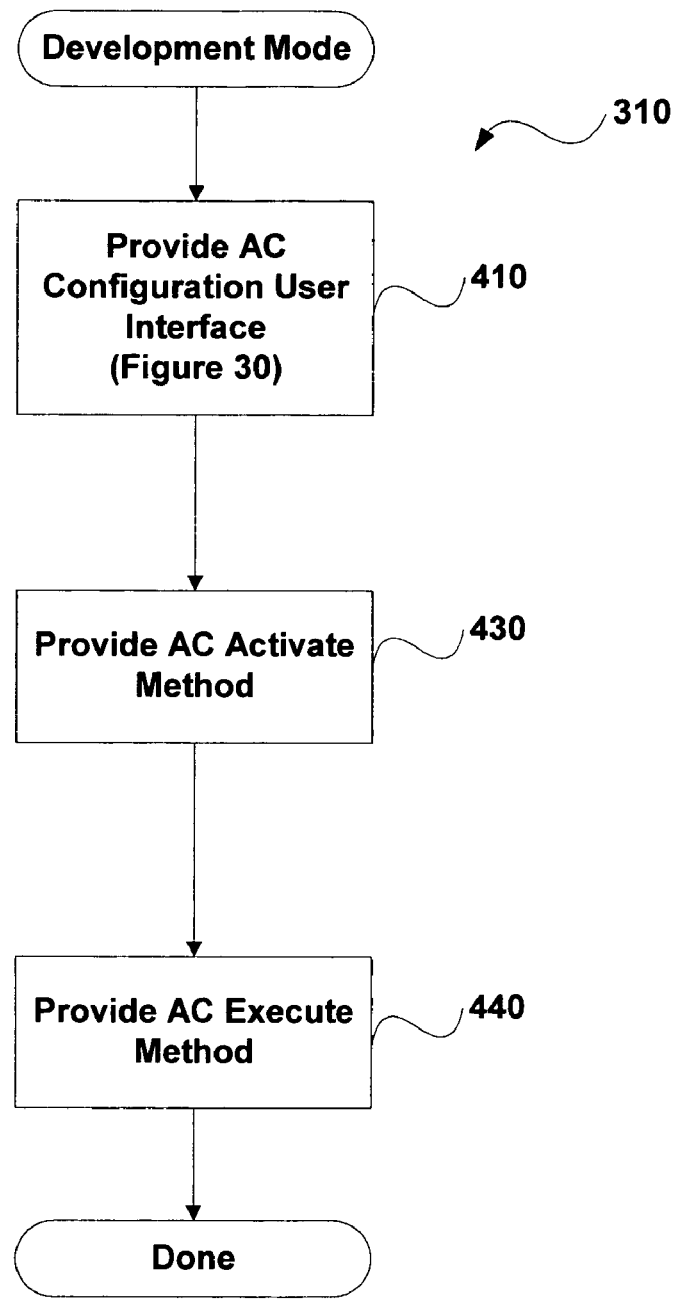
FIG. 4 is a functional flow diagram illustrating a development mode in accordance with the present invention.
Figure 5:
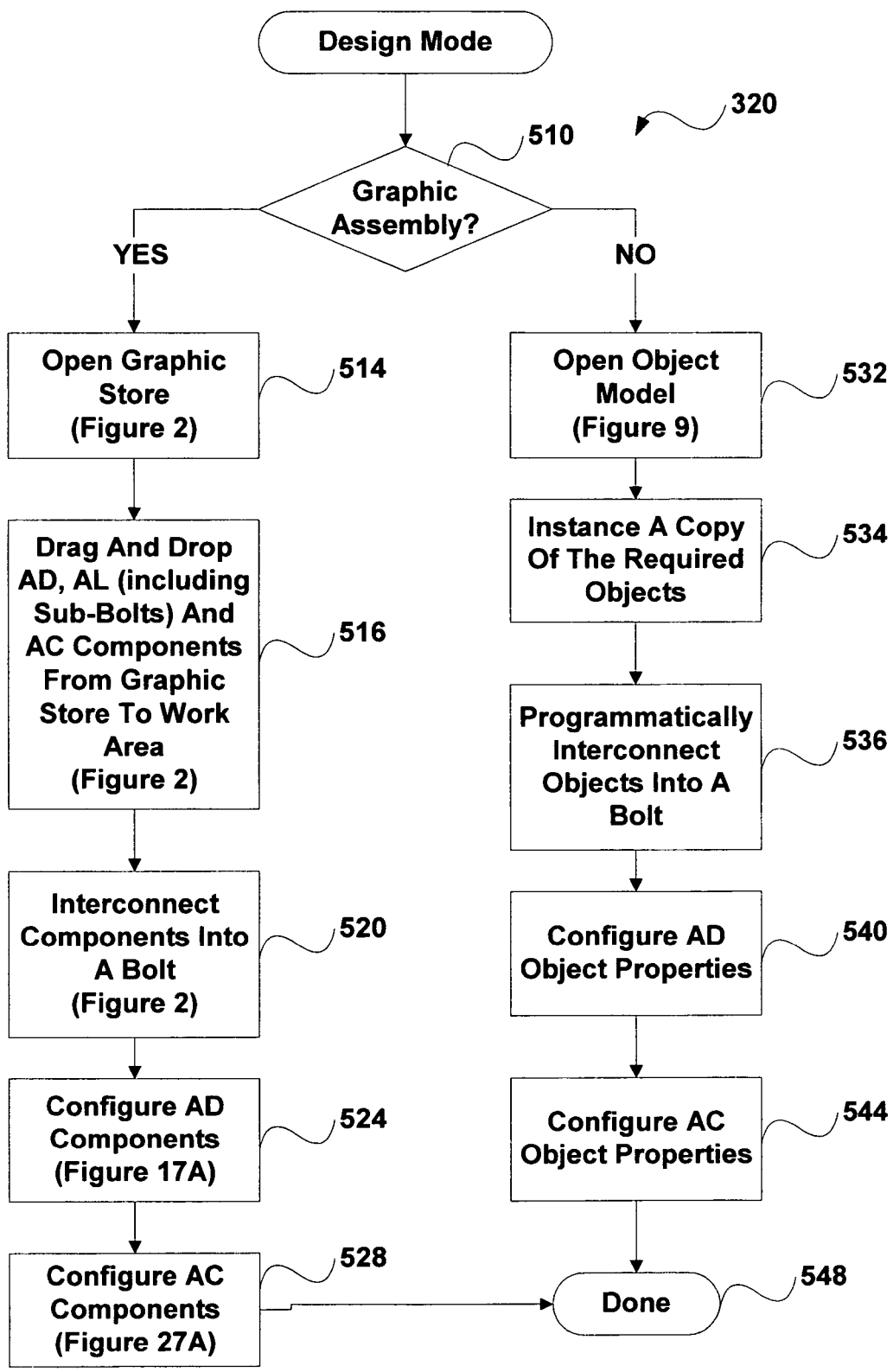
FIG. 5 is a functional flow diagram illustrating a design mode in accordance with the present invention.
Figure 6:
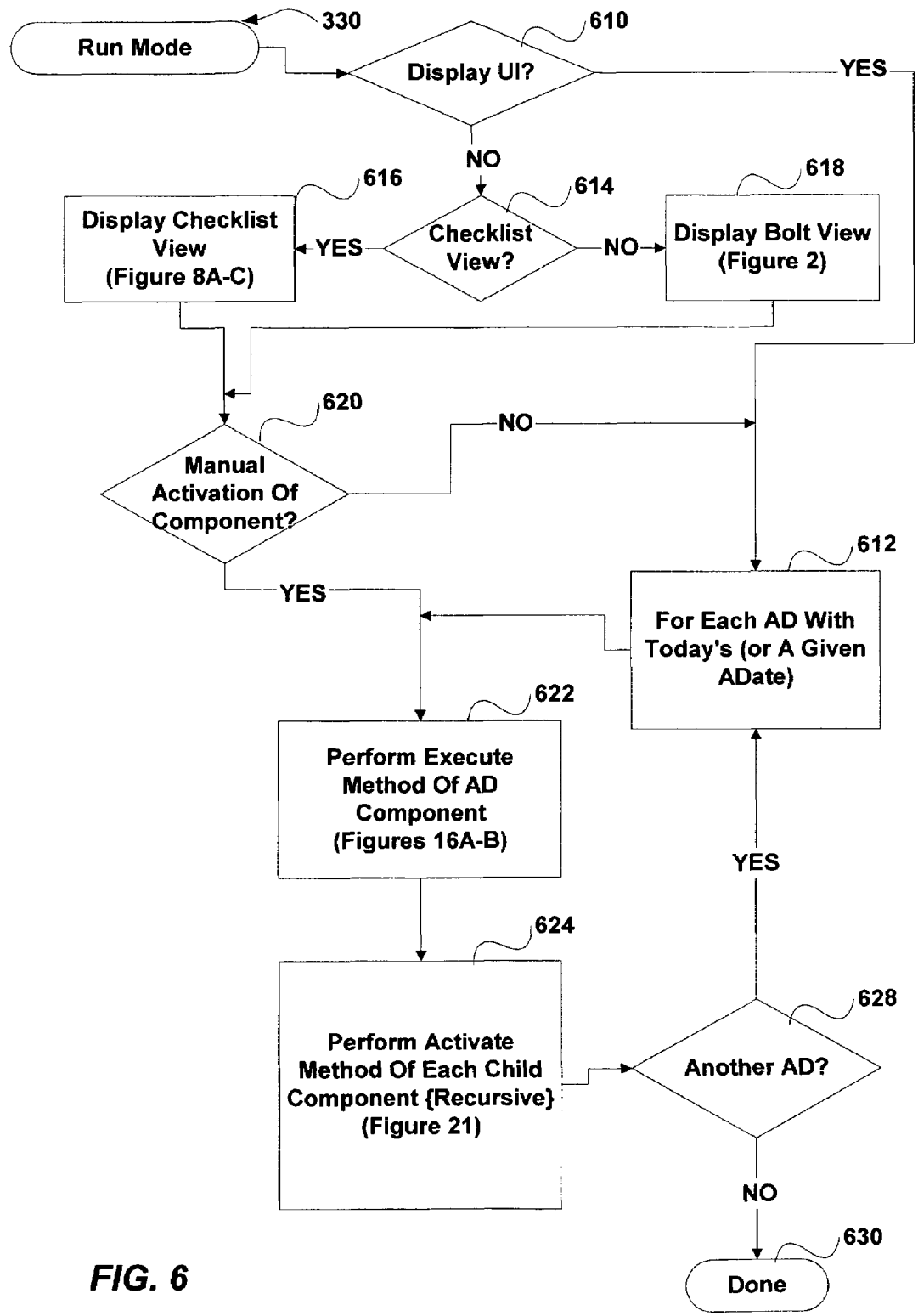
FIG. 6 is a functional flow diagram illustrating a run mode in accordance with the present invention.

As illustrated in FIG. 3, the present invention has three primary modes: a development mode 310 shown in FIG. 4, a design mode 320 shown in FIG. 5, and a run mode 330 shown in FIG. 6. The development mode 310 is mostly utilized by a professional developer that incorporates the invention in a computer application or to provide an AC component (discussed below) for use in the other modes of the invention. The design mode 320 is mostly utilized by a professional developer or end user to design a bolt representing a sequence of tasks. The run mode 330 generally is used by an end user to automatically perform the sequence of tasks defined by the bolt created during the design mode 320. All users may use all modes, for instance, an end user may choose to develop a custom AC component using the development mode 310.

The development mode 310 of the present invention is shown in FIG. 4. Any development of a computer application (e.g., FIG. 2) that incorporates the present invention is within the development mode 310. However, the invention provides for the development of Action components 222 by the original developer and third party developers for use in the other modes 320 and 330 of the invention. As discussed in detail below, Action components 222 are components that perform specific tasks when activated. In the development mode 310, most of the functionality of the Action component is pre-programmed and hidden from the end user.

The Action component 222 may optionally provide 410 a configuration user interface 3000 (FIG. 30). The configuration user interface 3000 allows a user to configure individual instances of the Action component 222 when added to a bolt 212. For example, in an Action component 228 made to construct and print a document may pop up a configuration interface during the design mode 320 that accepts the specification of a document template 3050 from which to construct a document.

An Activate method (e.g., FIG. 28) is provided in a block 430. The Activate method triggers when the AC component 222 is activated and may be as simple as initially making the AC component visible in the various views, may trigger the Execute method immediately upon activation, or trigger other methods to be performed when the AC component 222 is activated.

An Execute method (e.g., FIG. 29) is provided in a block 440. The Action component 222 is provided 420 with public and private methods to automate the completion of the task for which the Action component 222 is designed. These public and private methods are triggered by the Execute method when the Execute method is called in the Run Mode or may alternatively be called during other modes or by other programs. A public method may be accessed programmatically (e.g., through COM) while a private method is hidden from access by programs.

Figure 27:
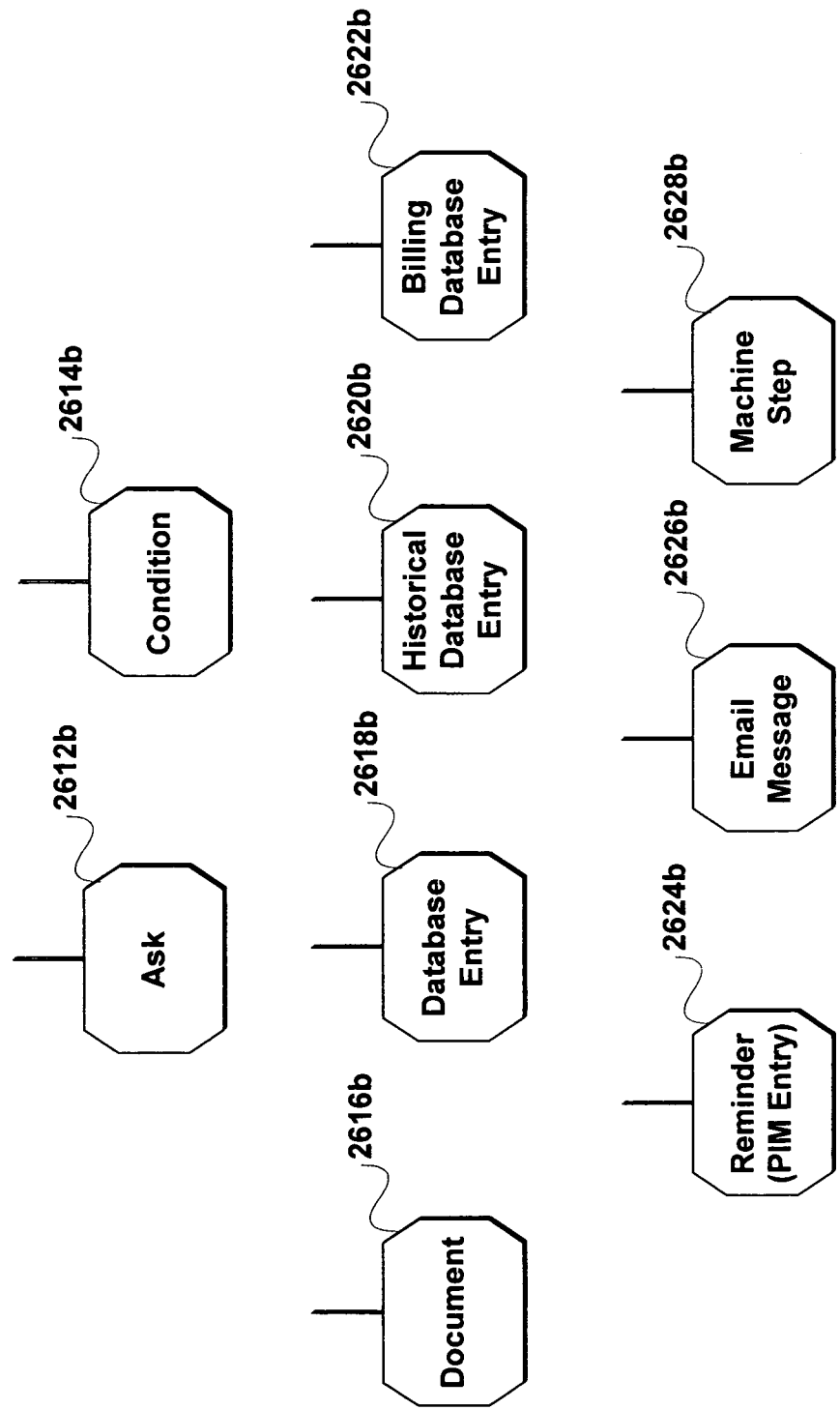
FIG. 27 is a pictorial representation of a plurality of Action component types in accordance with the present invention.
Figure 27A:
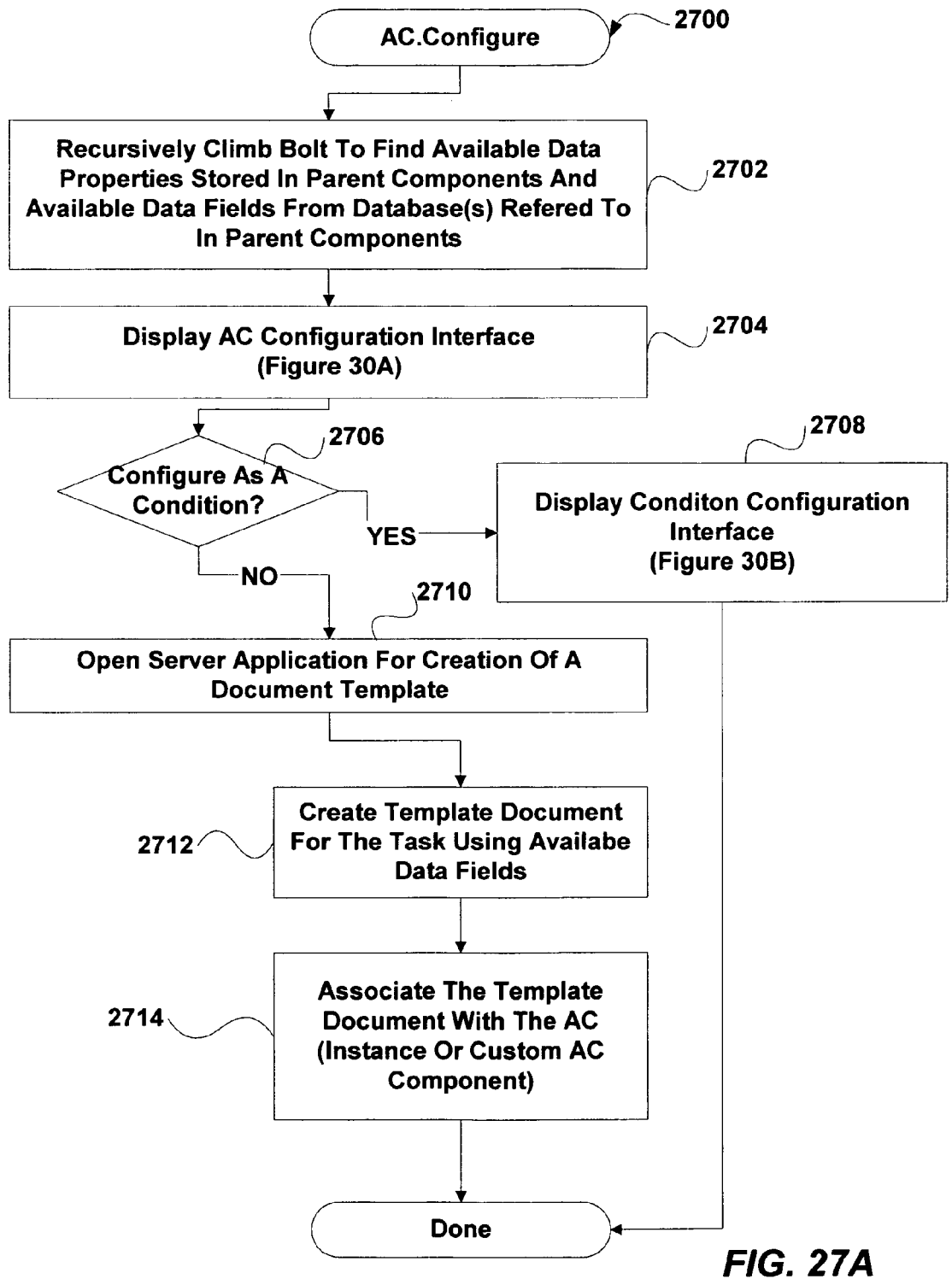
FIG. 27A is a functional flow diagram illustrating an exemplary Configure method of Action components in accordance with the present invention.

The design mode 320 of the present invention is illustrated in FIG. 5 and may me entered via a menu selection 260 or toolbar item 262 (FIG. 2). The design mode 320 may be conducted using methods for the assembly of bolts 212 graphically (FIG. 2) or programmatically using the object model (FIG. 9) provided by the invention. The graphic assembly of the components is discussed in detail above. The process is summarized in FIG. 5. If graphic assembly is selected, the method proceeds from decision 510 to a block 514 where a graphic store of components 216 is opened in a store window 208 (FIG. 2). Components 218–244 are selected 516 from the component store 216 and dragged from the component store window 208 to the bolt window 210 where an instance of the component is dropped using a conventional drag and drop operation. Once in the bolt window 210, the instance of the component is connected 520 to the bolt 212 by dragging a connector 252 with the mouse 250 to the appropriate connection point (e.g., 251) of the bolt 212. When (or as) the bolt 212 is connected, the individual instances of the AD components are configured 524 (FIG. 17A) and the individual instances of the AD components are configured 528 (FIG. 27A). The Design mode is then done 548.

The design mode 320 may also be conducted programmatically using an application programming interface (API) provided by the present invention. Decision 510 directs the object model (FIG. 9) to open in a block 532. Instances of individual components (518–544) are created and then interconnected 536 into a bolt object. The AD object properties are configured 540 and the AC object properties are configured 544. The design mode 320 is then done 548.

The run mode 330 provided by the present invention is illustrated in FIG. 6. The run mode may be conducted without a user interface. If no interface is desired decision directs the process to decision 612. Otherwise, decision 610 directs the process to a decision 614, which determines the type of user interface that will be used. If the checklist view is selected, the decision 614 moves next to block 616 where the checklist view 800 (FIGS. 8A–C) is displayed in place of the bolt window 210 (FIG. 2). If the bolt view is selected, decision 614 directs the process to display the bolt view window 210. After the display of either view 210 or 800, a decision determines if there has been a manual activation of a component. If so, the Execute method of the object is called 622.

Once manual activation has been checked for in decision 620, control is sent to a processing loop 612 that processes each AD that has an associated ADate equal to the date that the loop is being processed on (or another date specified by a user). The AD's Execute method (FIGS. 16A–B) is performed for each of these selected AD components in a block 622. The Activate method for each child component is then performed in block 624. As described below, the Activate method is recursively called to set all appropriate child objects of this AD. Remaining AD's with the subject ADate is checked in decision 626, which continues with block 612 if there are more AD's to process and ends the process 330 if there are not.

An exemplary bolt 700 representing a sequence of tasks that is loosely based on the statutory non-judicial foreclosure procedure of the State of Washington is shown in FIGS. 7A–D. The bolt 700 is assembled once during the design phase in the manner described above with reference to FIG. 2. Once assembled, the bolt 700 may be copied any number of times for use as a child bolt in another bolt in the design phase or for use during the run mode (i.e., running multiple non-judicial foreclosures for a particular client by adding the bolt to a bolt descending from the client).

The bolt 700 begins with a Start 702. An AL component named non-judicial foreclosure (NJF AL 704) is attached to the Start 702. The NJF AL 704 has three Actions attached to it: Ask AC 706, Document AC 708 and Database AC 710. These actions correspond to those one might take to open a file and start the non-judicial foreclosure procedure. When executed, the Ask AC 706 presents a user interface requesting starting information necessary to opening the file. This would include the date of default of a subject deed of trust, which the execute method of the Ask AC would use to set the ADate of the Start 702 to the date of default. The Document AC 708 merges data obtained through the Ask AC or otherwise associated with the bolt (described below) into a word processing document with a template for file labels and prints the labels to a printer. A Database AC 710 creates a database record for the file.

A Notice of Default AL (NOD AL 712) is attached to the NJF AL 704 and has a single Document AC 714 attached to it. The Document AC 714 merges database information into a notice of default document template and prints the document. The statute requires that the notice of default and several other documents in the process be sent by both regular and certified mail. Since this mailing sub-process repeats several times, a Mailing AL 716 is saved as a child bolt 240 (FIG. 2) and then attached to the NOD AL 712. The Mailing AL 716 and has three attached actions: a Document AC 718a that prepares certified mailing forms by merging information from the database (e.g., addresses) into a document based on a template for the certified mail forms; a Document AC 720a for preparing first class mail forms (e.g., envelopes); and a Document AC 722a that prepares and prints an affidavit of mailing.

The parent AD (most recent ancestor AD in the bolt 700) for all these actions 706, 708, 710, 718a, 720a, 722a, is the Start 702. The actions that occur on the same ADate are formatted so that they display together within a DateSpace 724 that is bounded between DateLines 726. The DateLine 726 that bounds the DateSpace 724 shown in FIG. 7A indicates that the ADate for these Actions is Jul. 9, 2000. During the design mode, the DateSpace 724 associated with the Start 702 generally defaults to that day's date, although another date may be specified. As discussed in detail below, each instance of the bolt 700 during run mode will dynamically set the ADates of the AD components.

ActionList components are organizational units for grouping other AL, AD and AC components into child bolts that a user may wish to use as a child bolt or for other organizational reasons. Since the invention permits almost unlimited permutations in how a bolt (e.g., bolt 700) is constructed, the organization of the bolt can be whatever the user believes to be the most logical.

In bolt 700 a notice of trustee sale AL (NOTS AL 728) is attached to the NOD AL 712. In some circumstances, the events that stem from a notice of trustee sale may need to be repeated (e.g., time limits are exceeded). Since each AL is potentially a child bolt, the child bolt created by the NOTS AL 728 permits the process to be repeated as often as is necessary by attaching another copy of the NOTS AL 728 to the NOD AL 712. This attachment may take place either during the design mode if the child bolt is always expected to repeat, or during the run mode as the bolt 700 is being executed to account for special circumstances.

Figure 7B:
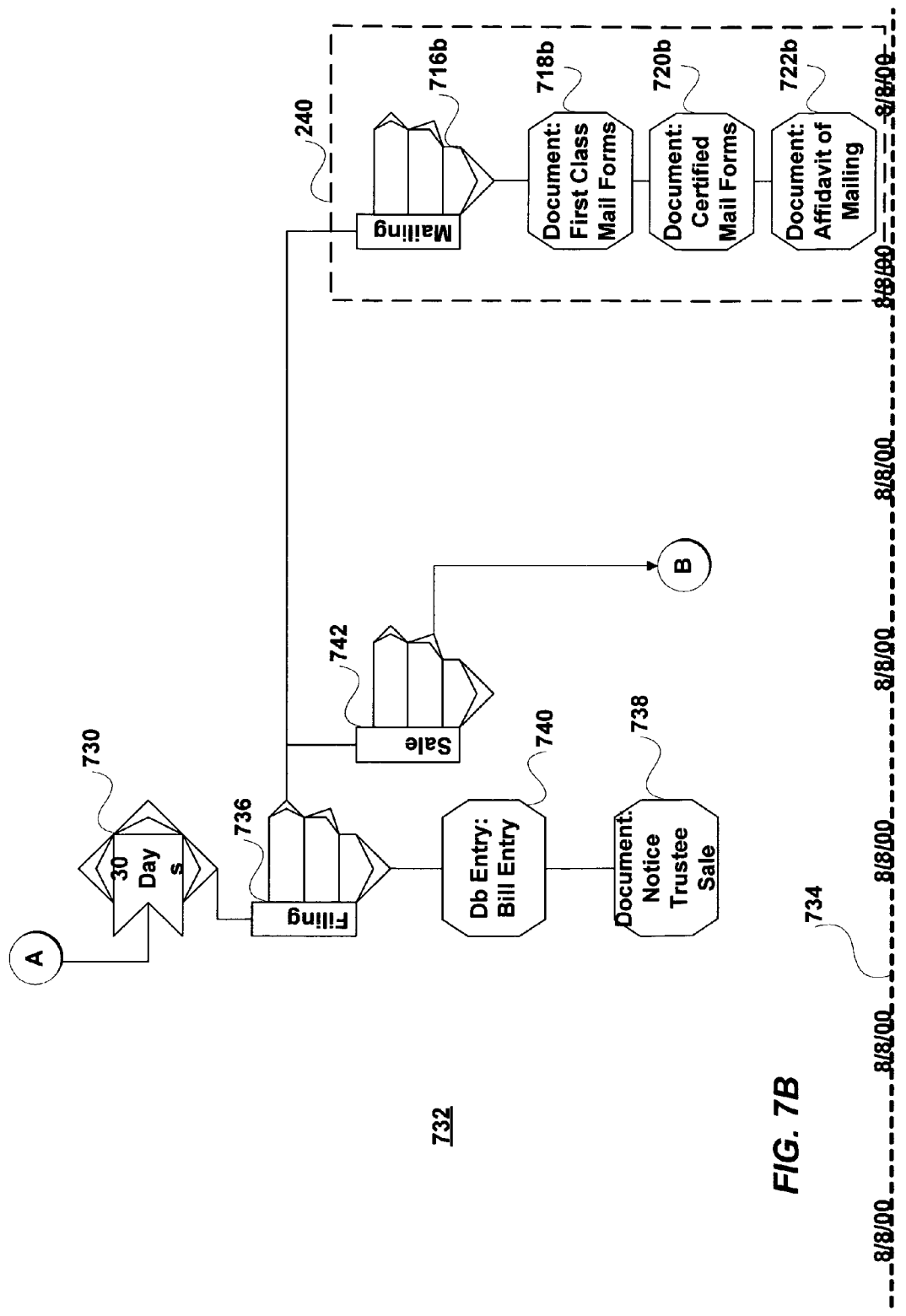
Figure 7D:
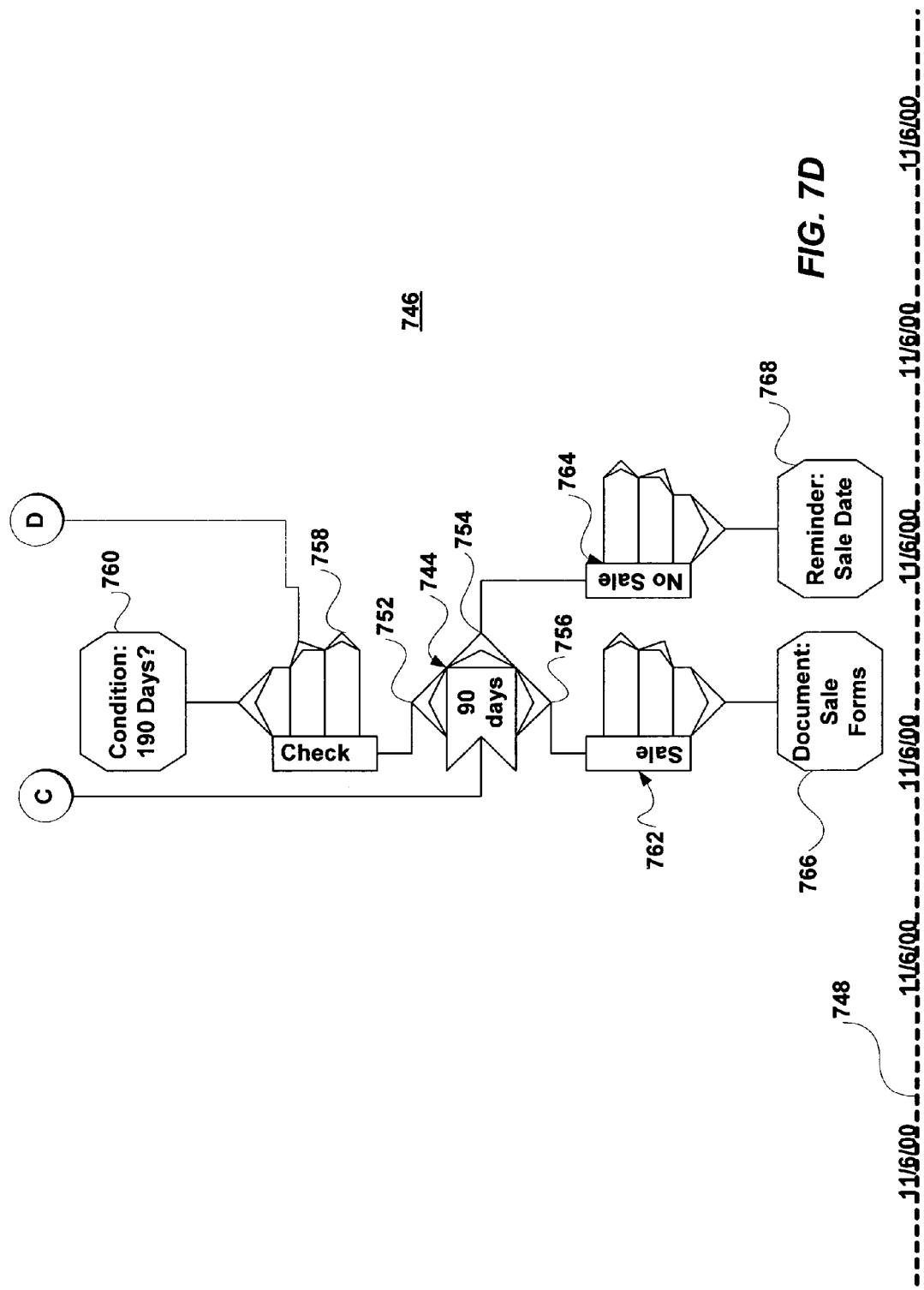

Since the actions associated with the notice of trustee procedure must take place no earlier than 30 days following the mailing of the notice of default, a 30 day AD 730 (FIG. 7B) is attached to the NOTS AL 728 (FIG. 7A). A 30 day Offset (discussed below) set for the 30 day AD 730 yields an ADate of Aug. 8, 2000, which defines a DateSpace 732. Actions within the DateSpace 732 will generally be executed automatically on the ADate associated with the DateSpace 732 unless manually completed earlier or the actions are part of a conditional list (discussed below).

A Filing AL 736 has two actions attached: a Document AC 738 that prepares a Notice of Trustee Sale by merging database data into a notice of trustee sale template and a Database Entry 740 that makes a billing entry for the preparation of the notice of trustee sale in a billing system.

Like the notice of default prepared above as part of NOD AL 712, the notice of trustee sale must be mailed by first class and certified mail. This is accomplished by attaching a copy of the child bolt 240 (FIG. 2). The actions attached to the Mailing AL 716b (Document AC 718b, Document AC 720b, Document AC 722b), operate in the same manner as describe above for Mailing AL 716a, but the Document AC's (718b, 720b and 722b) may be configured to use different document templates that refer to the Notice of Trustee sale. Alternatively, the same document templates could be used with the references to the documents inserted as part of the database information (e.g., a reference to the Notice of Trustee Sale in the Affidavit of Mailing prepared by Document AC 722b).

Pursuant to the statute, the sale of the property cannot occur less than 90 days after the filing of the Notice of Trustee Sale. To automate the sale, a Sale AL 742 is attached to the Filing AL 736. Attached to the Sale AL 742 is a 90 day AD 744. The ADate of the 90 day AD 744 is dynamically set to 90 days after the ADate of the parent AD (30 day AD 730), which defines a DateSpace 746 of Nov. 6, 2000 bounded between a DateLine 748 and a previous DateLine 750 (FIG. 7C).

The 90 days AD 744 illustrates the attachment of Action-Lists to the conditional ActionList collections of the AD (discussed below). A Check AL 758 is attached to the AutoActionLists (AALS) collection 752 of the 90 day AD 744, a Sale AL 762 is attached to the TrueActionLists (TALS) 756 collection of the 90 day AD 744, and a No Sale AL 764 is attached to the FalseActionLists (FALS) collection 754 of the 90 day AD 744. The AALS 752 is always executed on the ADate of the 90 days AD 744. Attached to the Check AL 758 is a Condition AC 760 that verifies that the ADate of the 90 days AD 744 is at least 190 days after the default date received by the Ask AC 706 (FIG. 7A). The result of this Condition AC 760 is processed by the conditions method of the 90 days AD 744 to determine whether to execute the TALS 756 or the FALS 756. If the conditions method executes the TALS 756, an Document AC 766 attached to the Sale AL 762 is performed to prepare the forms necessary for the sale of the property. If the conditions method performs the FALS 754, a Reminder AC 768 sets a reminder in a personal information manager application that a sale date needs to be rescheduled.

Attached to the Check AL 758 is a −60 days AD 770 (FIG. 7C) that defines an DateSpace 772 that is dynamically set to be 60 days before the ADate of the 90 days AD 744 (FIG. 7D), or in this example Sep. 7, 2000. Even though the 90 days AD 744 precedes the −60 days AD 770 in the bolt 700, the DateSpace 772 (FIG. 7C) precedes the DateSpace 746 (FIG. 7D) in the display of the bolt 700 because the ADate associated with the DateSpace 772 precedes the ADate associated with the DateSpace 746.

A Service AL 776 is attached to a AALS collection 774 of the −60 days AD 770, which will execute on its associated ADate a Condition AC 778 that verifies from the database that service has been accomplished of the Notice of Trustee Sale. The result of this Condition AC 778 is processed by the conditions method of the AD. If service has not been accomplished, the conditions method will perform a FALS 780. A Check AL 782 is attached to the FALS 780 that has an Email AC 784 attached to it that prepares an email message to the process server inquiring about the service.

Of course, the example bolt 700 could be greatly expanded in automated actions and alternatives in accordance with the methods described herein.

Figure 8A:
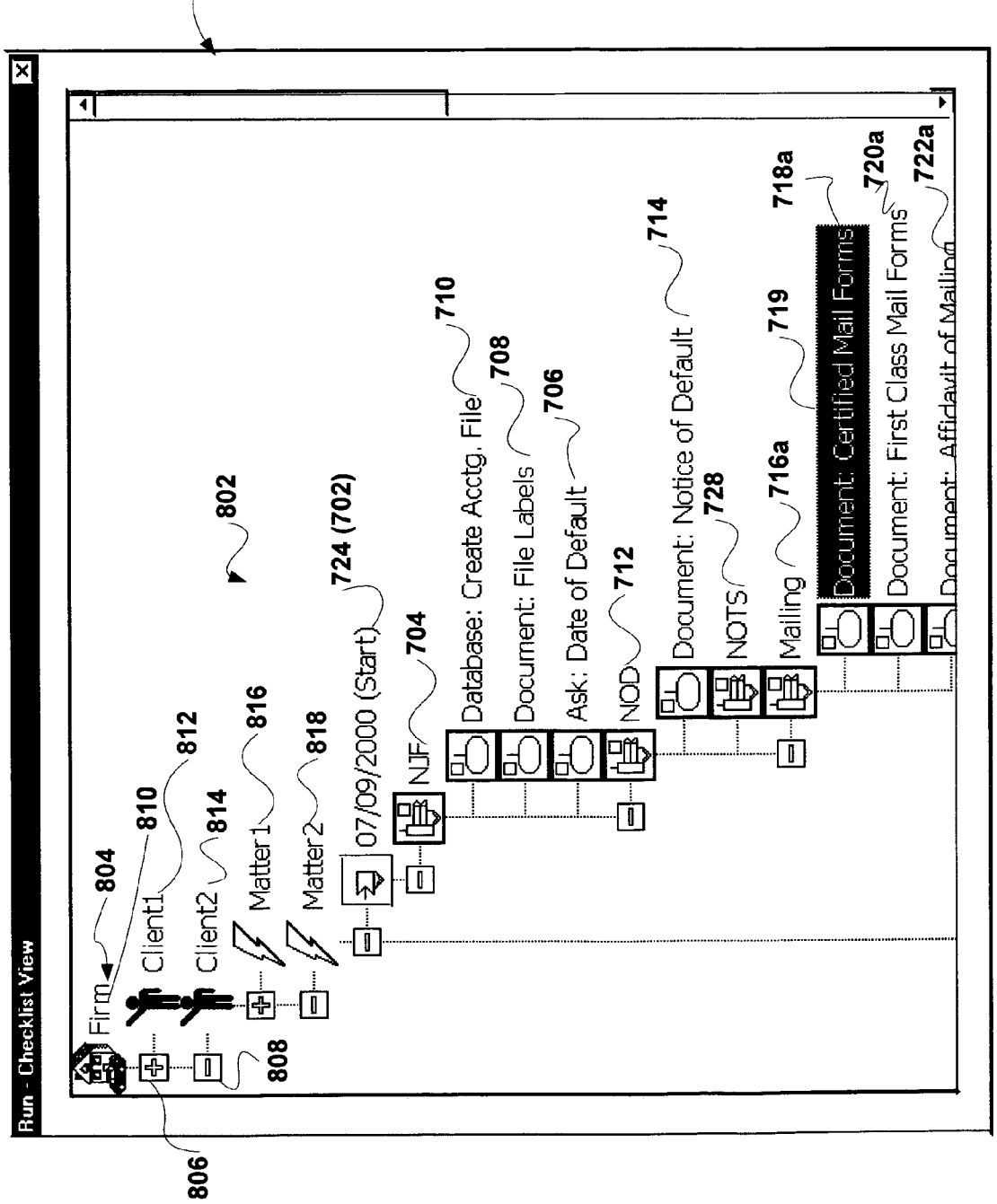
FIGS. 8A–C are a pictorial representation illustrating a checklist view of the exemplary bolt in accordance with the present invention.
Figure 8B:
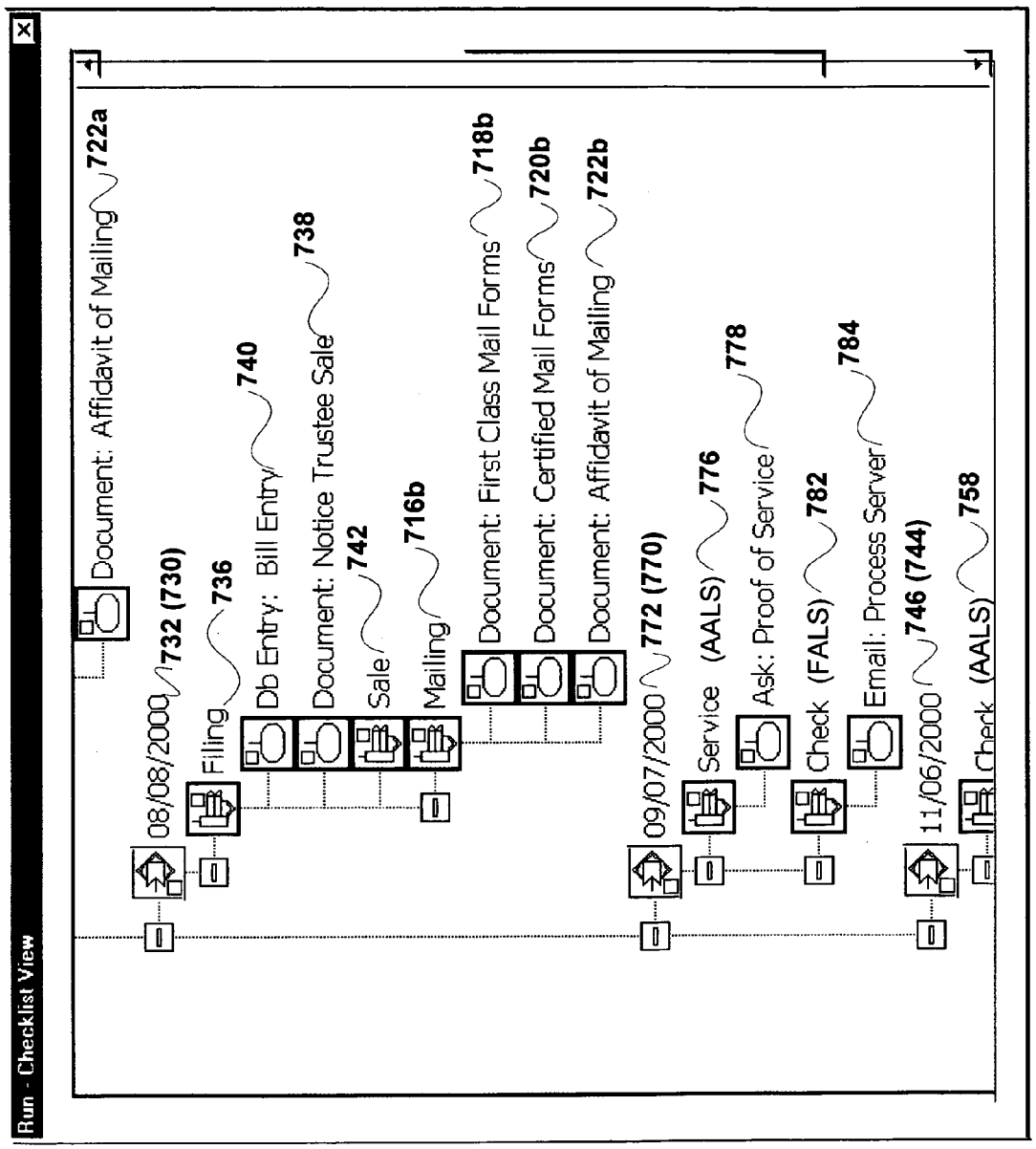
Figure 8C:
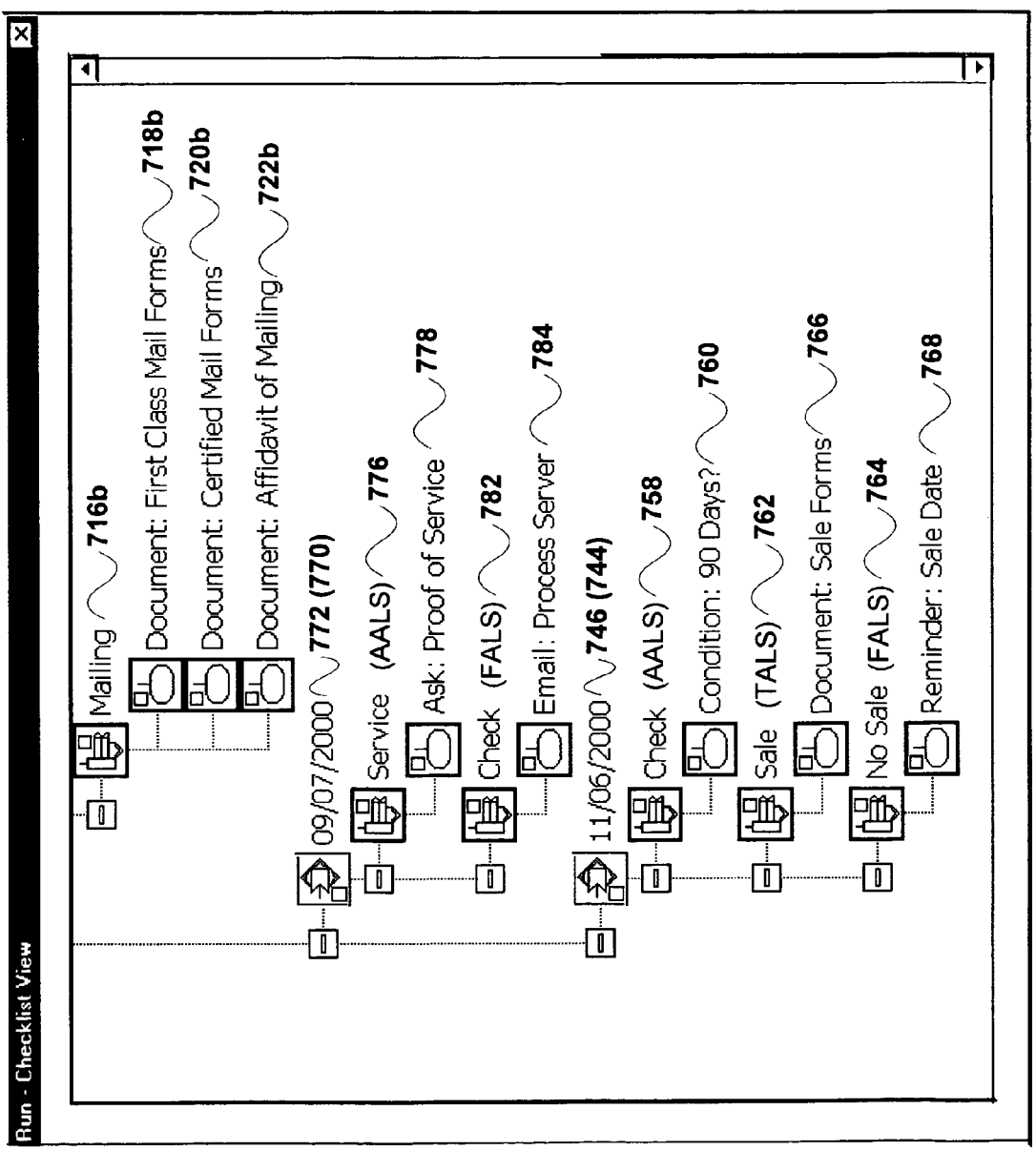

FIGS. 8A–C shows an alternate presentation of the example bolt 700 of FIGS. 7A–D in a checklist view 800. The checklist view 800 is generally displayed during the run mode of the present invention, but may also be used in other modes of the invention. In the checklist view 800, the example bolt is formatted as a checklist 802 from which a user observes and interacts with the progress of the sequence of tasks handled by the bolt 700 as it is being run.

The contents of the checklist view 800 may be filtered depending on the scope of the information that the user wishes to see at any one time. For instance, the checklist view 800 may be configured to display only active components (see the discussion of the Activate method below), not to display the AL and only the AC objects, etc. For the purposes of this example, FIGS. 8A–C show a checklist for the entire firm 804 with certain nodes collapsed (+) 806 and the example bolt 700 expanded (−) 708 by use of handles provided for that purpose. In actual embodiment of the invention, the checklist view 800 is constructed using a TreeView control provided by Visual Basic for Applications. The checklist view can be constructed in a number of other ways without including the functionality of nodes provided by the TreeView, for instance, by simply formatting the checklist into a Text box.

In the example firm checklist 804, the firm 810 may have a plurality of clients 812 and 814. Each client 812, 814 may have a plurality of matters 816, 818. The matters 816, 818 correspond to separate copies of the bolt 700 (FIGS. 7A–D)

or completely different bolts having different subject matters (e.g. bolt 244; FIG. 2). By default, the checklist view 800 is displayed in place of the bolt view 210 in FIG. 2. Additional matters may be added to the client 812 or 814 by dragging a copy of a bolt (in this case NJF 242) from the store window 208 and dropping the bolt 242 on the client 814 in the checklist view 800. Additional bolts 242, 244, 246 may also be added through sub menus accessible through menu bar 202. Similarly, individual components or customized actions from store 216 may be added as described above Returning to FIG. 8A, Matter2 818 corresponds to an instance of the bolt 700 shown in FIGS. 7A–D. The identifying numbers of the components in the bolt shown in FIGS. 7A–D similarly identify the same components in the checklist 802. As in the Bolt view 210, the ActionDates 702, 730, 770, 770 are sorted from the earliest date to the latest date. AD components that share common dates are added to the same DateSpaces 724, 732, 746 and 772 (AD's 702, 730, 770, 770, respectively).

The Start AD 702 is a child node of the DateSpace 724 (FIG. 8A). The NJF AL 704 is a child node of the Start AD 702. AC's 706, 708, 710 and NOD AL 712 are child nodes of the NJF AL 704. AC 714 and AL's 716a and 728 are child nodes of the NOD AL 712. AC's 718a, 720a and 722a are child nodes of the Mailing AL 716a. The AD 730 is a child node of the DateSpace 732 (FIG. 8B). The Filing AL 736 is a child node of the DateSpace 732. AC's 738, 740 and AL's 742 and 716b are child nodes of the Filing AL 736. AC's 718b, 720b and 722b are child nodes of the Mailing AL 716b. The AD 770 is a child node of the DateSpace 772 (shown in both FIGS. 8B and 8C). The Service AL 776 and Check AL 782 are child nodes of the DateSpace 772. The AD 744 is a child node of the DateSpace 746 (shown in both FIGS. 8B and 8C). The Check AL 758, Sale AL 762 and No Sale AL 764 are child nodes of the DateSpace 746. AC's 760, 766 and 768 are child nodes of AL's 758, 762 and 764, respectively. The type of ALS collection (AALS, TALS, FALS, CALS) that the AL is attached to may be used to filter which AL's are displayed in the checklist 804.

In FIG. 8A, the Document: Certified Mail Forms AC 718a is shown as selected. If the AC 718a is not configured to execute automatically on the ADate of AD 702, or the user wishes to otherwise manually activate the AC 718, this may be done by selection with a mouse (e.g., double clicking the object), selecting a toolbar item from toolbar 204, or selecting a menu item from menu 202. Selection in this manner triggers the execute method of the AC 718a, which executes in a pre-configured manner, such as by displaying a pop-up user interface that requests confirmation to perform the action. Example AC execute methods are discussed in detail below.

Object Model

Figure 9:
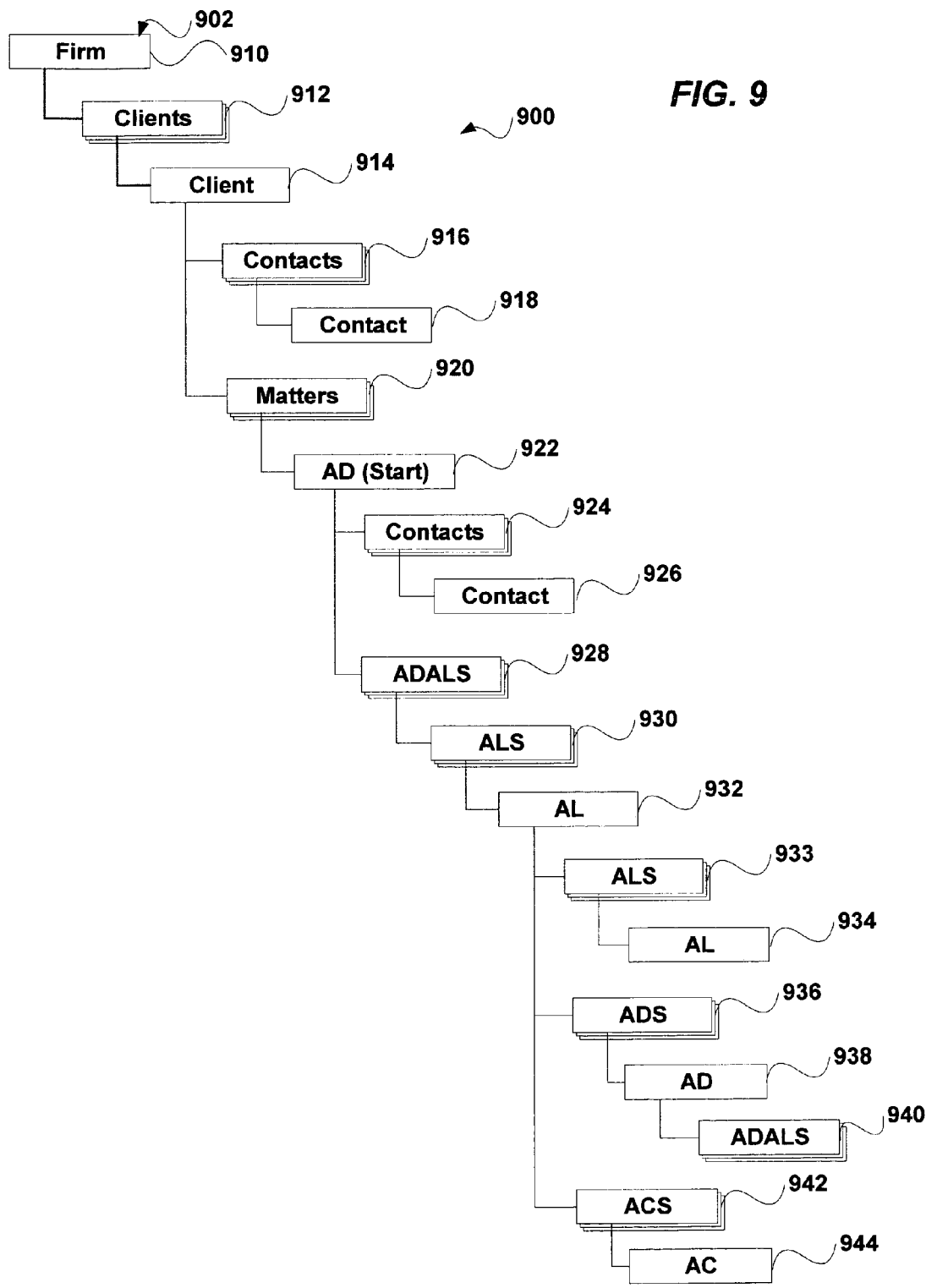
FIG. 9 is a pictorial representation of an application object model in accordance with the present invention.

An object model 900 provided by the present invention is illustrated in FIG. 9. An object is a discrete programming entity that includes both routines (methods) and data (properties). The objects and object model of the present invention incorporate such principles as abstraction, concurrency, encapsulation, hierarchy, persistence, polymorphism and typing. The objects of the present invention may be accessed and used by other processes in accordance with industry standards such as COM and DCOM. A collection object has one or more child objects. Object theory is well known in the art, as are alternate programming methods in which to implement the present invention, and will not be discussed further herein.

The object model is organized in the form of a bolt 902, with each object having a single parent and each parent having one or more child objects. Each object can be the root of a child bolt. For example, the root of the bolt 700 shown in FIG. 7A is a Start object 902. The root of the bolt 902 is a Firm object 910, which includes properties that identify the company or firm such as firm name, firm address and telephone, etc. The Firm object 910 has a Clients collection object 912. The Clients collection object 912 has one or more Client objects 914 that each includes properties that identify a client such as a client number, the client's business name, business address and business telephone, etc. The Clients collection object 916 has one or more Contact objects 918 that each includes properties that identify a contact (e.g., an employee) such as a contact number, the contact's name, address and business telephone, etc.

Each Client object 914 also has a Matters collection object 920. The Matters collection object 920 has one or more Matter objects 922, which in this bolt 902 are AD objects (FIG. 12). A Start object 922 is a subclass of an AD object that includes properties relevant to a matter, such as a matter number, matter title, etc. The Start object 922 can have sub-collections of objects that are specific to the matter, for instance, a Contacts collection 924 that has one or more Contact objects 926. Each AD object 922 has an action date action lists collection (ADALS) 928 that has one or more ActionList collections (ALS) 930. The types of ALS collection objects 930 owned by the ADALS 928 are shown in FIG. 12.

Figure 20:
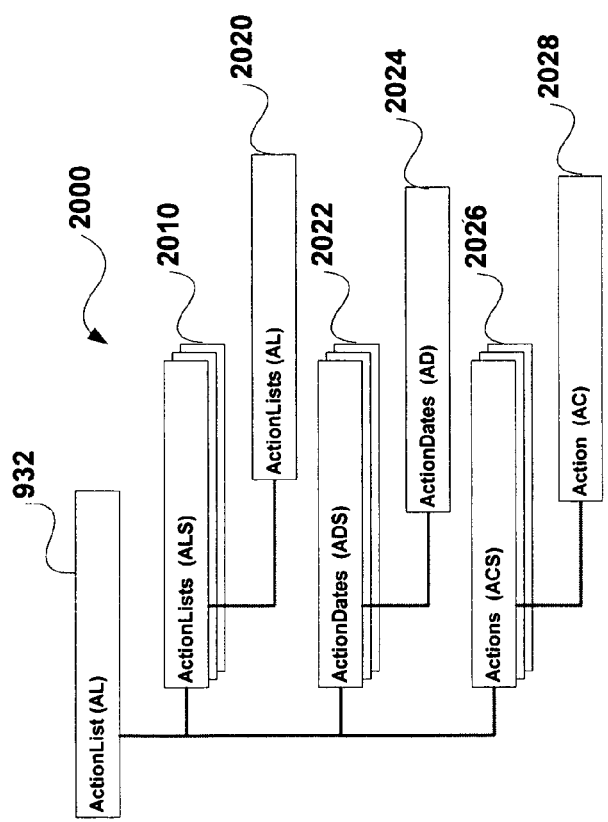
FIG. 20 is a pictorial representation of an object model for an ActionList component in accordance with the present invention.
Figure 25:
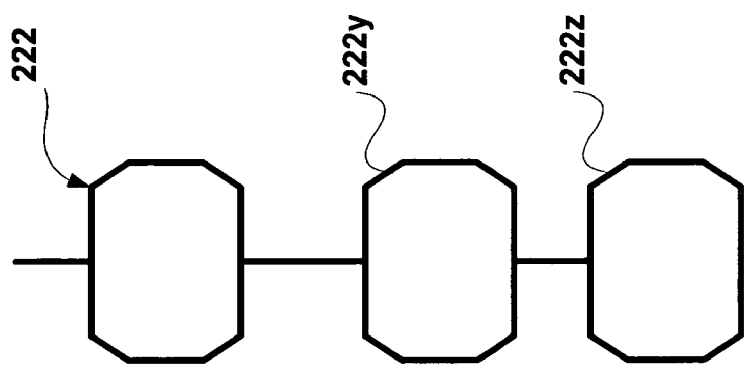
FIG. 25 is a pictorial representation of the graphic connection of components that can be made to an Action component in accordance with the present invention.

Each ALS collection object 930 has one or more ActionList objects (FIG. 20). Each ActionList object 932 has an ALS collection object 933 that, in turn, has one or more AL objects 934. The AL object 932 also has an ActionDates collection object (ADS) 936 that is the parent to one or more AD objects 938. Each AD object 938 has an ADALS collection object 940. The AL 932 has an Actions collection object (ACS) 942 that is the parent to one or more Action (AC) objects 944 (FIG. 25). Like name objects are instanced from the same class. The AD objects 922 and 938 correspond to the graphic AD 218 (FIG. 2), the AL objects 932 and 934 correspond to the graphic AL 220 (FIG. 2) and the AC object 944 corresponds to the graphic AC 222 (FIG. 2).

Since any child object in the bolt can discover any property from an ancestor (parent, parent's parent, etc.) by recursively climbing the bolt, an instance of the bolt carries with it a great deal of information which is centralized in relevant objects. These properties may be customized in instances of the bolt. For example, a matter number which is changed in every instance of Matter object 922 may be used together with a client number from the Client object 914 which would remain unchanged relative to each Matter object 922 to which it is a parent. Properties can be combined (e.g. a client number property from a Client object 914 and a matter number property from the Matter object 922) to retrieve information from a central database (e.g., 142; FIG. 2).

Detailed Component Descriptions

ActionDate

Figure 10:
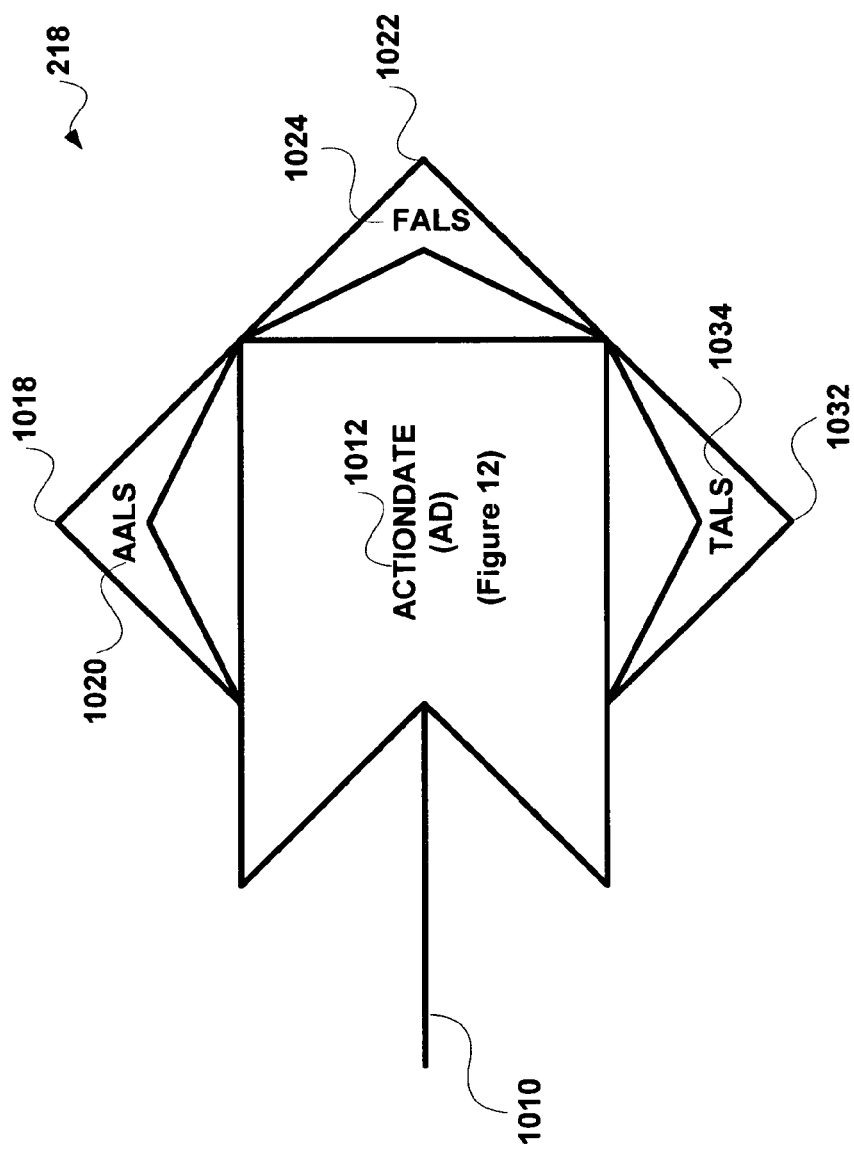
FIG. 10 is a pictorial representation of an ActionDate component shown as a graphic in accordance with the present invention.
Figure 18:
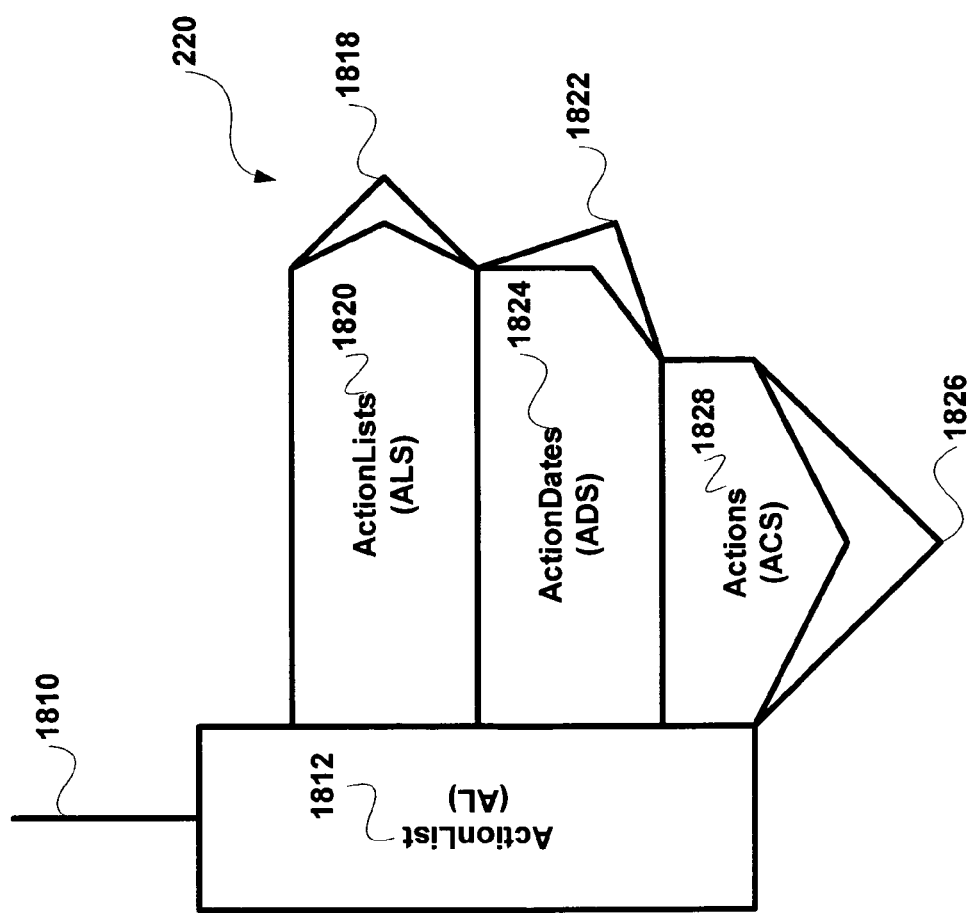
FIG. 18 is a pictorial representation of an ActionList component shown as a graphic in accordance with the present invention.

The graphic AD 218 (FIG. 2) is shown in more detail in FIG. 10. The graphic AD 218 has a connector 1010 that is used to graphically connect the graphic AD 218 and its underlying AD object 1012 to other components. The graphic AD 218 has various regions that are associated with the ALS collection objects of the underlying AD object 1012 (see FIG. 12). AALS region 1018 is associated with the ALS collection object (AALS type) 1018, FALS region 1022 is associated with the ALS collection object 1020 (FALS type) and TALS region 1032 is associated with the ALS collection object (TALS type) 1034. The graphic AD 222 may be altered to accommodate Custom ALS collections (CALS) and preferably should similarly give some indication of where to look for attached to components in the display pattern (see below). When a connector from another component (e.g. 1810; FIG. 18) intersects a region 1018, 1022 or 1032, the underlying object of that other component is added to the collection object associated with that region 1020, 1024 and 1034, respectively.

FIG. 11A illustrates the connection of graphic components to the graphic AD 218. Using connectors (e.g., 1810a and 1810b), zero of more AL graphic components (e.g., 220a and 220b) may be attached to the AALS region 1018 of the graphic AD 218. AL graphic components 220a–b that are attached to the AALS region 1018 are inverted and displayed above the graphic AD 218, with the first AL graphic 220a sharing the same position along an x-axis as its parent AD 218 and the next AL graphic 220b moving to the next position along the axis, etc. Using connectors (e.g., 1810c and 1810d), zero of more AL graphic components (e.g., 220c and 220d) may be attached to the TALS region 1032 of the graphic AD 218. The AL graphic components 220c–d that are attached to the TALS region 1018 are displayed below the graphic AD 218, with the first AL graphic 220c sharing the same position along an x-axis as its parent AD 218 and the next AL graphic 220d moving to the next position along the axis, etc. Zero or more AL graphic components (e.g., 220e and 220f) may be attached using their connectors (e.g., 181e–f) to the FALS region 1022 of the graphic AD 218 and are displayed below the graphic AD 218, with the first AL graphic 220e occupying the next position along the x-axis that follows the last AL graphic 220d attached to the TALS region 1032. As illustrated in FIG. 31, any progeny (i.e., child, child's child, etc.) attached to the AL 220a–f is given the next position on the x-axis before the next AL is graphed for that region.

Figure 11B:
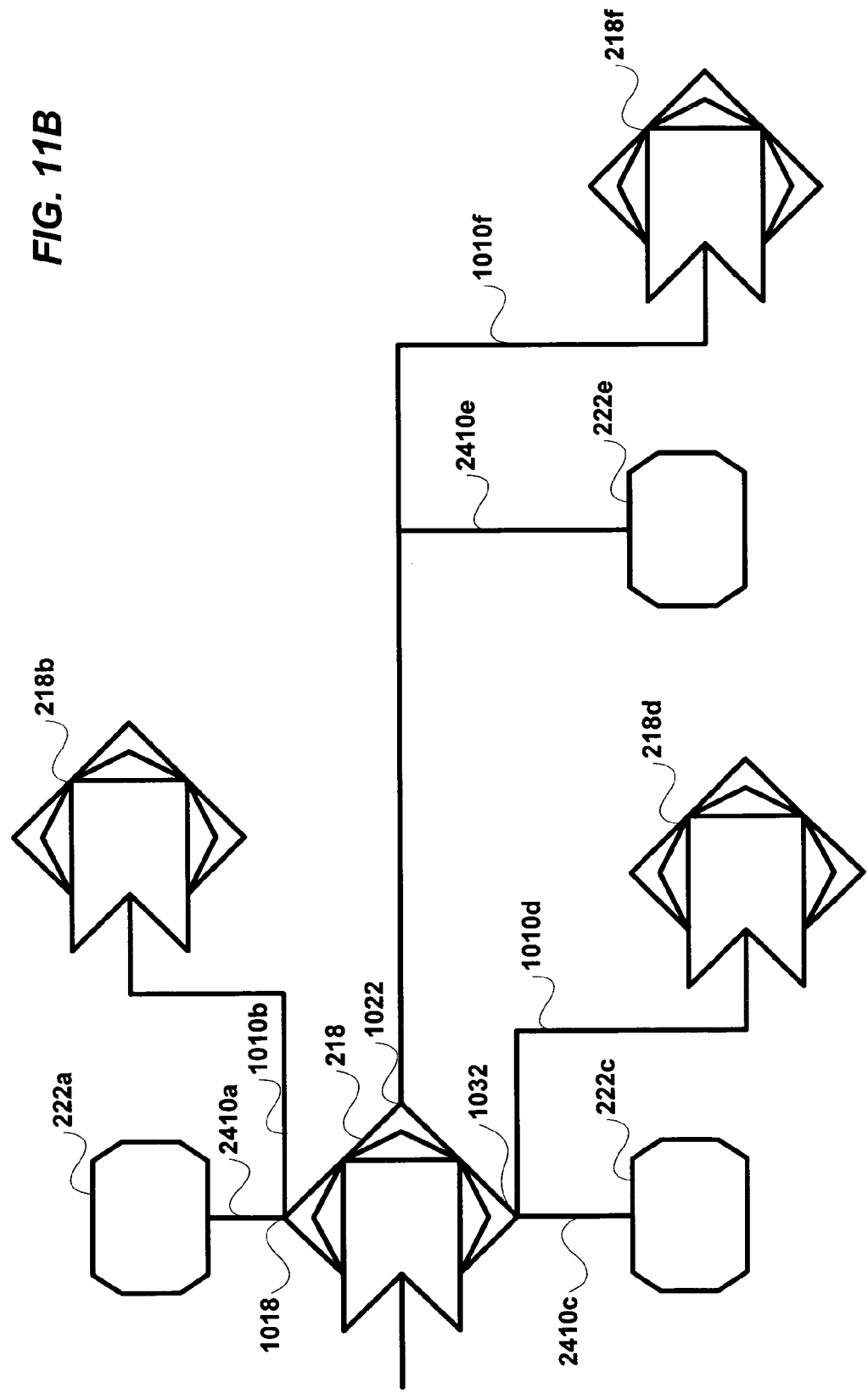
FIG. 11B is a pictorial representation of an alternate graphic connection of components that can be made to an ActionDate component in accordance with the present invention.

FIG. 11B illustrates an alternate the connection of graphic components to the graphic AD 218. This alternate connection pattern is used when AL graphic components 220 are not used. Each of the regions 1018, 1022 and 1032 may have attached to it zero or more AC graphic components (e.g., 222a, 222c, 222e) using their connectors (e.g. 2410a, 2410c, 2410e). Similarly, each of the regions 1018, 1022 and 1032 may have attached to it zero or more AD graphic components (e.g., 218b, 218d, 222f) using their connectors (e.g. 1010b, 2410d, 2410f). AC graphic components 222a that are attached to the AALS region 1018 are inverted and displayed above the graphic AD 218, with the first AC graphic 222a sharing the same position along an x-axis as its parent AD 218 and the next AC graphic appearing above the previous AC graphic 222a, etc. AD graphic components 218b follow after the AC's 222a are graphed. AC graphic components 222c that are attached to the TALS region 1032 are displayed below the graphic AD 218, with the first AC graphic 222c sharing the same position along an x-axis as its parent AD 218 and the next AC graphic appearing below the previous AC graphic 222c, etc. AD graphic components 218d follow after the AC's 222a are graphed. AC graphic components 222e that are attached to the FALS region 1022 are displayed below the graphic AD 218, with the first AC graphic 222e being graphed in the next position on the x-axis that follows the last AD graphic 218d and the next AC graphic appearing below the previous AC graphic 222e, etc. AD graphic components 218f follow after the AC's 222a are graphed.

Figure 12A:
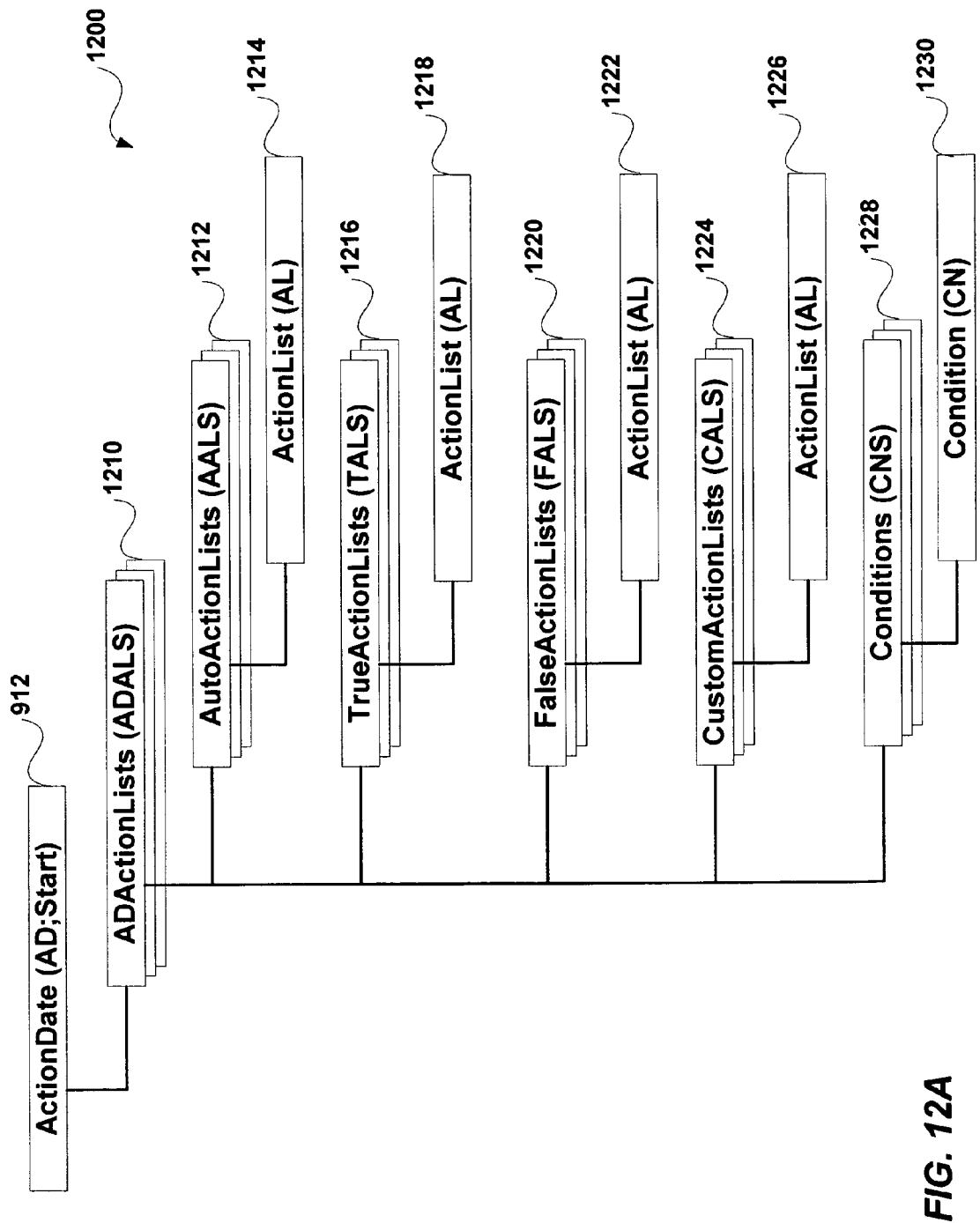
FIG. 12A is a pictorial representation of an object model for an ActionDate component in accordance with the present invention.
Figure 22:
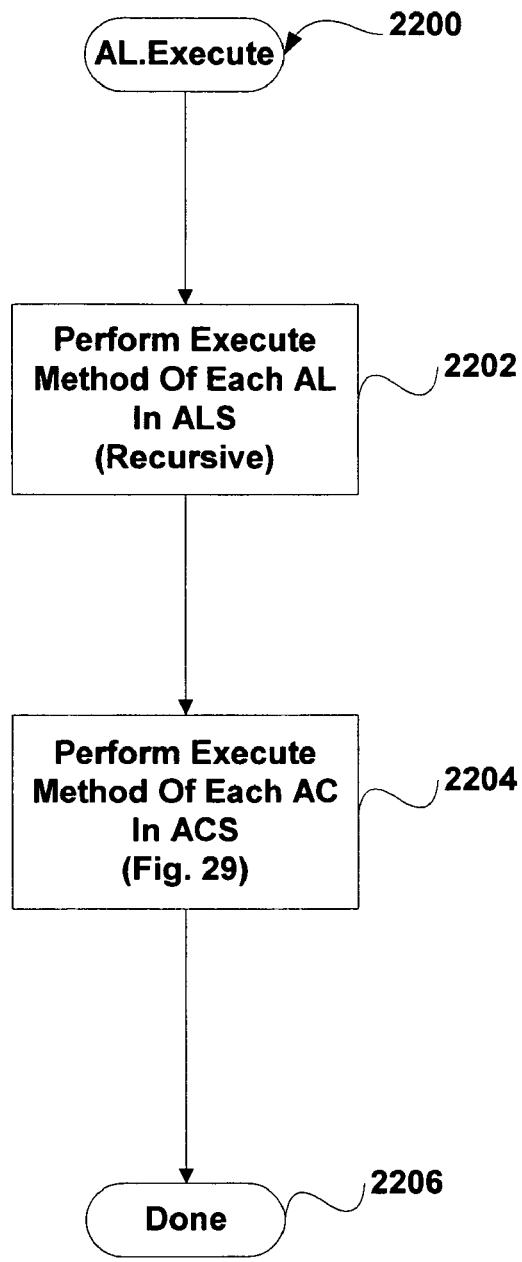
FIG. 22 is a functional flow diagram illustrating an Execute method of the ActionList component in accordance with the present invention.

An object model 1200 for the AD object 912 is illustrated in FIG. 12A. An ActionDate ActionLists collection object (ADALS) 1210 is a child of the AD object 912. The ADALS 1210 has one or more ActionList collection objects 930 that may be of different types. In an embodiment of the invention, the ADALS 1210 has as children: an AutoActionLists collection object (AALS) 1212, a TrueActionLists collection object (TALS) 1216, a FalseActionLists collection object (FALS) 1220, and zero or more CustomActionLists collection objects (CALS) 1224. Each of these ALS objects 1212, 1216, 1220 and 1224 has as children zero or more AL objects 1214, 1218, 1222 and 1226, respectively. The AD object 912 has a Conditions collection object (CNS) 1228 as a child. The CNS can have zero or more child Condition objects (CN) 1230. As discussed below with reference to FIG. 14, conditions 1230 may be used to determine which, if any, of the ALS collection objects 930 in the ADALS that should be executed (FIG. 22).

Figure 12B:
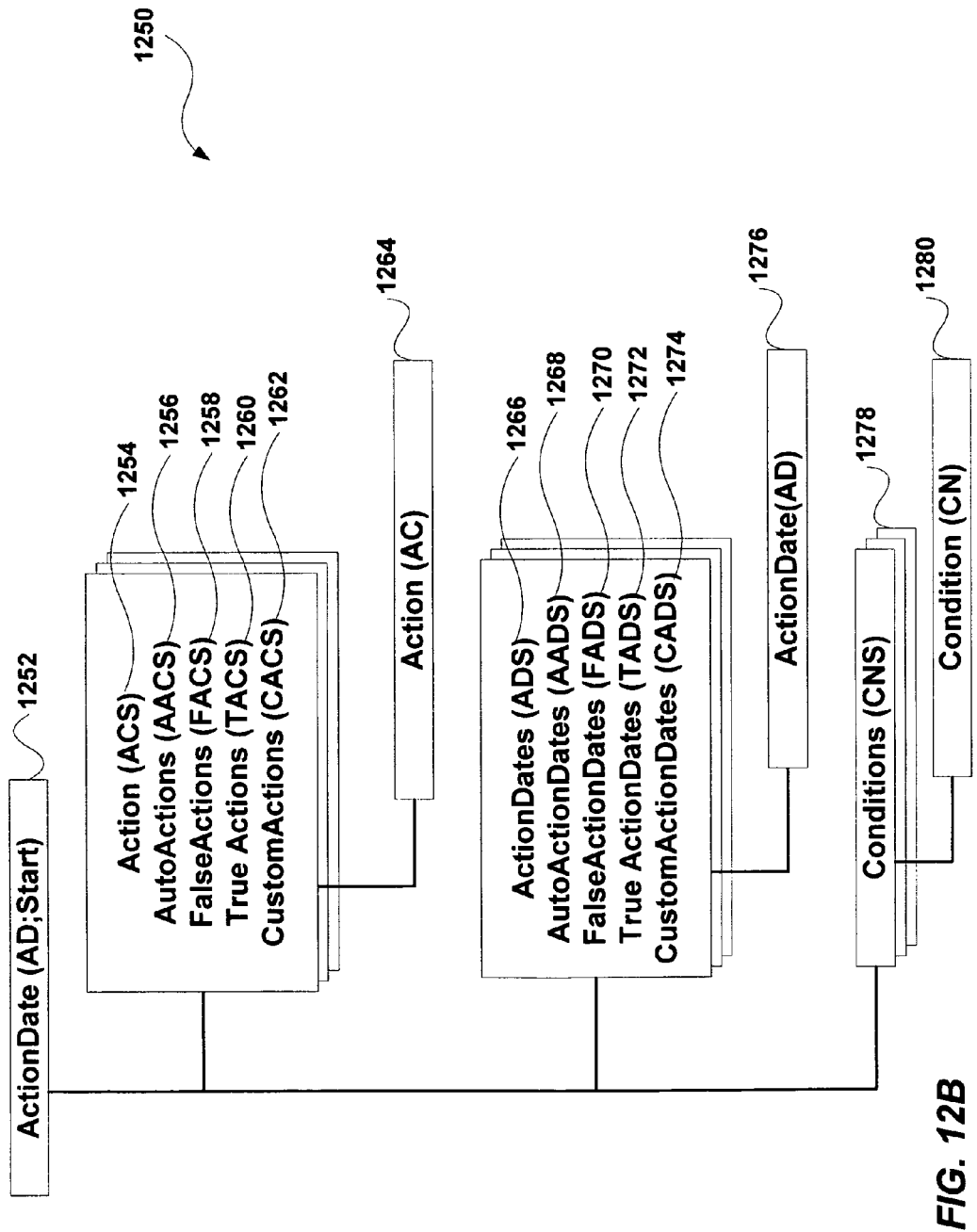
FIG. 12B is a pictorial representation of an alternate object model for an ActionDate component in accordance with the present invention.

An alternate object model 1250 for the AD object 912 that does not use AL 932 and ActionList collection objects 930 is illustrated in FIG. 12B. An ActionDate object 1252 has one or more collections of Actions which may be a general ACS 1254, or of types used by the conditions method to determine which to execute: e.g., AutoActions (AACS) 1256, FalseActions (FACS) 1258, TrueActions (TACS) 1260 and zero or more CustomActions (CACS) 1262. Each of these ACS objects 1254–1262 has zero or more AC objects 1264 as children. The ActionDate object 1252 may also have one or more collections of ActionDates which may be a general ADS 1266, or of types used by the conditions method to determine which to execute: e.g., AutoActionDates (AADS) 1268, FalseActionDates (FADS) 1270, TrueActionDates (TADS) 1272 and zero or more iCustomActionDates (CACS) 1274. Each of these ADS objects 1266–1274 has zero or more AC objects 1276 as children. The AD object 1252 has a Conditions collection object (CNS) 1278 as a child. The CNS 1278 can have zero or more child Condition objects (CN) 1280. As discussed below with reference to FIG. 14, conditions 1280 may be used to determine which, if any, of the ACS collection objects 1254–1262 and/or the ADS collection objects 1266–1274 in the ADALS that should be executed (FIG. 22).

Figure 13:
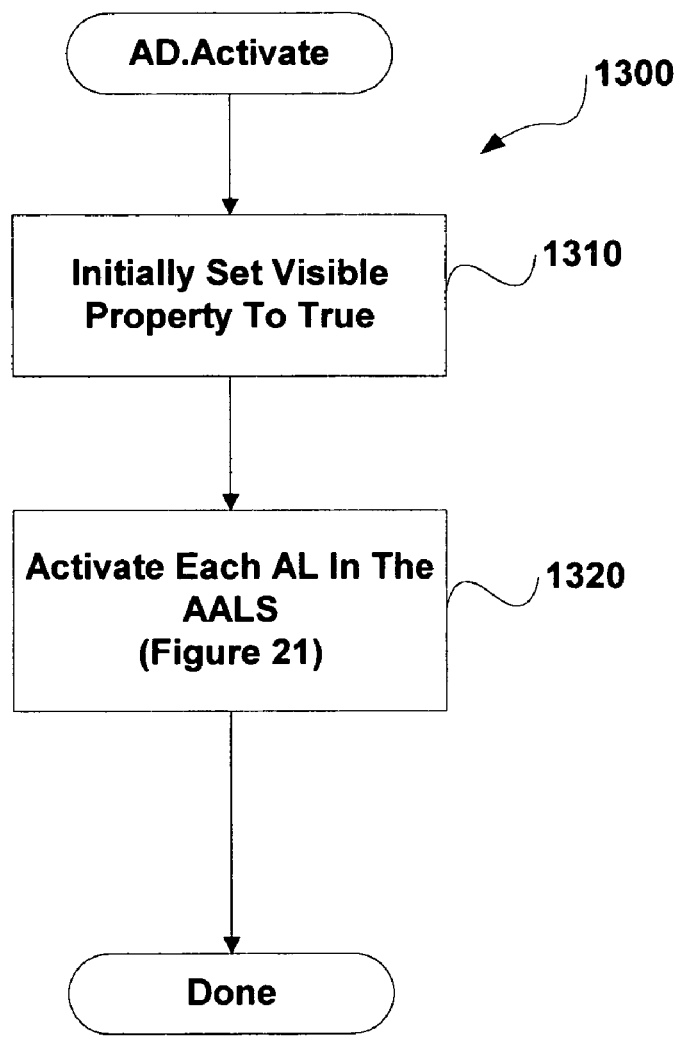
FIG. 13 is a functional flow diagram illustrating an Activate method of the ActionDate component in accordance with the present invention.

An Activate method 1300 of the AD object 922 is illustrated in FIG. 13. In a block 1310, the AD object is initially set to be visible. The visible property is used, among other things, for the filtering of objects to display in the checklist 800 (FIG. 8) and bolt views 210 (FIG. 2). Each AL in the AALS 1212 (FIG. 12) is then activated (FIG. 21) in a block 1320. The Activate method is then done 1330.

Figure 14:
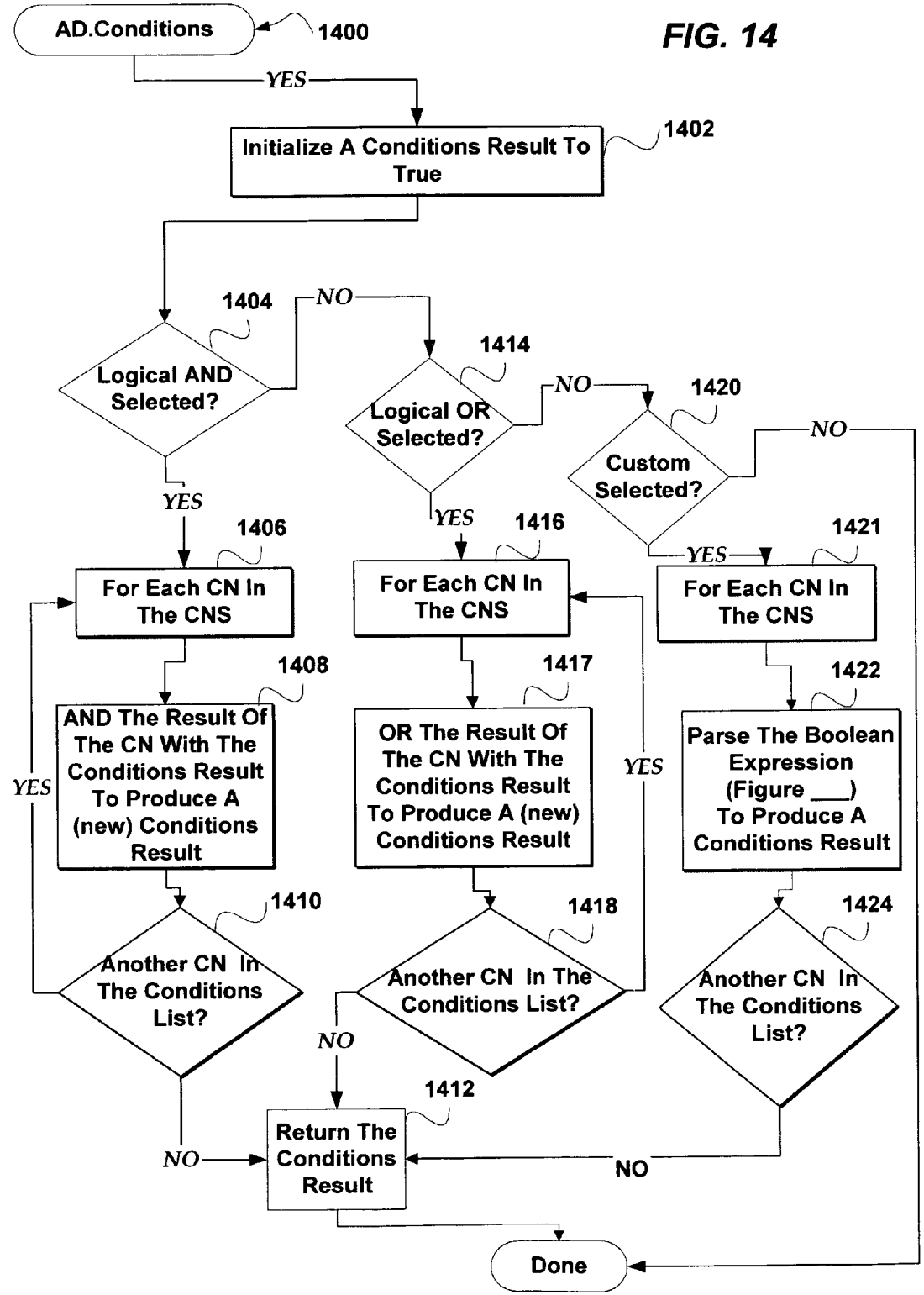
FIG. 14 is a functional flow diagram illustrating a Conditions method of the ActionDate component in accordance with the present invention.
Figure 15:
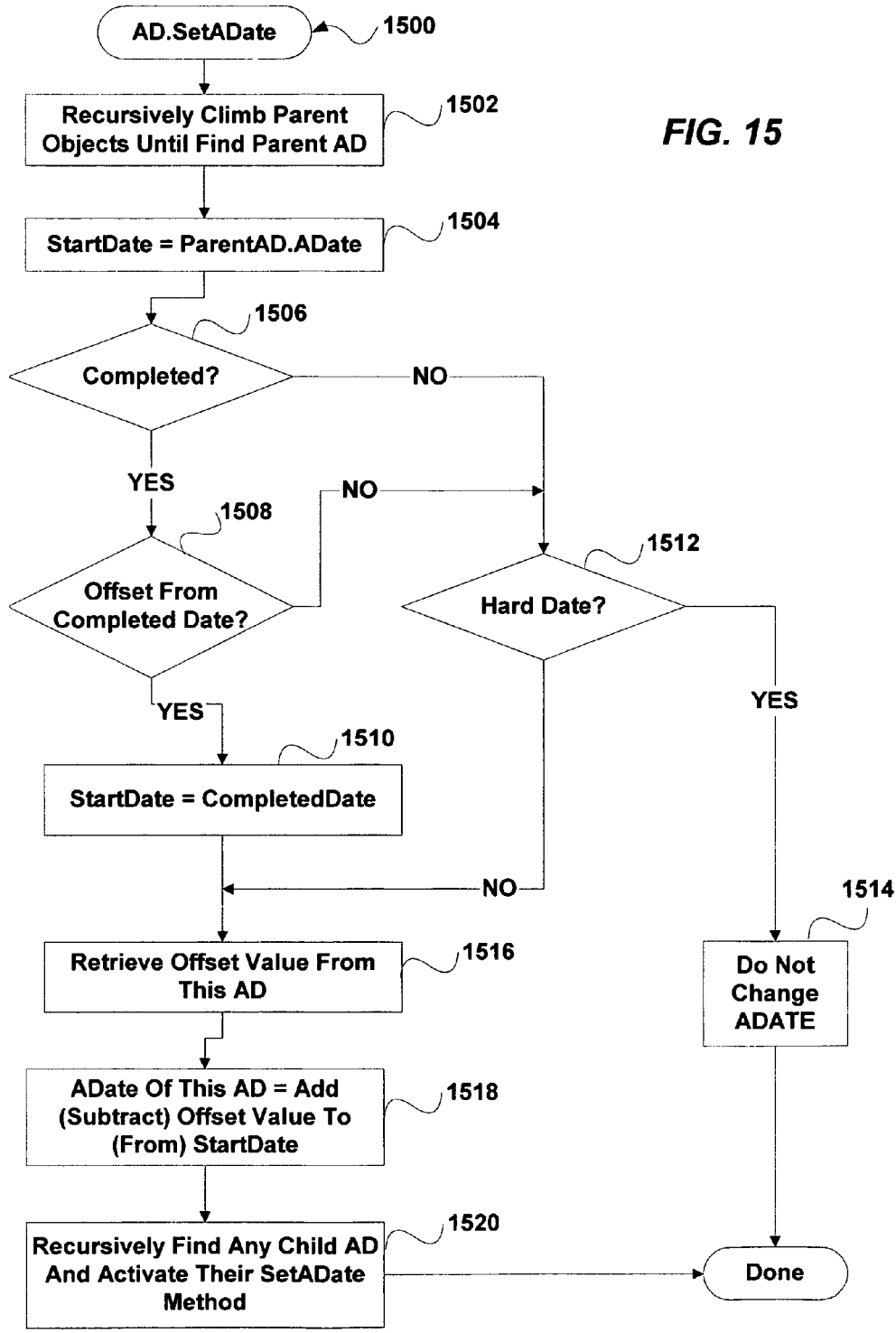
FIG. 15 is a functional flow diagram illustrating a SetADate method of the ActionDate component in accordance with the present invention.
Figure 30B:
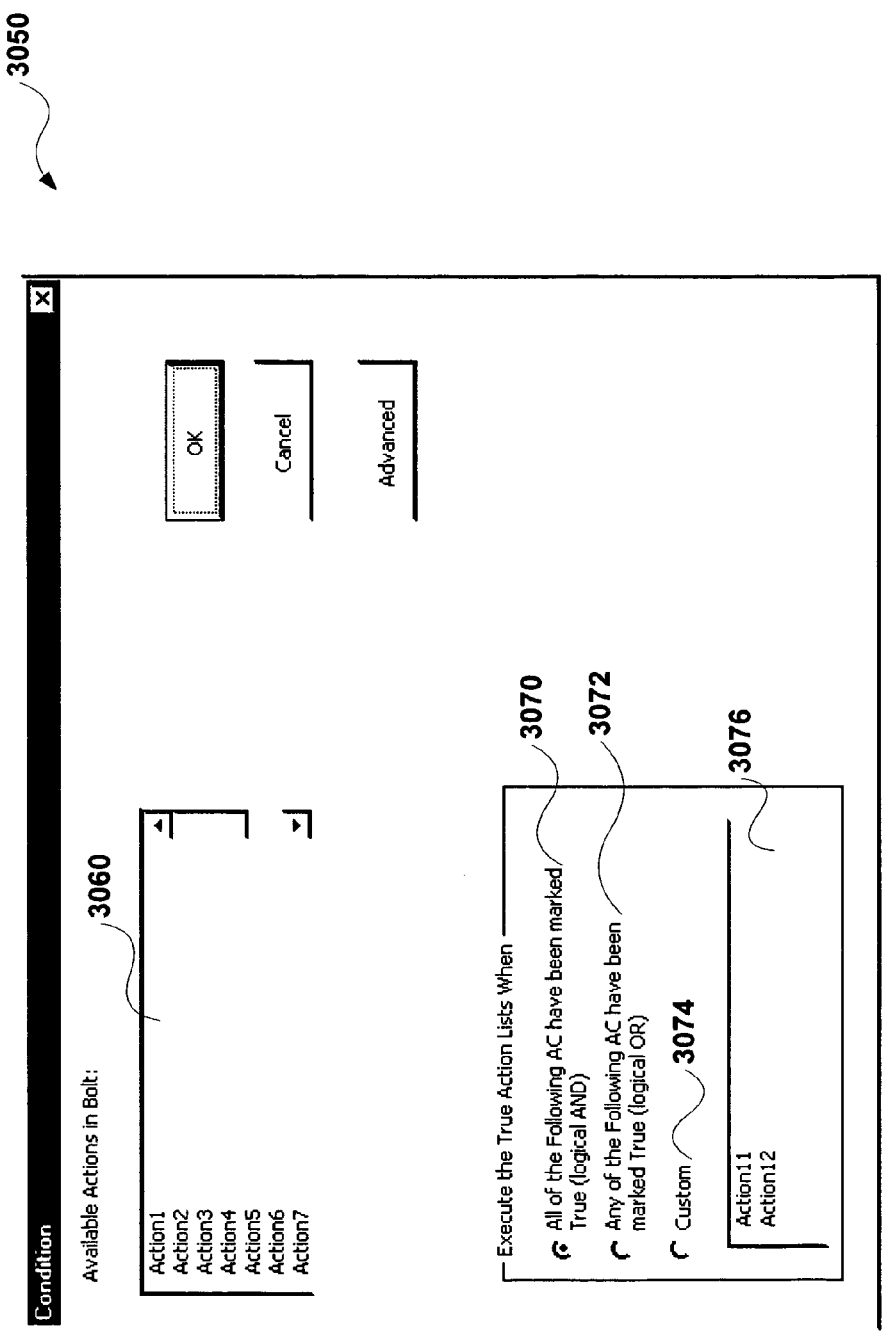
FIG. 30B is a pictorial representation of a user interface for configuring a Condition component in accordance with the present invention.
Figure 32:
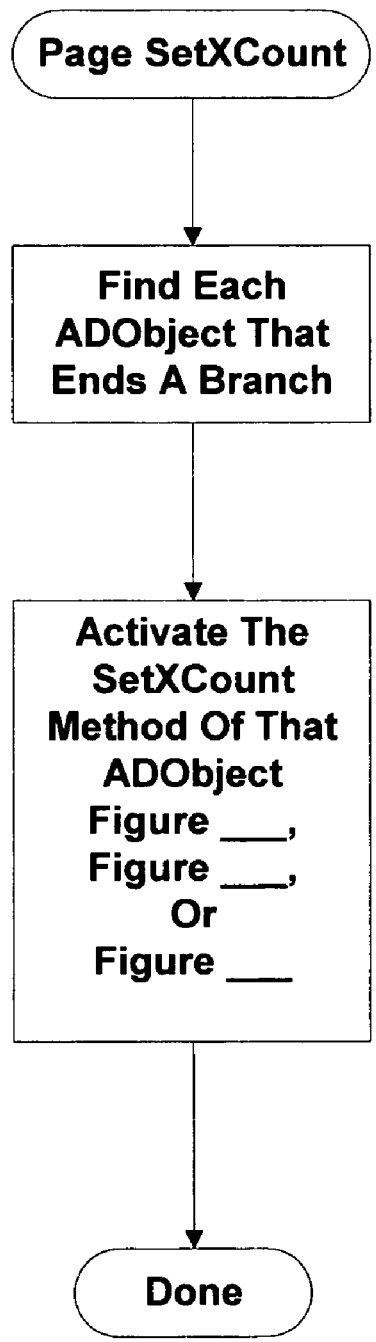
FIG. 32 is a functional flow diagram illustrating a SetX-Count method of a bolt display page in accordance with the present invention.
Figure 33:
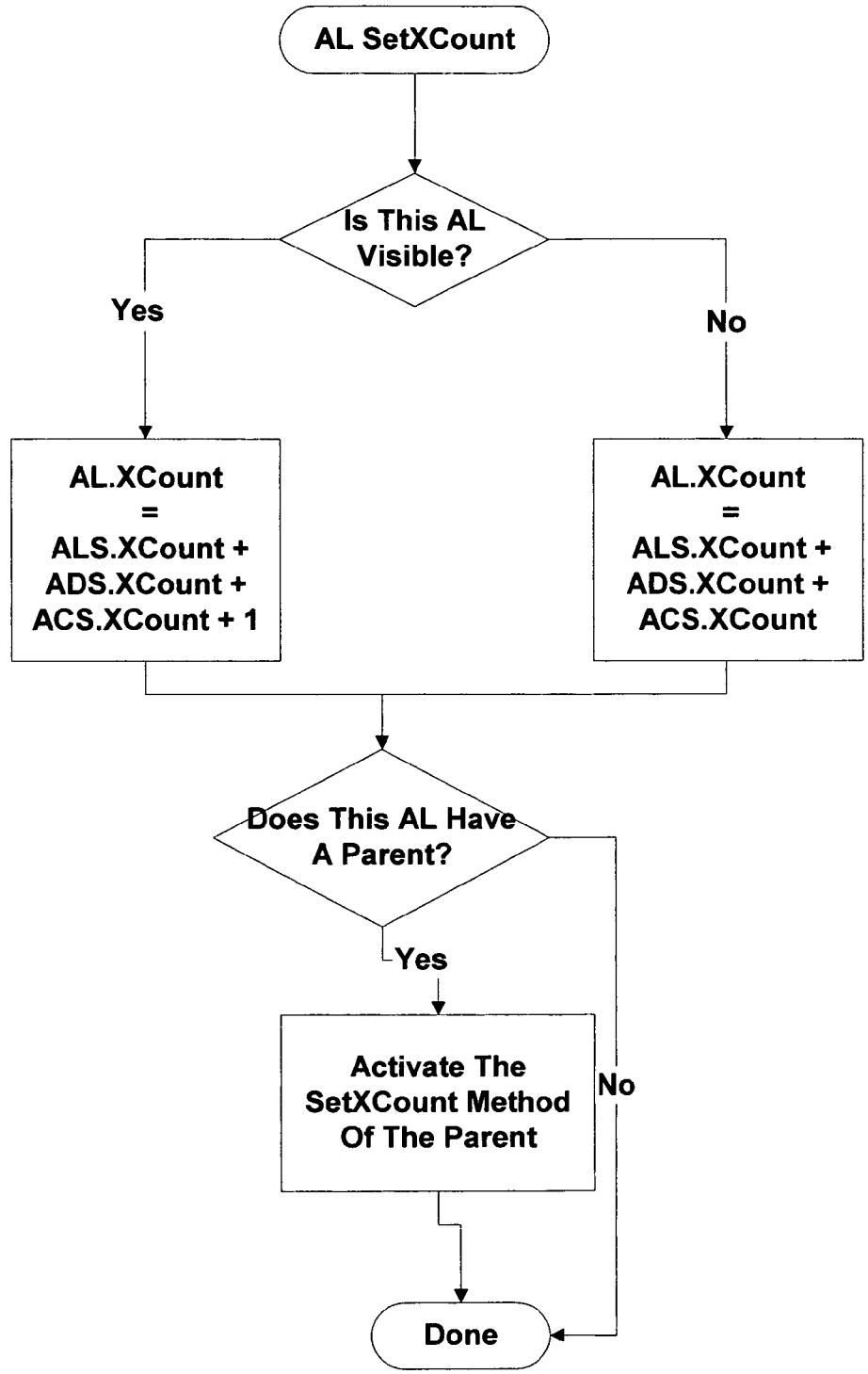
FIG. 33 is a functional flow diagram illustrating a SetX-Count method of an ActionList component in accordance with the present invention.
Figure 34:
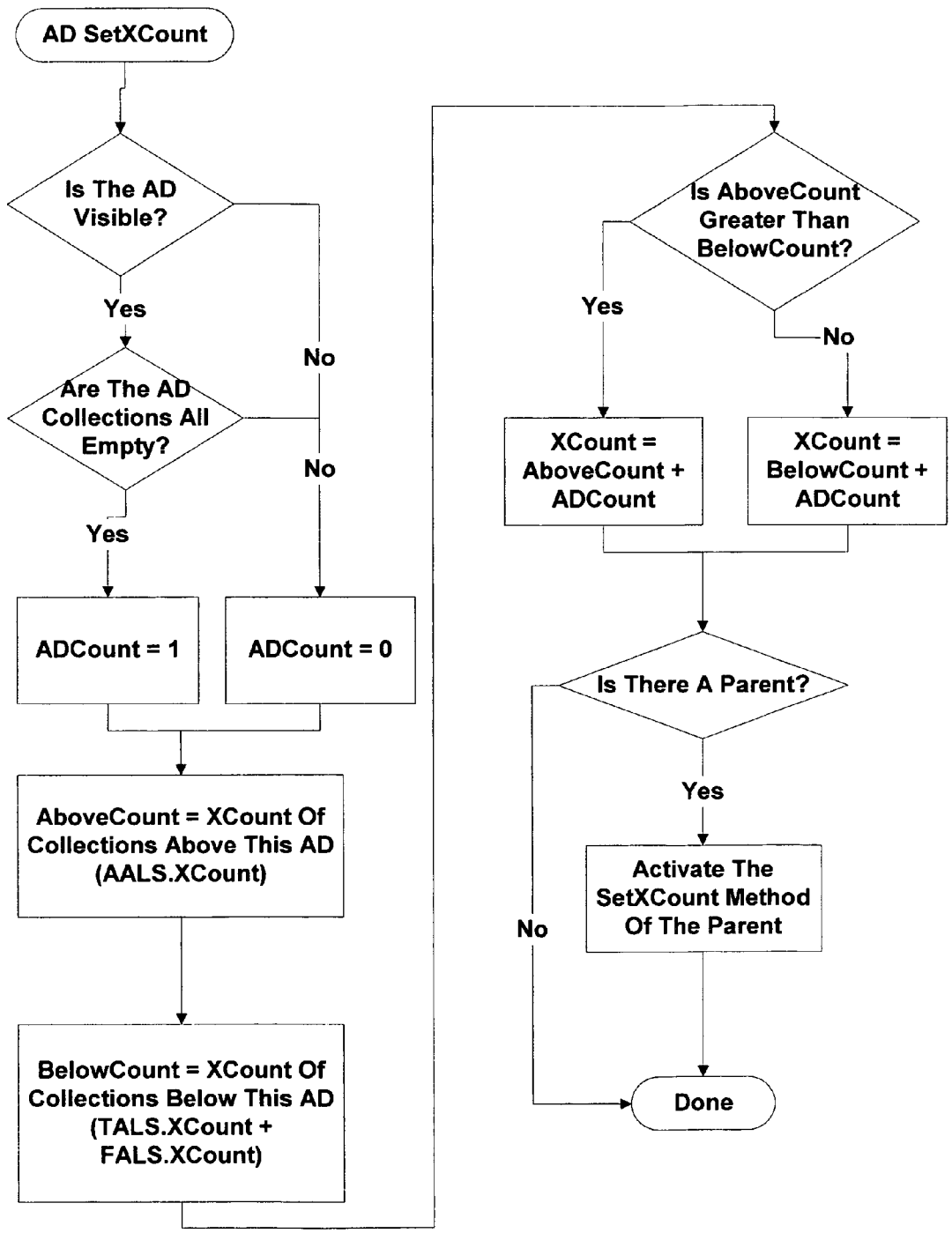
FIG. 34 is a functional flow diagram illustrating a SetX-Count method of an ActionDate component in accordance with the present invention.
Figure 35:
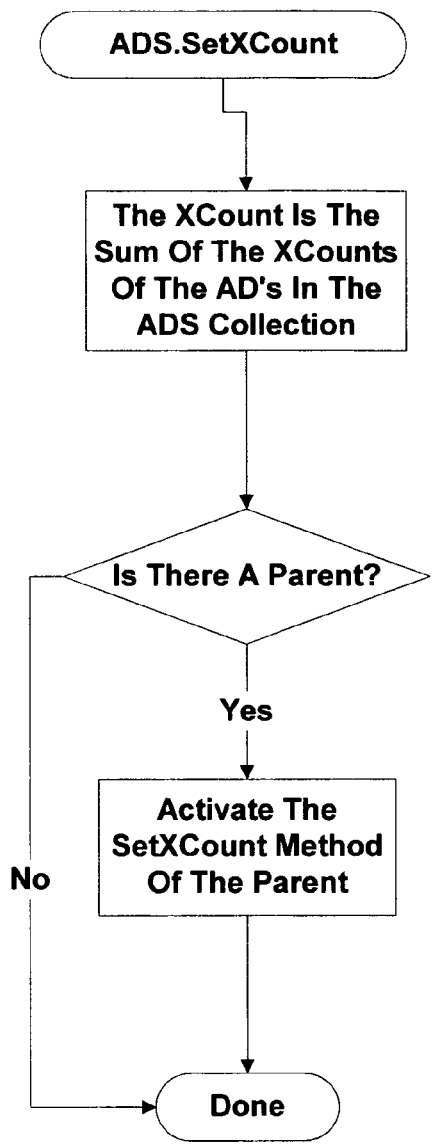
FIG. 35 is a functional flow diagram illustrating a SetX-Count method of a collection of ActionDate components in accordance with the present invention.
Figure 36:
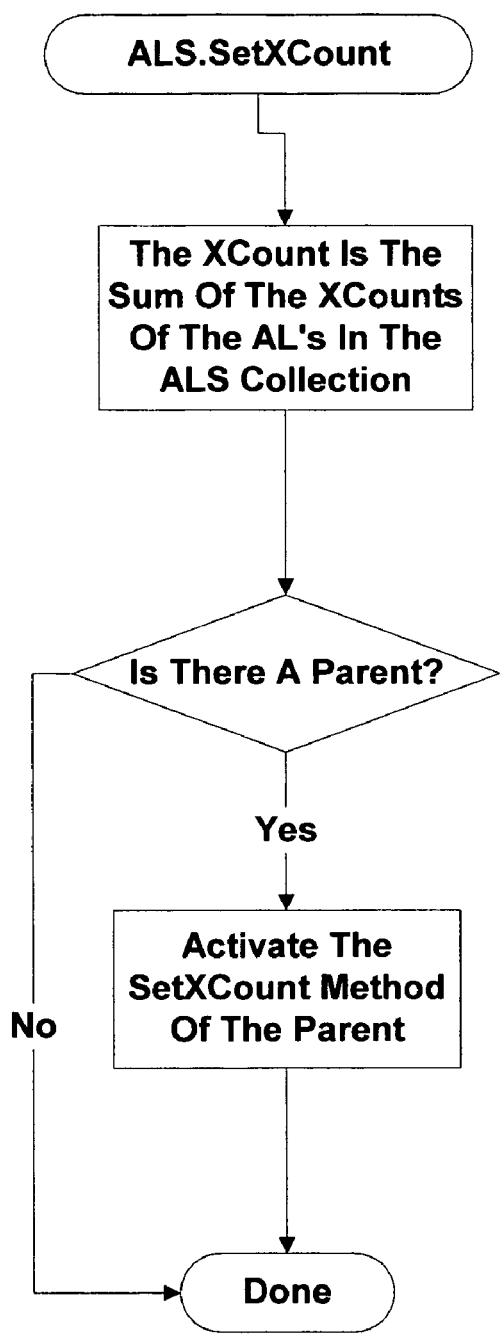
FIG. 36 is a functional flow diagram illustrating a SetX-Count method of a collection of ActionList components in accordance with the present invention.
Figure 37:
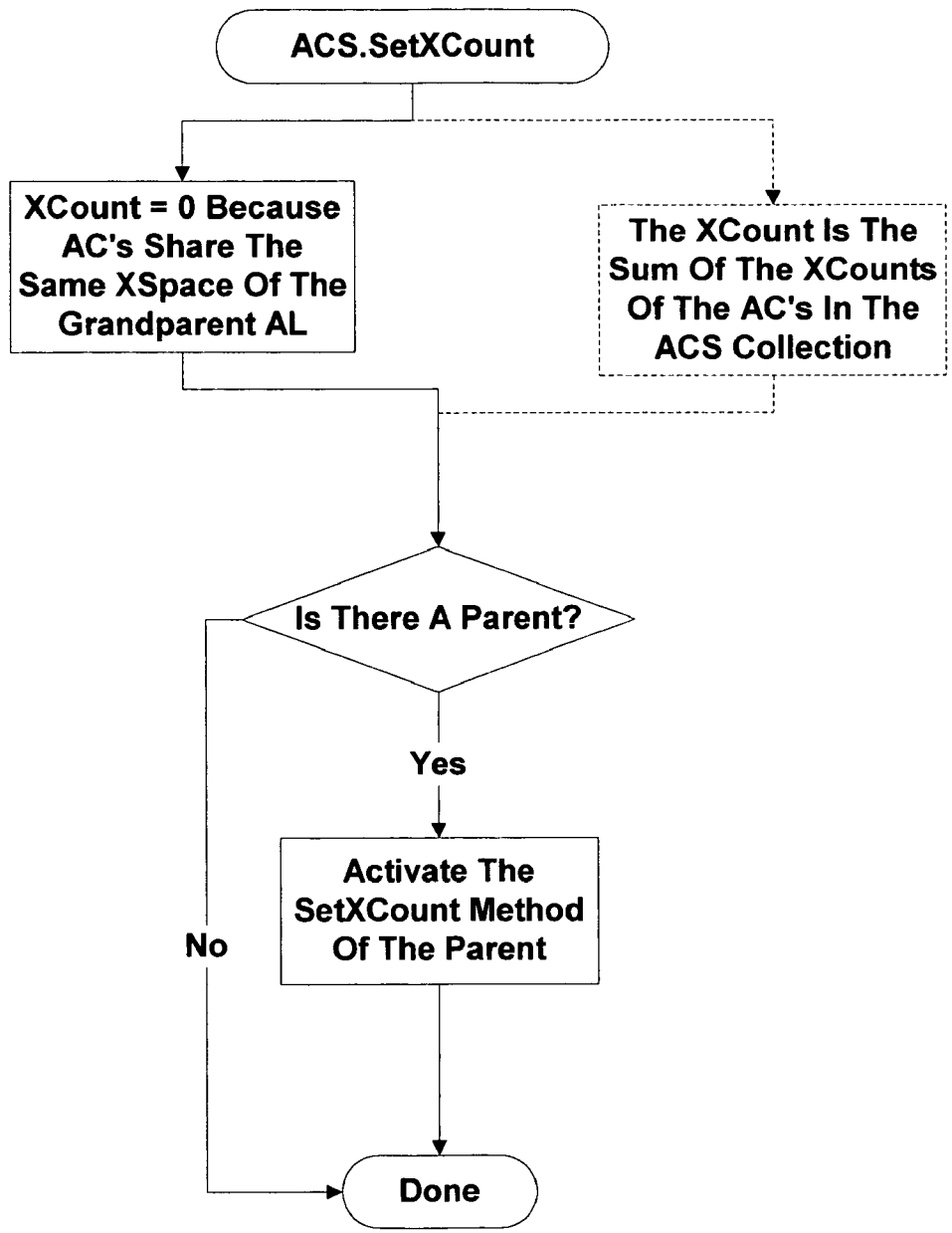
FIG. 37 is a functional flow diagram illustrating a SetX-Count method of a collection of Action components in accordance with the present invention.
Figure 38:
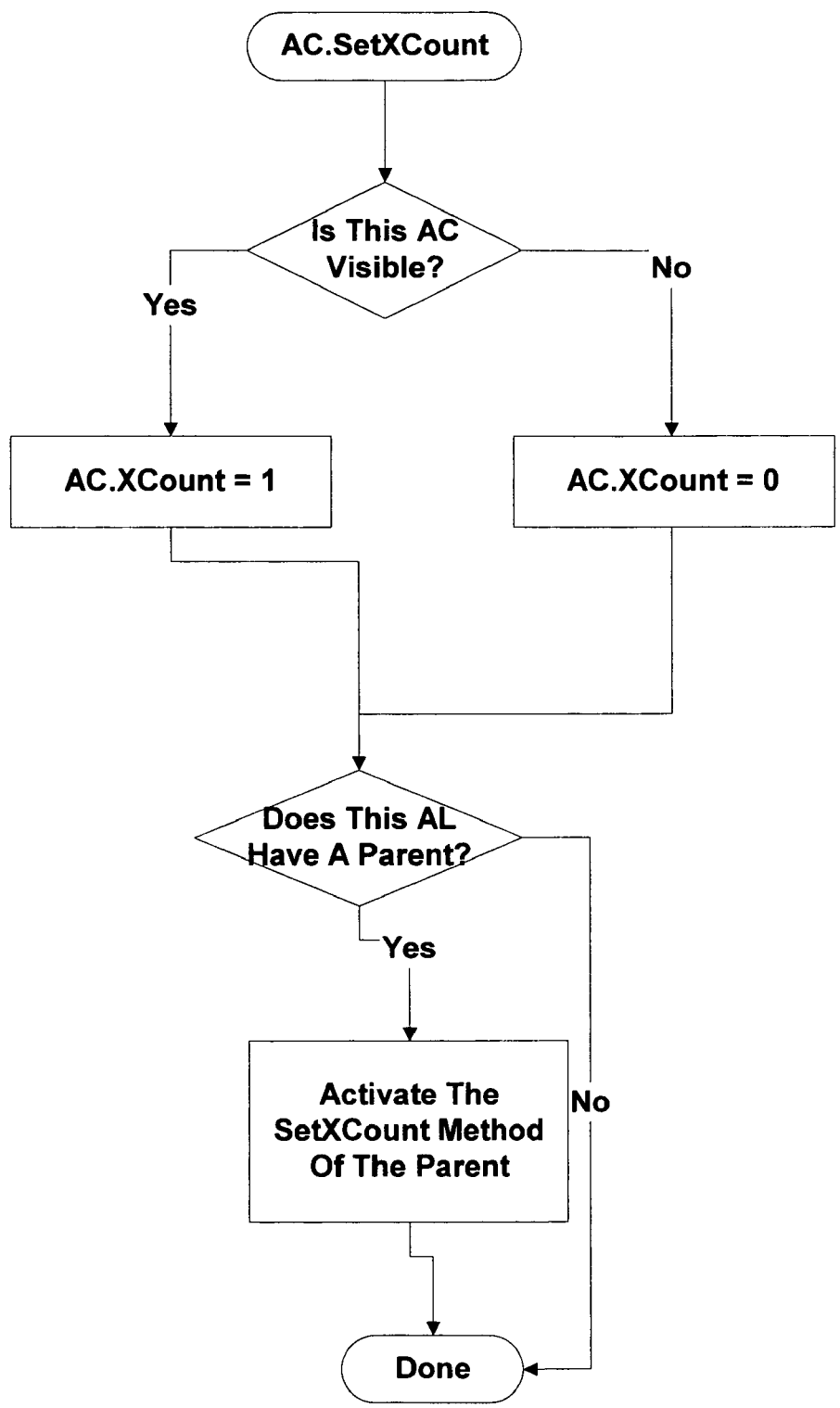
FIG. 38 is a functional flow diagram illustrating a SetX-Count method of an Action component in accordance with the present invention.
Figure 39:
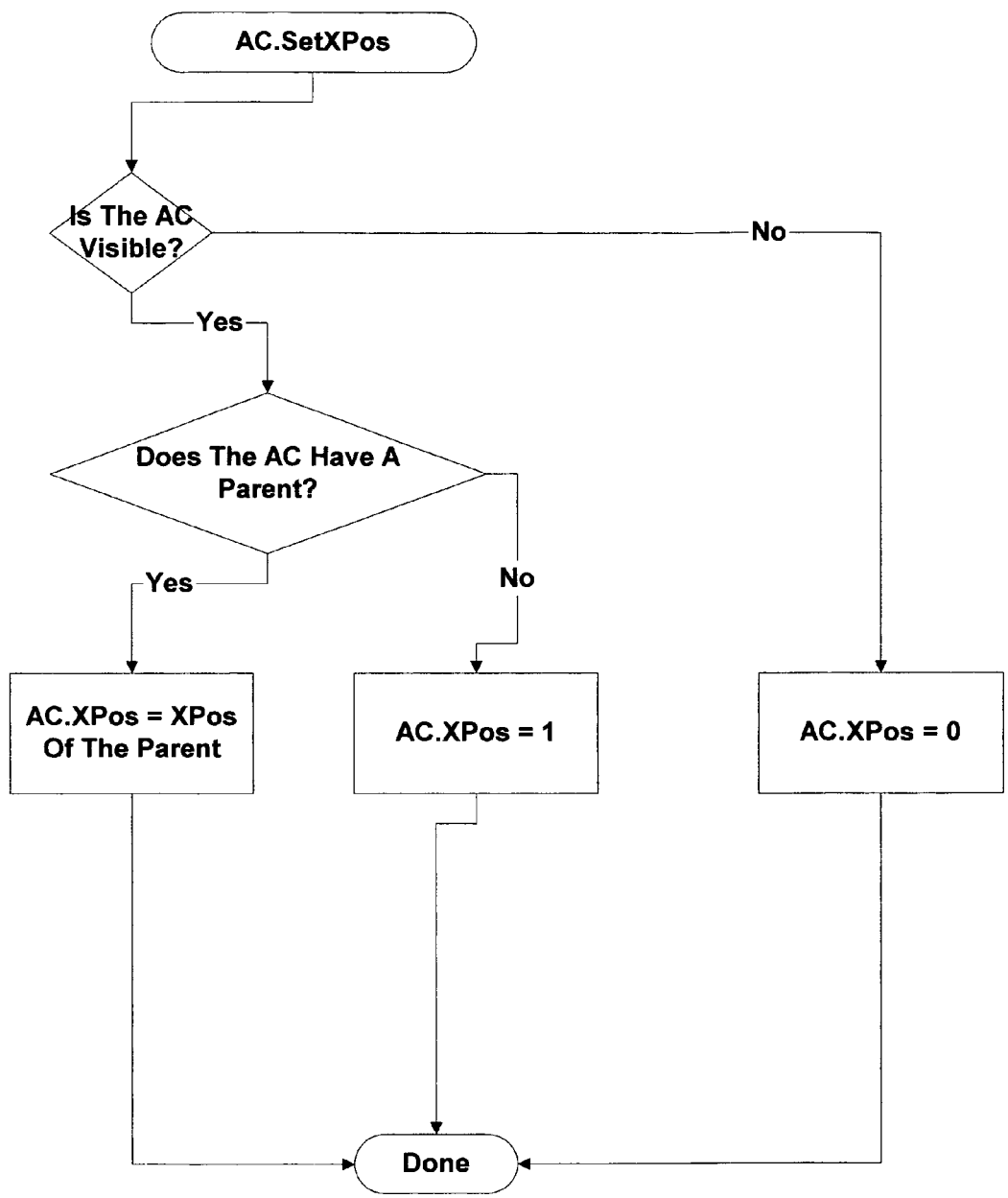
FIG. 39 is a functional flow diagram illustrating a SetX-Pos method of an Action component in accordance with the present invention.
Figure 40:
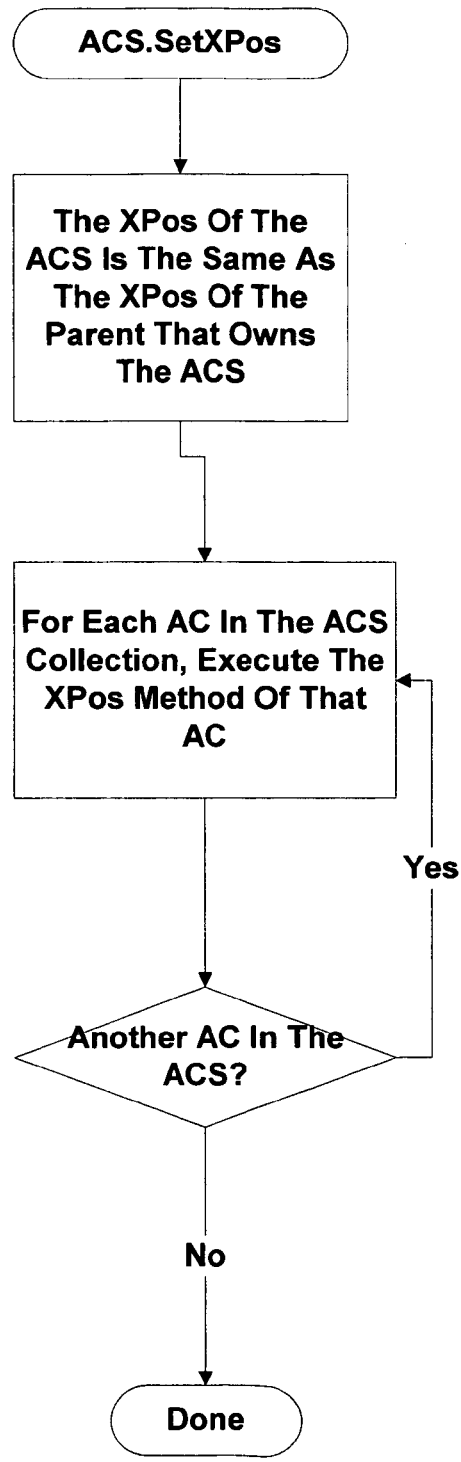
FIG. 40 is a functional flow diagram illustrating a SetX-Pos method of a collection of Action components in accordance with the present invention.
Figure 41:
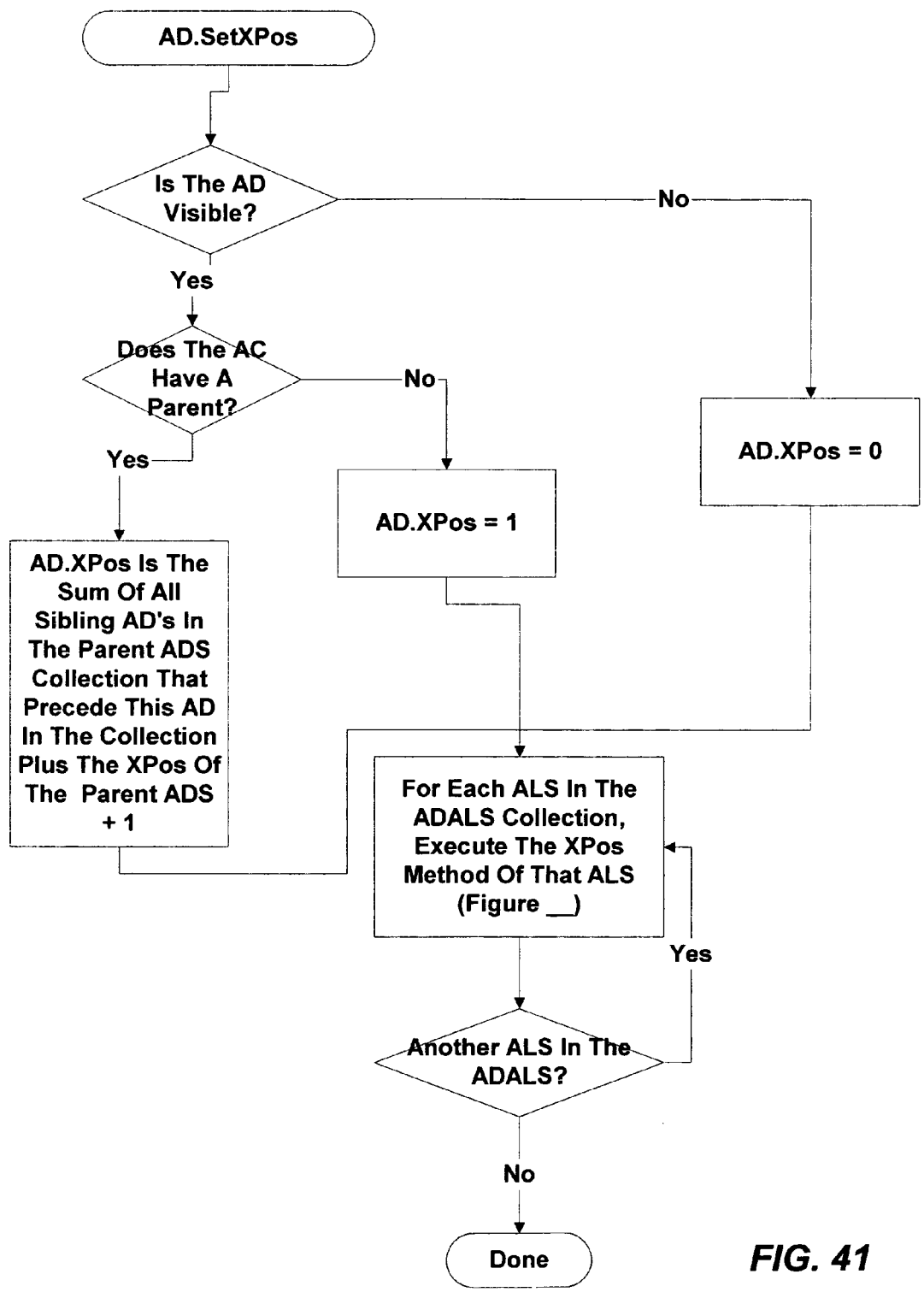
FIG. 41 is a functional flow diagram illustrating a SetX-Pos method of an ActionDate component in accordance with the present invention.
Figure 42:
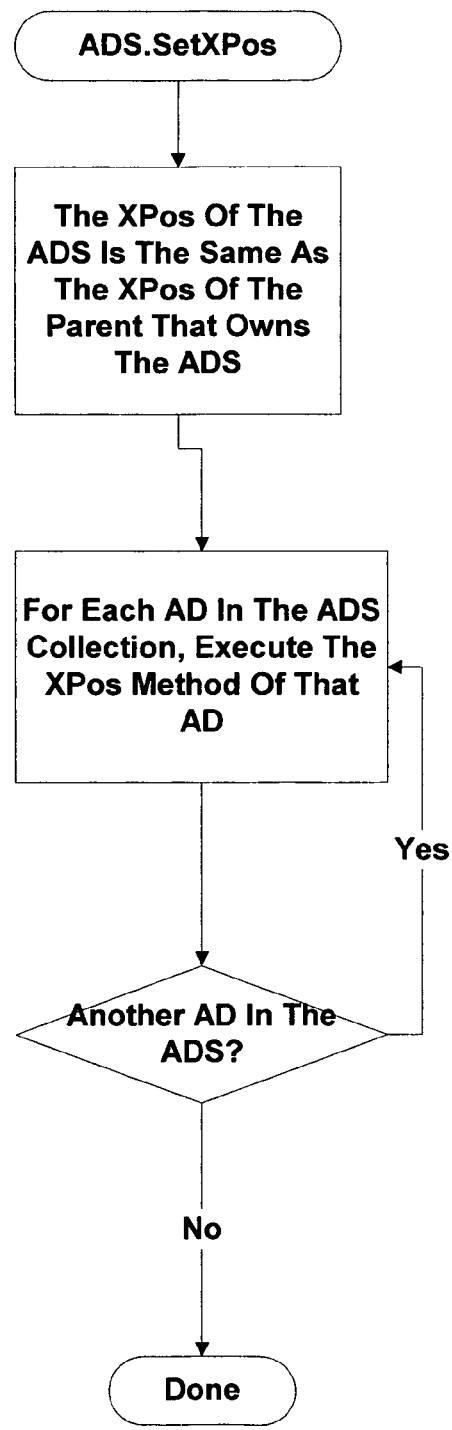
FIG. 42 is a functional flow diagram illustrating a SetX-Pos method of a collection of ActionDate components in accordance with the present invention.
Figure 43A:
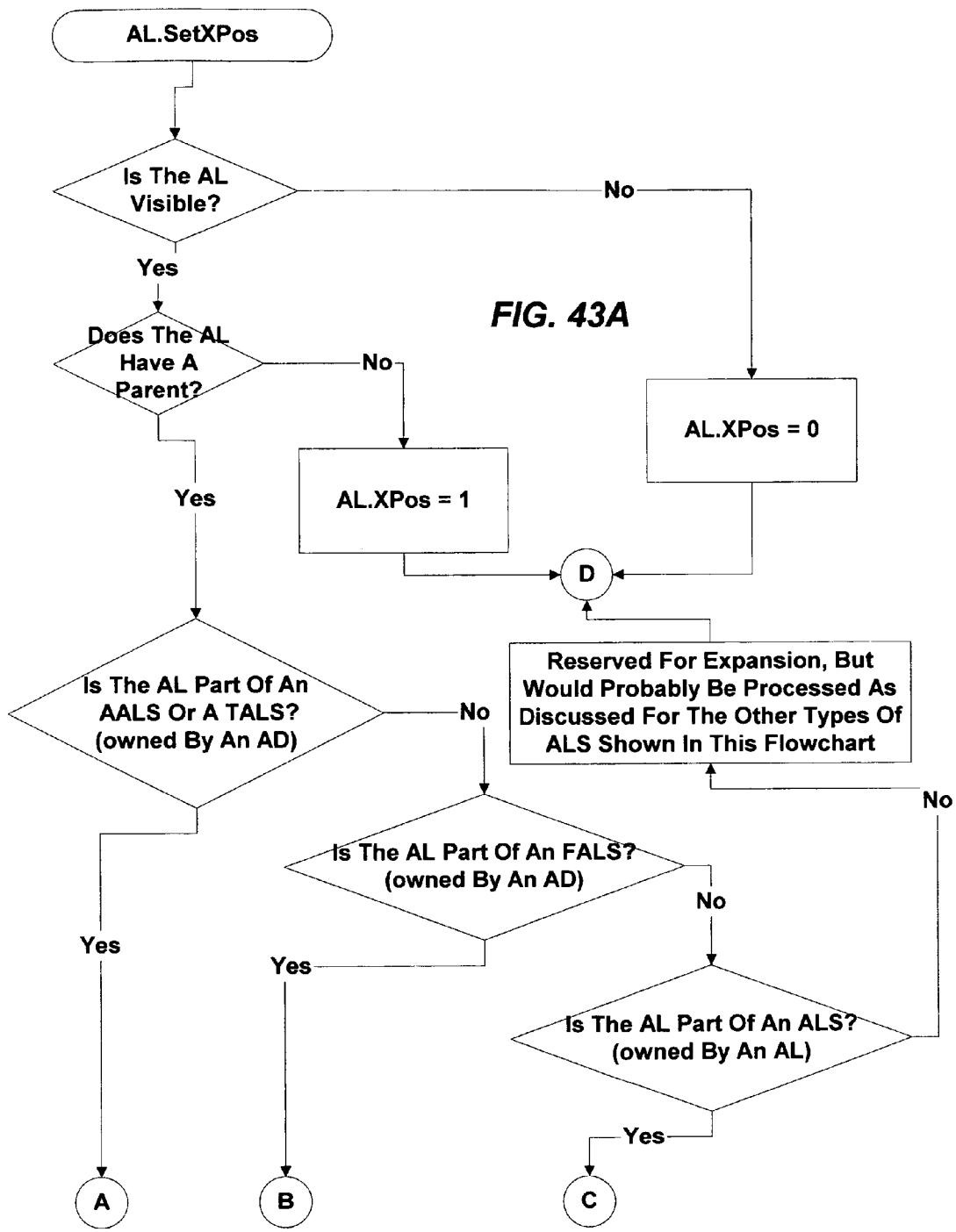
FIGS. 43A–E is a functional flow diagram illustrating a SetXPos method of an ActionList component in accordance with the present invention.
Figure 43B:
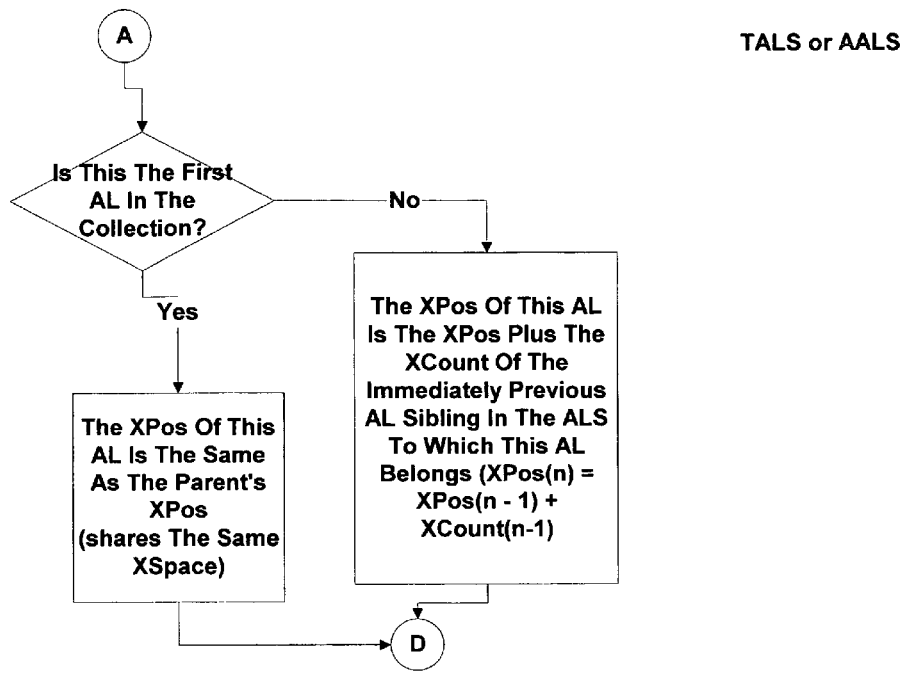
Figure 43C:
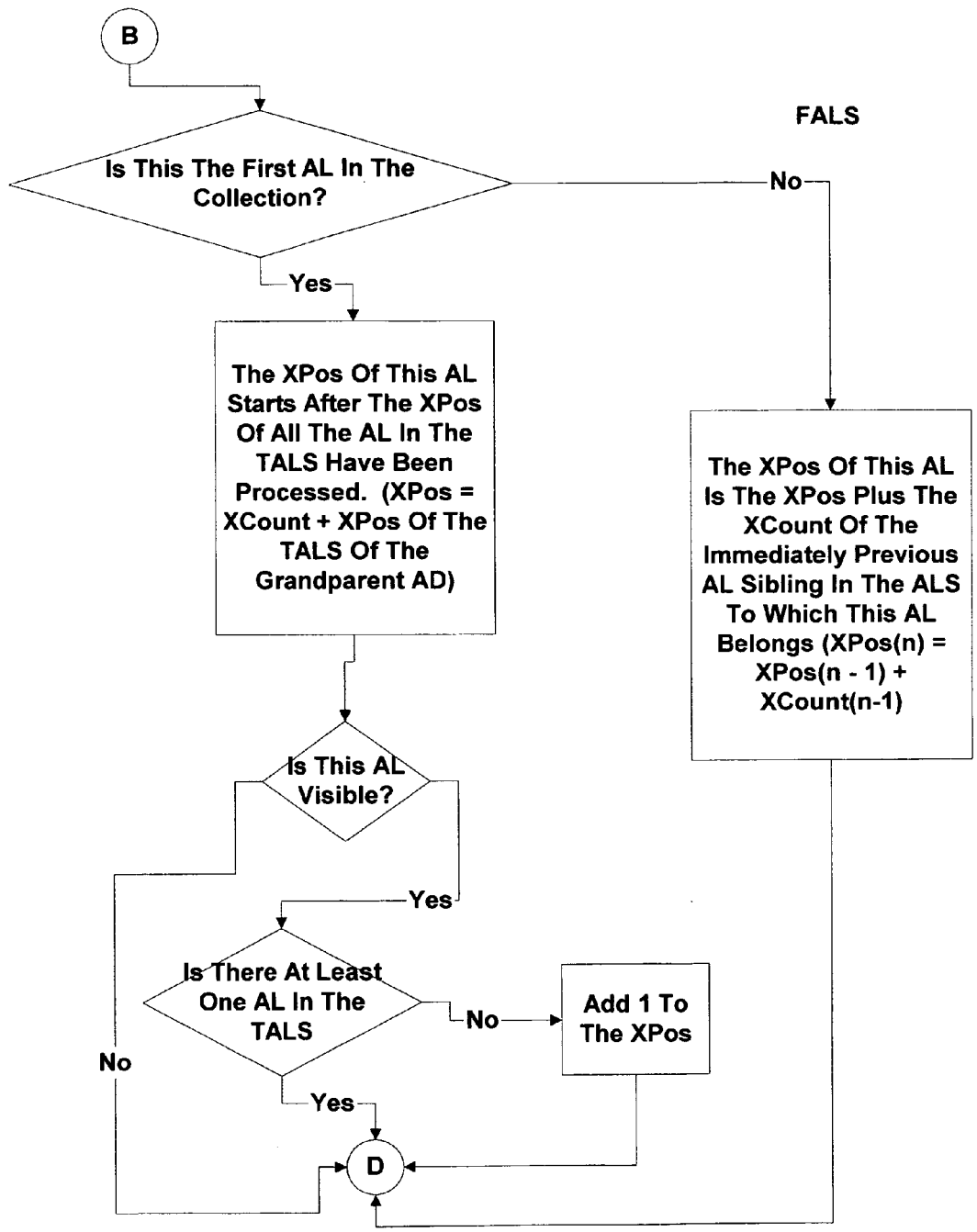
Figure 43D:
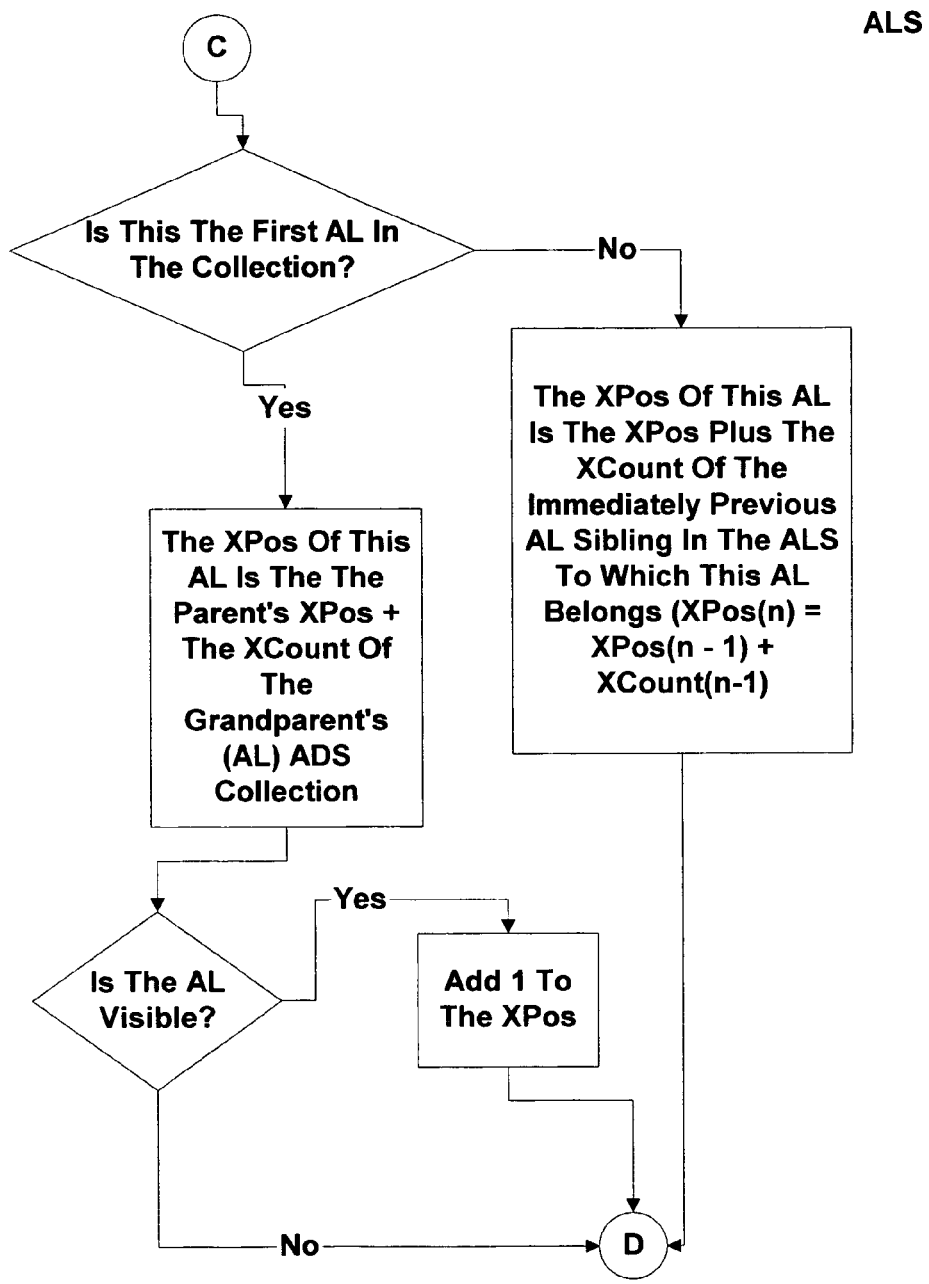
Figure 43E:
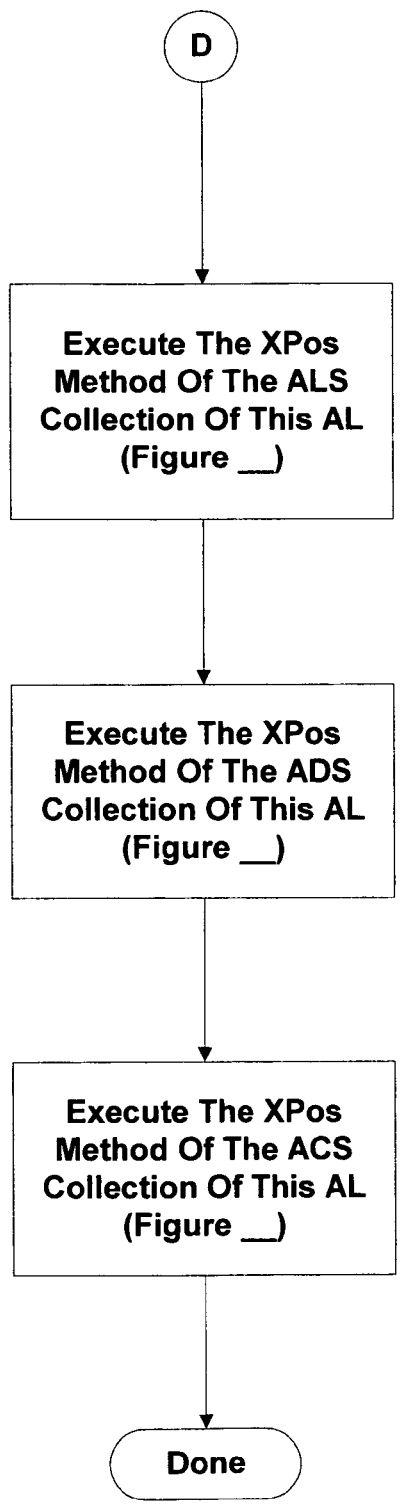
Figure 44:
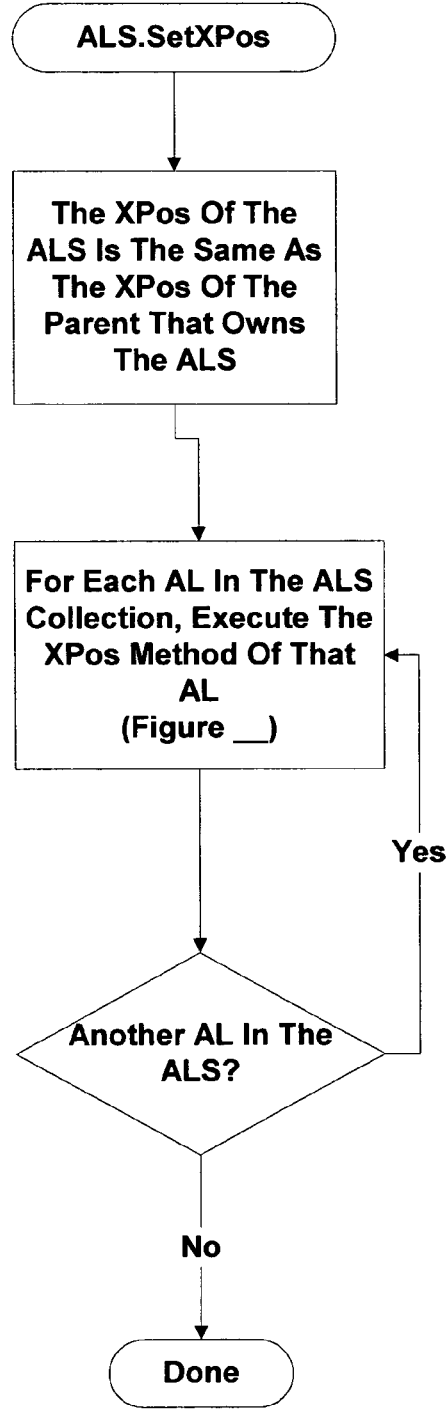
FIG. 44 is a functional flow diagram illustrating a SetX-Pos method of a collection of ActionList components in accordance with the present invention.
Figure 45:
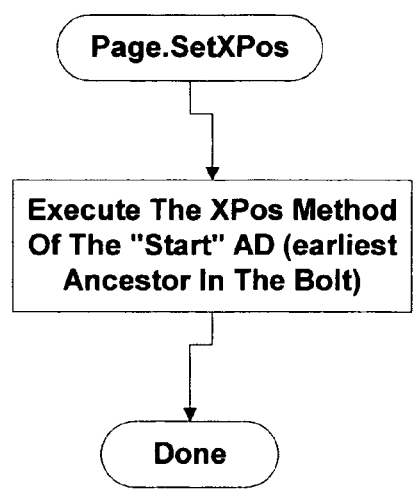
FIG. 45 is a functional flow diagram illustrating a SetX-Pos method of a bolt display page in accordance with the present invention.

A Conditions method 1400 of the AD object 922 is illustrated in FIG. 14. A Condition (CN) 227 (FIG. 2) is a subclass of an AC 944 and is configured using an exemplary conditions user interface shown in FIG. 30B. If an instance of the Condition 227 is configured to process as a logical AND, a decision 1404 sends the process to a loop 1406 that performs 1408 a logical AND of a result property of each CN in the CNS of the AD object 922 (configured in listbox 3076; FIG. 30B) to set a Conditions Result. A decision 1410 determines if there is another CN in the CNS and repeats the loop 1406 if so. If the CN is configured to process the CNS as a logical OR, the process moves from decision 1404 to decision 1414, which sends the process to a loop 1406 that performs 1417 a logical OR of a result property of each CN in the CNS to set a Conditions Result The CN can also be configured to determine a Condition Result in a custom manner. This is determined by a decision 1420 that receives the process from decision 1414. A loop 1421 performs a custom Boolean operation 1422 to produce a Conditions Result. Decision 1424 repeats the loop 1420 if there is another CN in the CNS. Once all the CN's in the CNS have been processed, decisions 1410, 1418 and 1424 send the process to block 1412 where the Conditions Result is returned to the calling process. The process is then done.

Figure 17A:
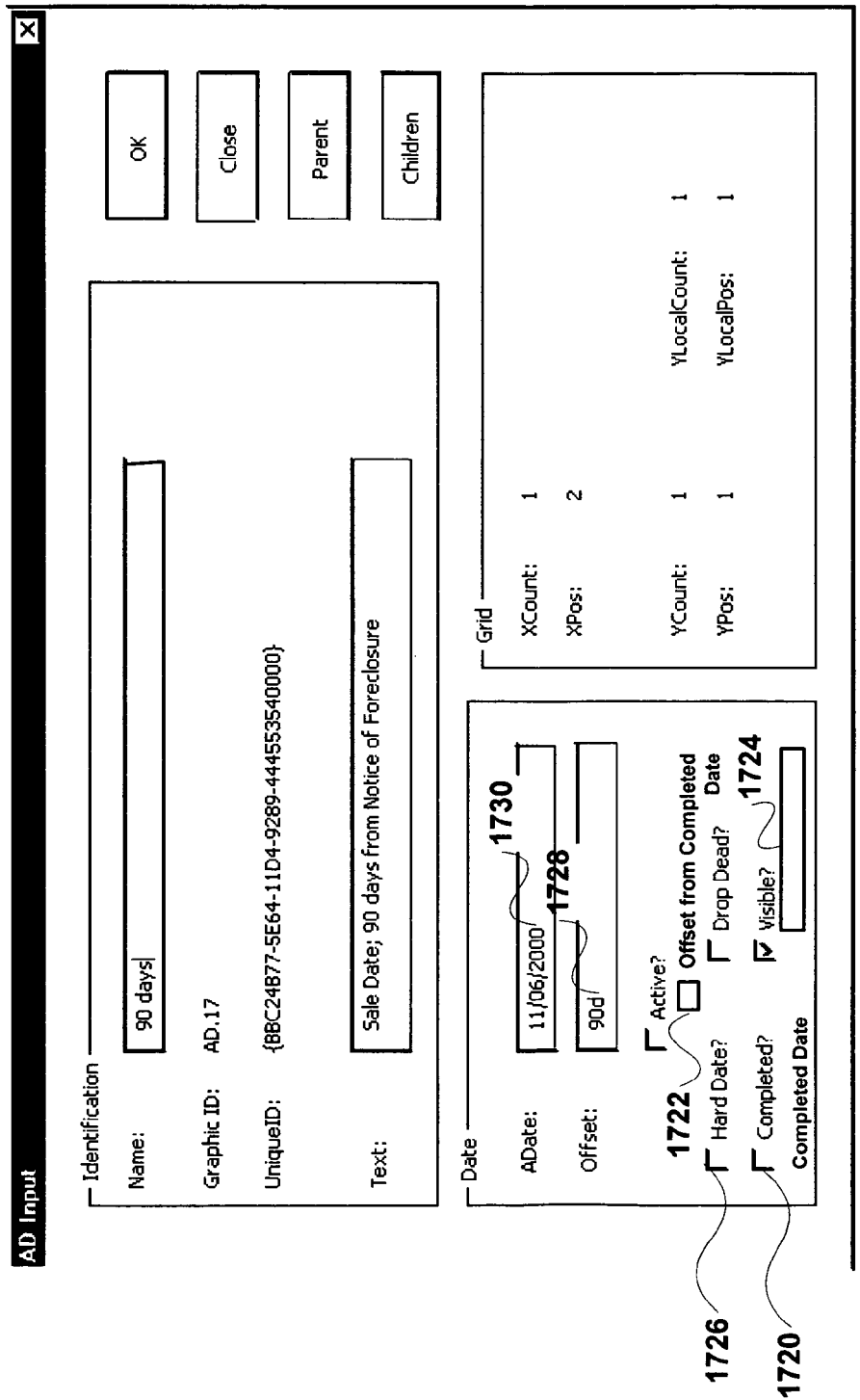
FIG. 17A is a pictorial representation of a user interface for configuring an ActionDate component in accordance with the present invention.

A SetADate method 1500 computes and sets the ADate property of the AD object that owns the method. The method 1500 begins by climbing the parent objects in a bolt 700 to find the closest parent AD object. For example, method 1500 in AD 730 (FIG. 7B) would recursively climb through AL 728 (FIG. 7B), AL 712, AL 704 and discover AD (Start) 702. The ADate property of Start 702 would then be returned and set as a StartDate in a block 1504. Depending on the configuration of the AD that is set in an AD configuration interface (FIGS. 17A–B), the StartDate may be changed from that of the AD parent. If the ADParent Start 702) has been marked completed as indicated by checkbox 1720, a decision 1506 passes control to a decision 1508 that determines if the AD has been configured to calculate its ADate from the completed date of the ADParent (Checkbox 1722 of AD 730's AD configuration interface). If so, the decision 1508 passes the process to a block 1510 where the StartDate is assigned the Completed Date 1724 of the ADParent. If the AD 702 is not completed or the AD 730 is not configured to compute from the completed date, the process is passed to a decision 1512 that determines if the AD 730 has been marked as a hard date (checkbox 1726; FIG. 17A). A hard date indicates that the ADate of 730 can only be changed manually as indicated by block 1512. If not configured as a hard date, the process passes to block 1516 where the offset value from AD 730 is retrieved 1516. The offset value can be any time increment or combination of time increments. For instance, in FIG. 17A, the offset value 1728 is expressed as 90d or "90 days". The offset value 1728 is added (or if a negative value, subtracted) in a block 1518 and set as the new ADate 1730 for this AD 730. Since changing the ADate in an AD 730 potentially changes the ADate of every AD progeny, a block 1520 recursively finds every progeny AD and activates their SetADate method.

Figure 16A:
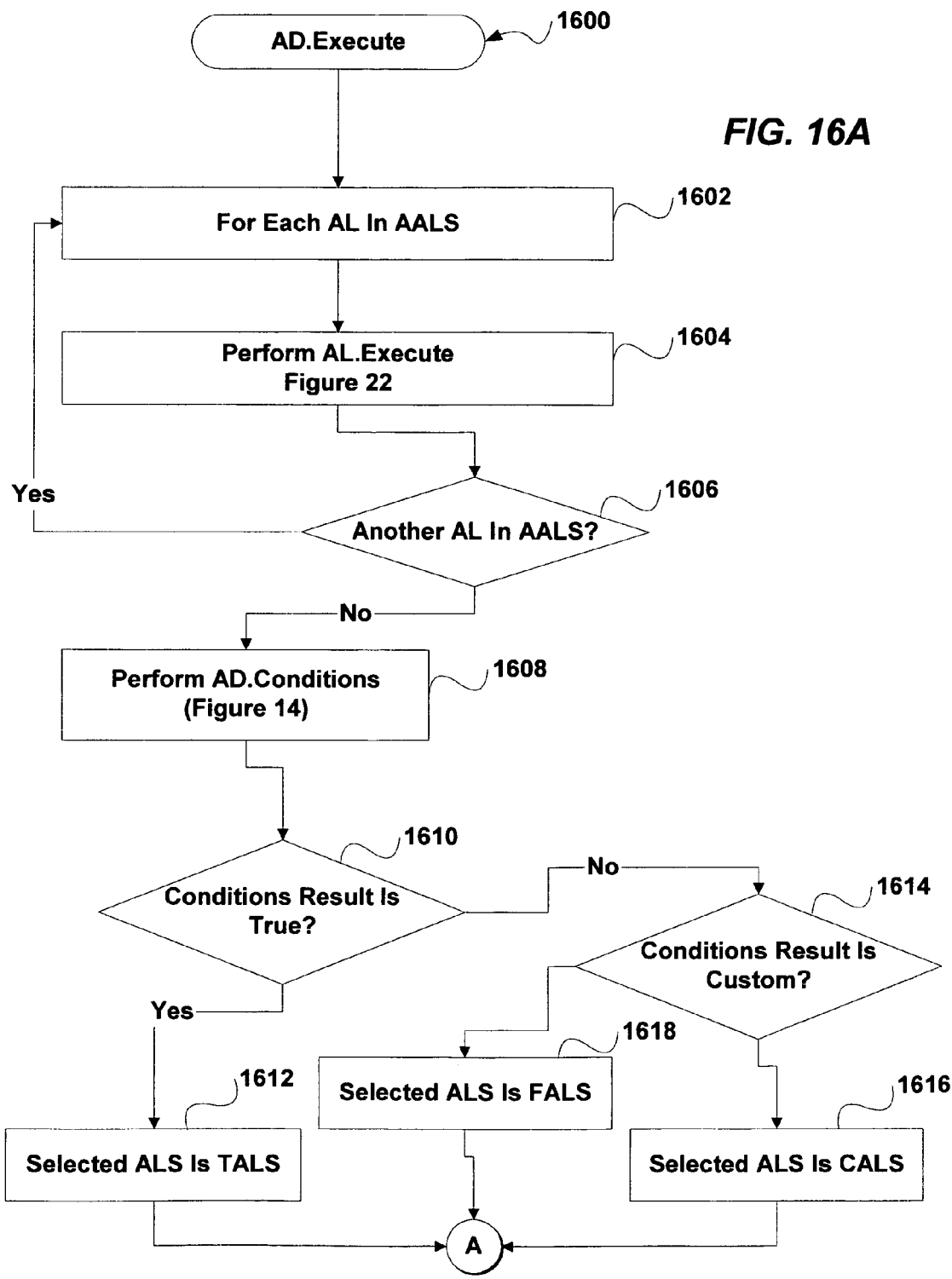
FIGS. 16A–B are a functional flow diagram illustrating an Execute method of the ActionDate component in accordance with the present invention.
Figure 16B:
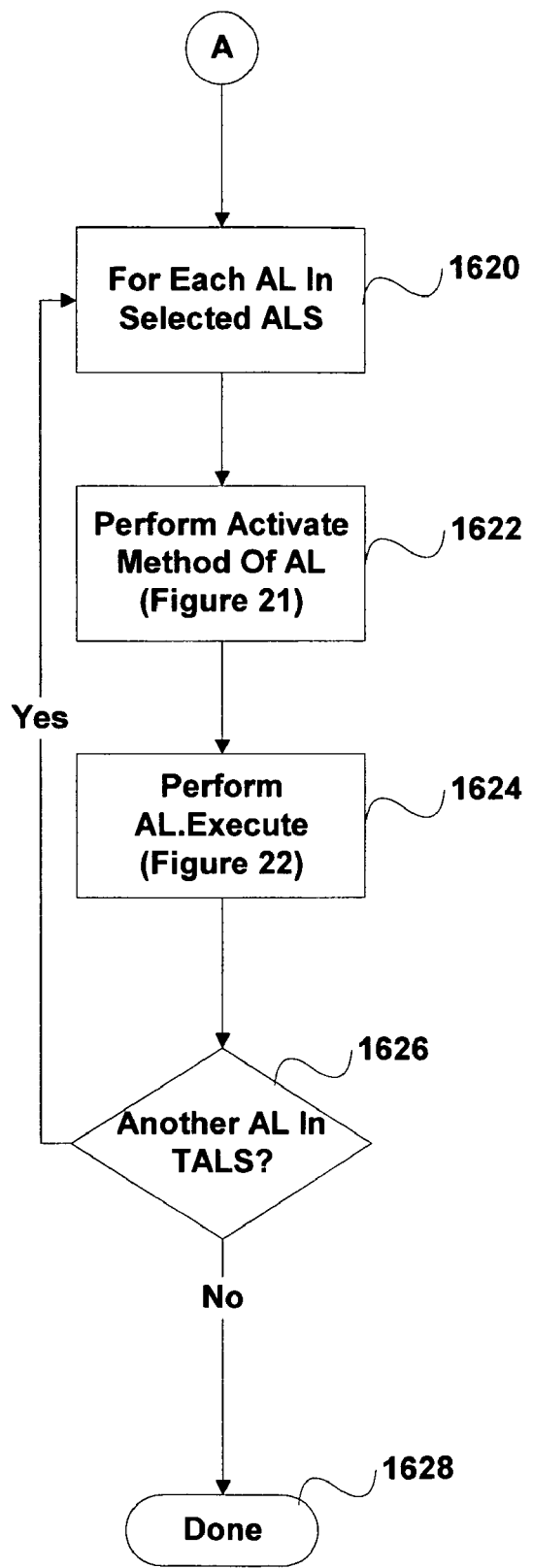

An Execute method 1600 of an AD 922 is illustrated in FIG. 16A. The method 1600 first processes each AL in the AD's 922 AALS 1212 with a loop starting at a block 1602. The Execute method (FIG. 22) of each of these AL's is performed a block 1604. A decision 1606 determines the end of the loop, continuing with block 1602 if not finished and with a block 1608 if finished. In block 1608, the Conditions method (FIG. 14) of the AD 922 is performed and a Conditions Result received from the Conditions Method. If the Conditions Result is True, decision 1610 passes control to a block 1612, where the TALS 1216 is assigned as the Selected ALS. If the Conditions Result is not True, its value is checked for a Custom value in a decision 1614. If a Custom value if found by decision 1614, the CALS 1224 is assigned as the Selected ALS in a block 1616. Otherwise, decision 1614 passes control to a block 1618, where the FALS is assigned as the Selected ALS.

Once the Selected ALS is assigned in blocks 1612, 1616 or 1618, the Selected ALS is processed by a loop beginning with block 1620. The Activate method (FIG. 21 of each of these AL's is perfumed in a block 1622 and then the Execute method (FIG. 22) of each of these AL's is performed a block 1624. A decision 1626 determines the end of the loop, continuing with block 1620 if not finished and ending 1628 if finished.

Figure 17B:
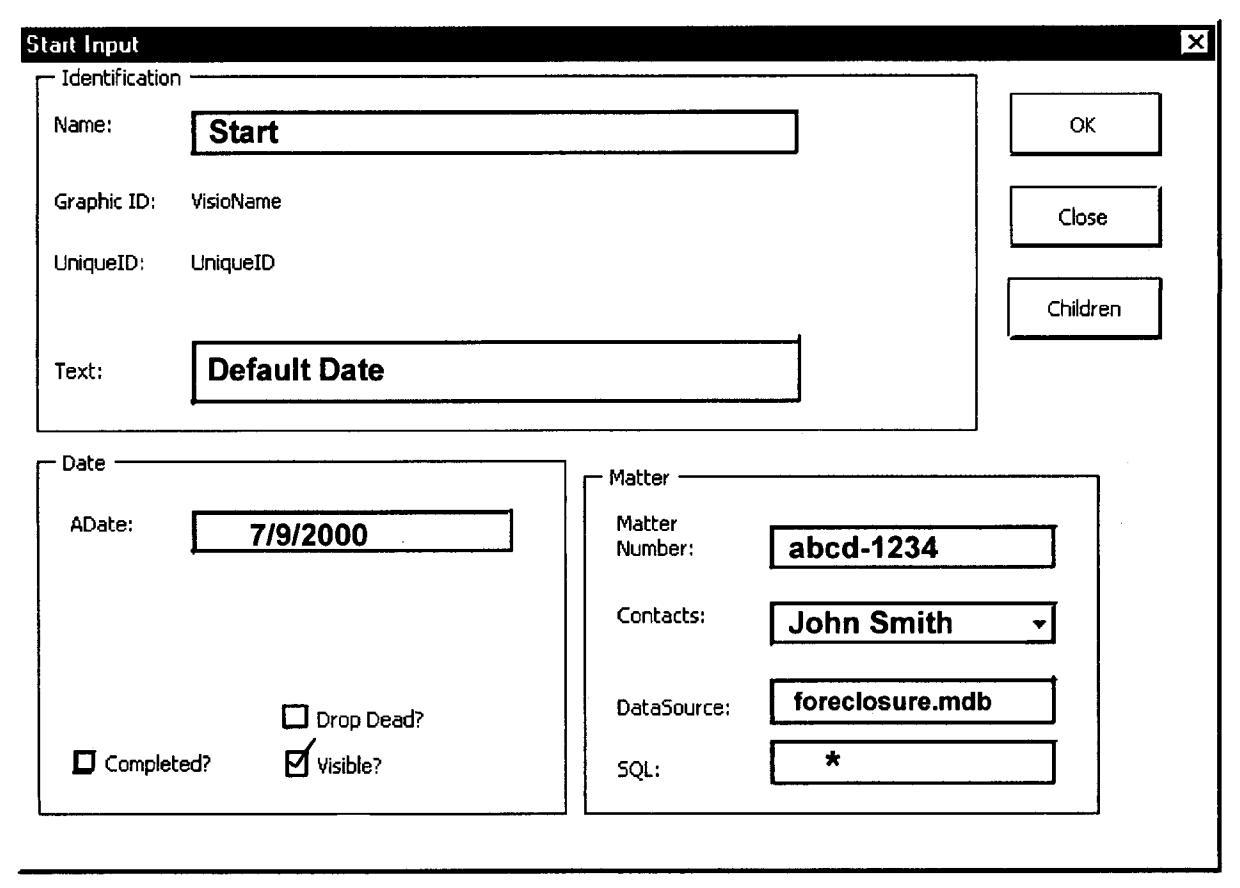

FIGS. 17A and 17B are AD configuration user interfaces, which have been discussed above in the context of how they are used.

ActionList

The graphic AL 220 (FIG. 2) is shown in more detail in FIG. 18. The graphic AL 220 has a connector 1810 that is used to graphically connect the graphic AL 220 and its underlying AL object 1812 to other components. The graphic AL 220 has various regions that are associated with the collection objects of the underlying AL object 1812 (see FIG. 20). ALS region 1818 is associated with the ALS collection object 1820, ADS region 1822 is associated with the ADS collection object 1824 and ACS region 1826 is associated with the ACS collection object 1828. When a connector from another component (e.g. 1010, 1810 or 2410) intersects a region 1818, 1822 or 1826, the underlying object of that other component is added to the collection object associated with that region 1820, 1824 and 1828, respectively.

Figure 19:
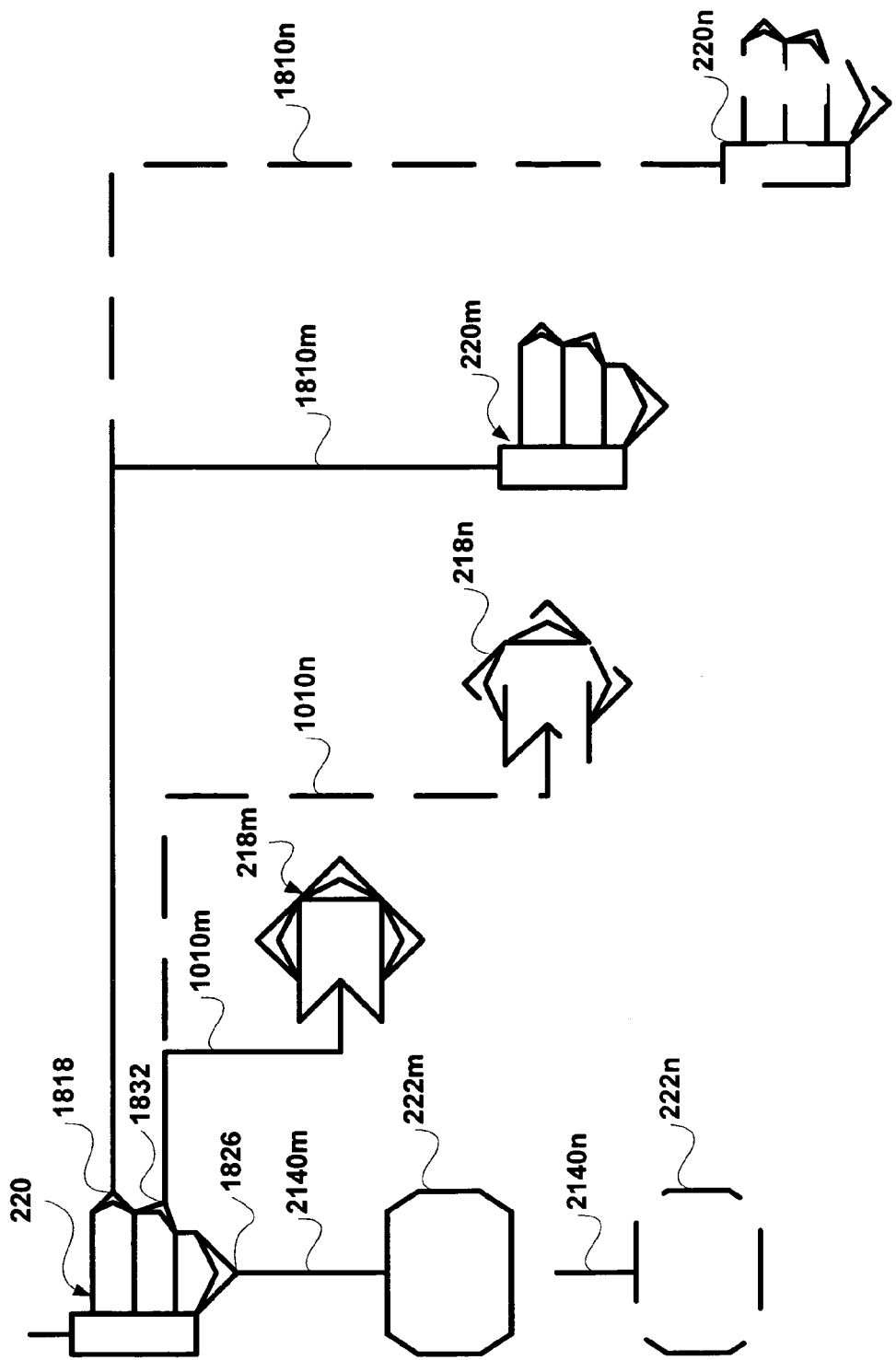
FIG. 19 is a pictorial representation of the graphic connection of components that can be made to an ActionList component in accordance with the present invention.

FIG. 19 illustrates the connection of graphic components to the graphic AL 220. Using connectors (e.g., 2140m and 2140n), zero of more AC graphic components (e.g., 222m and 222n) may be attached to the ACS region 1826 of the graphic AL 220. AC graphic components 222m–n that are attached to the ACS region 1826 sharing the same position along an x-axis as their parent AL 222. Using connectors (e.g., 1010m and 1010n), zero of more AD graphic components (e.g., 218m and 218n) may be attached to the ADS region 1832 of the graphic AL 220. The AD graphic components 218m–n that are attached to the ADS region 1832 are displayed below the graphic AL 220, with the first AD graphic 218 sharing the next position along an x-axis from its parent AL 220 and the next AD graphic 218n moving to the next position along the axis, etc. Zero or more AL graphic components (e.g., 220e and 220f) may be attached using their connectors (e.g., 1810m–n) to the ALS region 1818 of the graphic AL 220 and are displayed below the graphic AD 220, with the first AL graphic 220m occupying the next position along the x-axis that follows the last AD graphic 218n. If the ALS is connected to the AALS region 1018 of a parent AD 218, then the x positions remain as described above, but all of the objects are invented. This is illustrated in FIG. 31, which also illustrates that all graphic component are displayed after the previous component and its progeny have "played out".

An object model 2000 for the AL object 932 is illustrated in FIG. 20. An ActionLists collection object 2010 is a child of the AL object 932. The ALS object 2010 (also 930, 933) has zero or more AL object 2020 (also 932, 934). An ActionDates collection object 2022 is a child of the AL object 932. The ADS object 2024 (also 938) has zero or more AD objects 2024 (also 922, 938). An Actions collection object 2026 is a child of the AL object 932. The ACS object 2024 (also 942) has zero or more AC objects 2028 (also 944).

Figure 21:
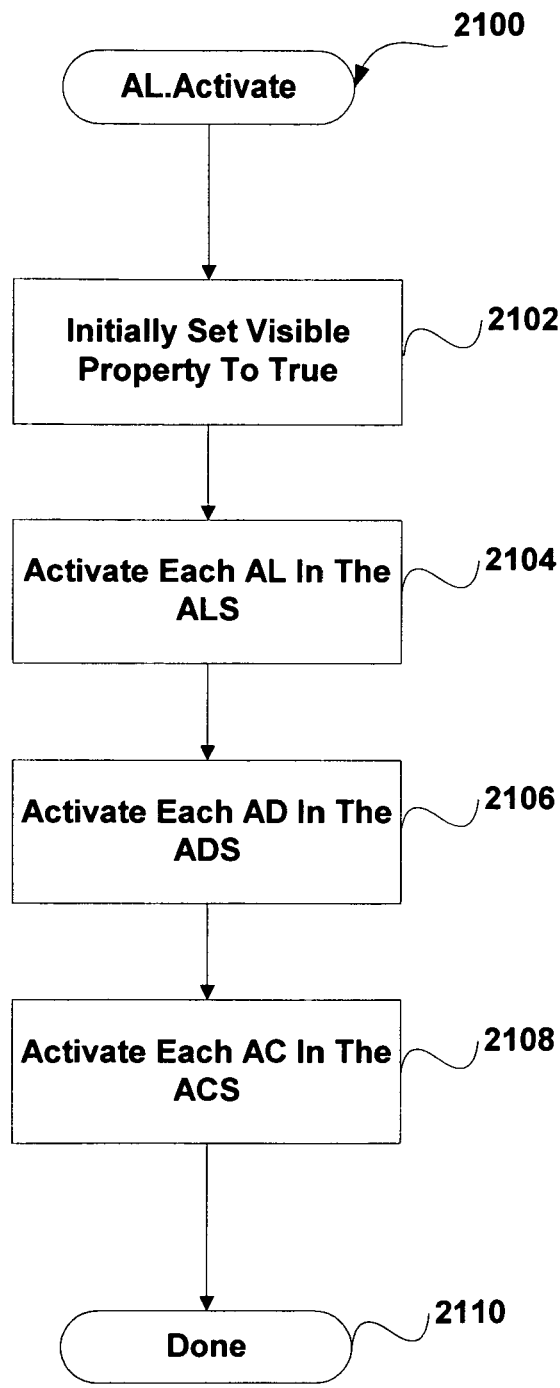
FIG. 21 is a functional flow diagram illustrating an Activate method of the ActionList component in accordance with the present invention.

An Activate method 2100 for the AL object 934 is illustrated in FIG. 21. In a block 2102, the AL is initially set to be visible. Each AL in the ALS of the AL is recursively activated by performing method 2100 in a block 2104. Similarly, each AD in the ADS of the AL is activated (FIG. 13) in a block 2106 and then each AC in the ACS of the AL is activated (FIG. 28) in a block 2108. The process 2100 is then done 2110.

An Execute method 220 for the AL object 934 is illustrated in FIG. 22. In a block the method 2200 is recursively performed in each AL 2020 in the ALS 2010. The Execute method (FIG. 29) of each AC 2028 in the ACS 2026 is then performed in a block 2204 and the method ends 2206.

Action

Figure 24:
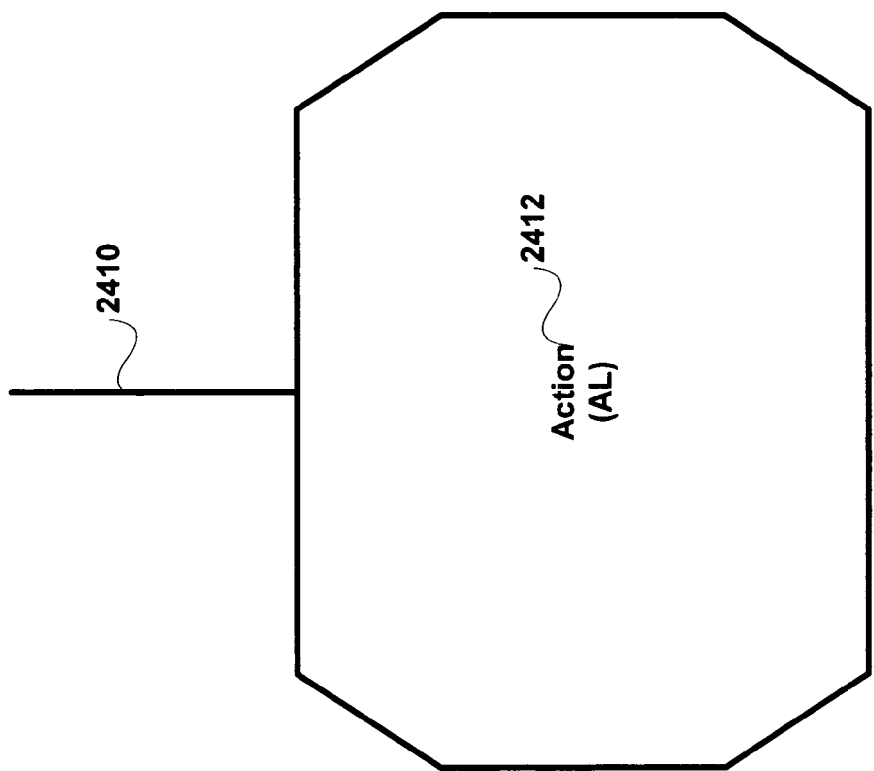
FIG. 24 is a pictorial representation of an Action component shown as a graphic in accordance with the present invention.

The graphic AC 222 (FIG. 2) is shown in more detail in FIG. 24. The graphic AC 222 has a connector 2410 that is used to graphically connect the graphic AC 222 and its underlying AC object 2412 to other components.

FIG. 25 illustrates the connection of graphic components to the graphic AC 222. Zero or more graphic AC's 222$y$–$z$ may be connected using connector 2410$y$–$z$ to AC 222 or each other. In an embodiment of the invention, the connector 2410$y$–$z$ is transferred to the ACS collection of the parent object of the AC connected to the parent.

Figure 26:
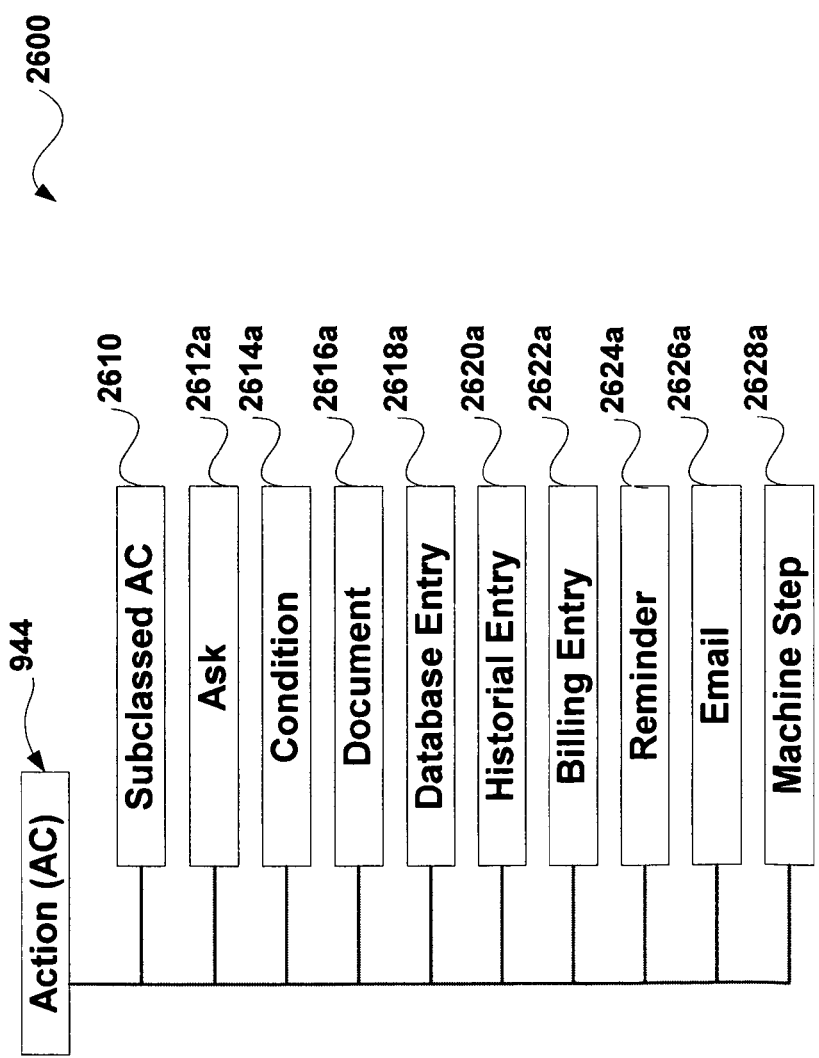
FIG. 26 is a pictorial representation of an object model for an Action component in accordance with the present invention.

FIG. 26 illustrates an object model for the AC object 944. The AC object 944 is intended to be sub-classed 2610 and its properties and methods adapted for performing specific tasks. For example, sub-classed AC objects might include an Ask AC 2612$a$, Condition AC 2614$a$, Document AC 2616$a$, Database Entry AC 2618$a$, Historical Entry AC 2620$a$, Billing Entry AC 2622$a$, Reminder AC 2624$a$, Email AC 2626$a$, or Machine Step AC 2628$a$. Corresponding graphical components based on these subclassed AC's are shown in FIG. 27: an Ask AC 2612$b$, Condition AC 2614$b$, Document AC 2616$b$, Database Entry AC 2618$b$, Historical Entry AC 2620$b$, Billing Entry AC 2622$b$, Reminder AC 2624$b$, Email AC 2626$b$, or Machine Step AC 2628$b$.

A Configure method of AC object 944 is illustrated in FIG. 27A. As with all methods for the AC object, sub-classes of the object may supercede the methods as needed for the specific task accomplished by the AC. While general examples are given below, those skilled in the art will recognize that there are many methods possible that are within the spirit and scope of the invention. The Configure method begins by climbing in a block 2702 the bolt 700 to gather all available data properties and references to database fields in ancestor objects that might be useful in configuring the AC. An AC configuration interface is displayed (e.g., FIG. 30A). If the AC is a condition, a decision 2706 directs the method to open a condition configuration user interface (e.g., FIG. 30B).

If the AC is not a condition, the decision 2706 sends the process to a block 2710, which opens a server application for the creation of a template document. For instance, the server program could be a word processor, an email editor, a database program, a timekeeping program, etc. A template document is configured in a block 2712 using the data fields and properties gathered in block 2702. For instance, the data fields could be inserted in a text document to be filled using a mail merge function provided by the word processing application. The template document is then associated with the instance of the AC in a step 2714. If desired, the AC with the template associated can be stored in the store 216 and used as described above with reference to constructing a bolt.

Figure 28:
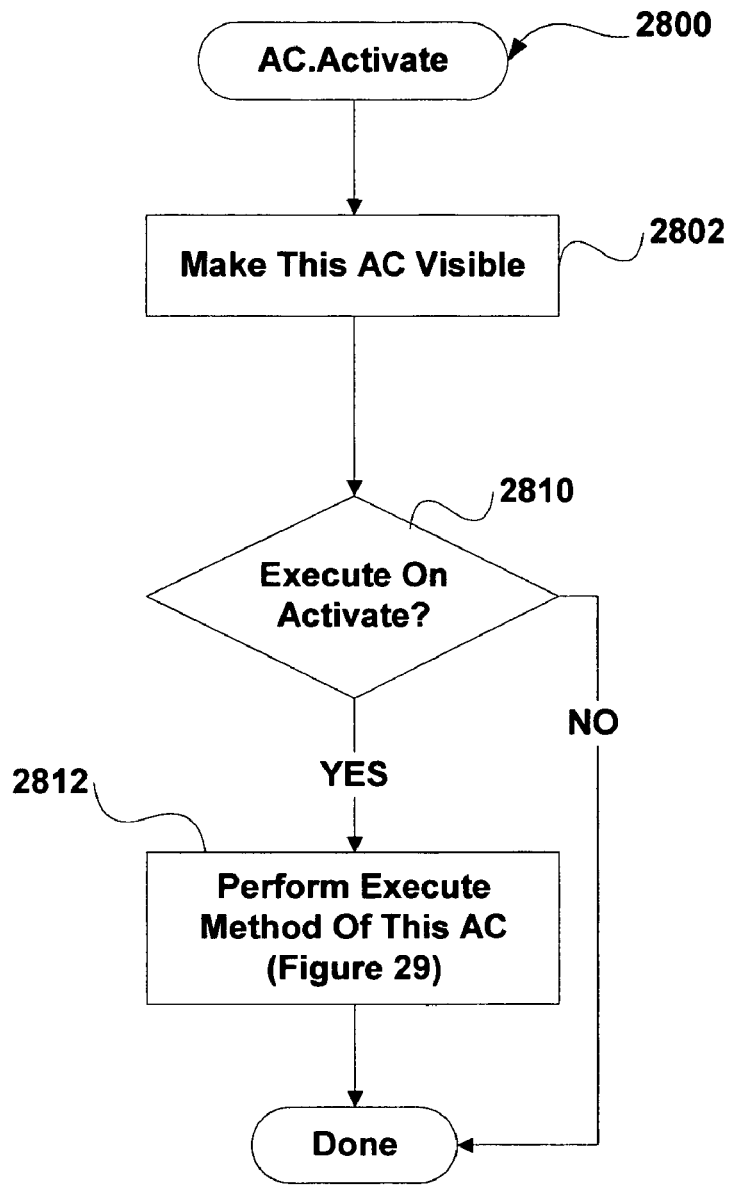
FIG. 28 is a functional flow diagram illustrating an exemplary Activate methods of Action components in accordance with the present invention.

An Activate method 2800 for the AC object 944 is illustrated in FIG. 28. The AC object 944 is made visible in a block 2802. The AC may be configured to execute immediately upon its execution by selecting checkbox 3010 (FIG. 30). If checkbox 3010 is selected, a decision 2810 passes the program execution to a block 2812 that calls the Execute method (FIG. 29) of AC object 944. Following block 2812 or if decision 2810 determines that the AC should not be executed on activation, the method 2800 ends.

Figure 29:
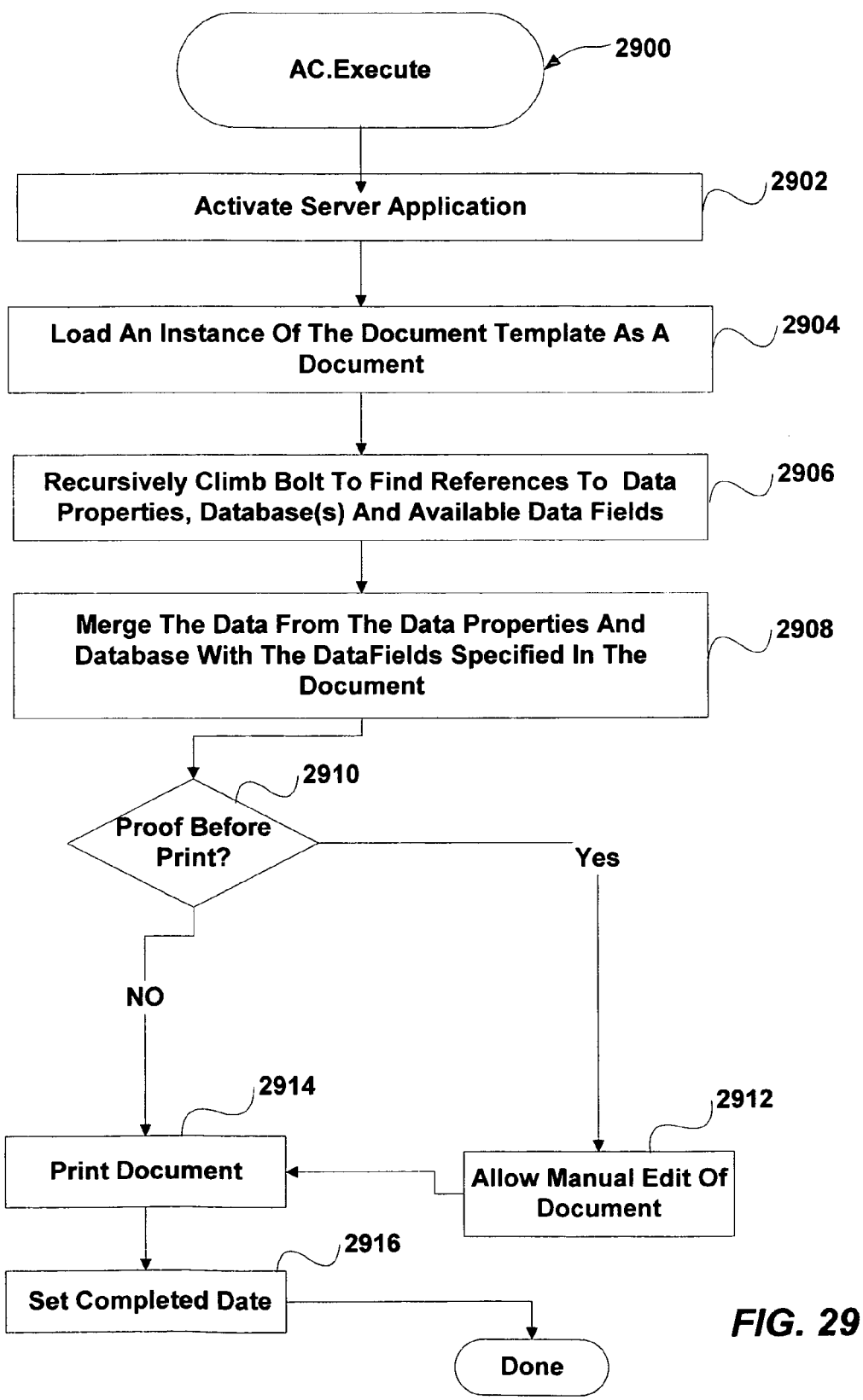
FIG. 29 is a functional flow diagram illustrating an exemplary Execute methods of the Action components in accordance with the present invention.

An Execute method 2900 for the AC 944 is illustrated in FIG. 29. The server application used in the Configure method (FIG. 27) is activated in a step 2902. In a block 2904, an instance of the document template is loaded into the server application and become a working document. The method 2900 then climbs the bolt for the information to merge into the working document according the data properties and fields discovered during the Configure method (FIG. 27). The information associated with these data properties and fields is then merged into the document in a block 2908. The method 2900 may provide that the document be proofed before printed as detected by decision 2910, in which case manual editing to the document is allowed in block 2912. Following decision 2910 or block 2912 the document is automatically printed. The AC 944 is marked as completed and the completed date set for the AC in a block 2916. The method 2900 then ends.

Bolt Display

The display pattern 3100 for presenting a bolt in the bolt view 210 (FIG. 2) is shown in FIG. 31. The methods for positioning the AD, AL and AC components in the display pattern are shown in FIGS. 32–45, discussed below. In overview, the bolt 3102 is comprised of a single Start component 3104 and zero or more AD 3106, AL 3108 and AC 3110 components. Each component 3104, 3106, 3108 and 3110 has a single parent and zero or more children (a "one to many" relationship). In the design mode, the Start component is the root (first) component of the bolt 3102. The Start component 3104 owns every other component in the bolt either directly as a child or indirectly as a child of one of its children. Similarly, each component that is a parent owns every component that follows it in the bolt 3102. When the components 3104, 3106, 3108 and 3110 are connected by connectors 3112, the bolt appears much like a lightning bolt with a single origin and a plurality of branches. The methods of the invention make heavy use of recursion, which is enabled by the "one to many" design of the bolt to determine and/or set, among other things, the relative positions of the components to each other, the offset of dates from each other (Offset method, above) and the database information that applies to a particular instance of the bolt (Execute methods, above).

In the display pattern 3100, the bolt 3102 is graphed within a grid 3114 having a first degree of freedom (referred to herein as the x-axis) representing the progression of the bolt 3102 and a second degree of freedom (referred to herein as the y-axis) representing time.

The grid 3114 is divided into DateSpaces 3116. A DateSpace 3118 defines a region within grid 3114 associated with a date (or more granular time like a millisecond) during which an Action that is graphed within that region will automatically execute when active and not previously completed. Each DateSpace 3118 is bounded by DateLines 3120 that indicate the ADate associated with the DateSpace 3118. As shown in FIG. 31, DateSpaces are graphed from the earliest ADate to latest ADate starting at an origin 3120 located at the top left hand margin of the page and descending along the y-axis of the grid 3114.

As shown in block 3122, each AD is graphed together with all the AL components and the AC components connected to those AL components within a DateSpace 3118 that corresponds with the ADate associated with the AD. Multiple AD's (e.g., 3124 and 3126) can share the same DateSpace. Graphing the AD's and their associated AL's and AC's within the same DateSpace has the beneficial effect of visually grouping all actions that are to execute on the same ADate.

The visual grouping of the components in the corresponding DateSpace while minimizing the intersection of the connectors that create and indicate the relationships between the components is made possible by the positioning of the components relative to each other.

FIGS. 32–45 illustrate the methods by which the components discover each over, set their relative positions and graph themselves on a page.

The invention claimed is:

1. A computer system including a processor for automating a sequence of tasks, comprising:
   object model components, including:
      an action date component having an associated date property that specifies a point in time;
      an action component having an associated task method;
      an instance of the action date component referred to herein as a parent action date component;
      another instance of the action date component referred to herein as a child action date component;
      means for associating the child action date component with the parent action date component;
      means for setting the point in time specified in the date property of the child action date component by offsetting from the point in time specified in the date property of the parent action date component by an offset value associated with the child action date component;
      means for associating an instance of the action component with at least one instance of the action date component;
      means for executing the task method associated with the instance of the action component based on the point in time specified in the date property of the instance of the action date component to which the instance of the action component is associated; and
      wherein the association of a component with another component includes making the component aware of the other component such that the component can access certain of the properties, methods or events associated with the other component.

2. The system of claim 1, wherein the object model components include an action list component, the system further comprising:
   means for associating an instance of the action list component with at least one of the instances of the action date component;
   means for associating each instance of the action component with at least one instance of the action list component, thereby associating each instance of the action component with the instance of the action date component with which the instance of the action list is associated; and
   means for executing the task method associated with the instance of the action component based on the point in time specified in the date property of the instance of the action date with which the instance of the action list component is associated.

3. The system of claim 2, further comprising:
   means for associating the child action date component with the instance of the action list component, thereby associating the child action date component with the parent action date component with which the instance of the action list is associated.

4. The system of claim 3, further comprising means for associating an instance of the action list component with another instance of the action list component, thereby associating instances of the object model components that are associated with the action list component with the other instance of the action list component.

5. The system of claim 4, wherein there are a plurality of action list components associated with a parent component, the system further comprising:
   means for grouping the action list components associated with the parent component according to context; and
   means for executing the action list components associated with the parent component based on an occurrence of the associated context.

6. The system of claim 1, further comprising:
   a visual programming interface component;
   means for generating an instance of the object model component via the visual programming interface component; and
   means for assembling a bolt that graphically represents the automated task list by associating each instance of an object model component with another instance of an object model component by way of the visual programming interface component.

7. The system of claim 6, wherein the means for generating an instance of the object model component generates:
   a graphic representation of each instance of the action date component;
   a graphic representation of each instance of the action component; and
   wherein each graphic representation of the instance of the action component is associated with at least one graphic representation of the action date component by way of the visual programming interface component, thereby associating instances of the object model components in the same manner as their graphic representations.

8. The system of claim 6, wherein the means for generating an instance of the object model component generates:
   a graphic representation of each instance of the action date component;
   a graphic representation of each instance of the action list component;
   a graphic representation of each instance of the action component; and
   wherein each graphic representation of the instance of the action component is associated with at least one graphic representation of the action list component and each graphic representation of the instance of the action list component is associated with at least one of the graphic representation of the action date component or action list component by way of the visual programming interface component, thereby associating instances of the object model components in the same manner as their graphic representations.

9. A method for programming automated task lists to be performed by a computer system, comprising:
   providing an object model, including an action date object and an action object;
      the action date object having an associated date property that specifies a point in time;
      the action object having an associated task method;
   associating an instance of the action object with an instance of the action date object, wherein the association of a component with another component includes making the component aware of the other component such that the component can access certain of the properties, methods or events associated with the other component;
   configuring the action object to perform a specific task method;

providing a graphical user interface having:
  a graphic representation of the action date object; and
  a graphic representation of the action object;
generating an instance of the action date object when the graphic representation of the action date object is selected, the instance of the action date object having a corresponding graphic representation of the instance of the action date object displayed in the graphical user interface;
generating an instance of the action object when the graphic representation of the action object is selected, the instance of the action object having a corresponding graphic representation of the instance of the action object displayed in the graphical user interface;
assembling a bolt that graphically represents the automated task list by associating the graphic representation of the instance of the action object with the graphic representation of the instance of the action date object by way of the graphical user interface; and
storing information pertaining to associated instances of the object model objects as an automated task list.

10. The method of claim 9, wherein the bolt is displayed in the graphical user interface as a checklist.

11. A method for programming automated task lists to be performed by a computer system, comprising:
providing an object model, including an action date object, an action list object and an action object;
  the action date object having an associated date property that specifies a point in time;
  the action object having an associated task method;
associating an instance of the action list object with the instance of the action date object;
associating an instance of the action object with the instance of the action list object, thereby associating the instance of the action object with the instance of the action date object through the action list object;
configuring the action object to perform a specific task method;
storing information pertaining to associated instances of the object model objects as an automated task list; and
wherein the association of a component with another component includes making the component aware of the other component such that the component can access certain of the properties, methods or events associated with the other component.

12. The method of claim 11, further comprising:
providing a graphical user interface having:
  a graphic representation of the action date object;
  a graphic representation of the action list object;
  a graphic representation of the action object; and
generating an instance of the action date object when the graphic representation of the action date object is selected, the instance of the action date object having a corresponding graphic representation of the instance of the action date object displayed in the graphical user interface;
generating an instance of the action list object when the graphic representation of the action list object is selected, the instance of the action list object having a corresponding graphic representation of the instance of the action list object displayed in the graphical user interface;
generating an instance of the action object when the graphic representation of the action object is selected, the instance of the action object having a corresponding graphic representation of the instance of the action object displayed in the graphical user interface; and
assembling a bolt that graphically represents the automated task list by associating the graphic representation of the instance of the action object with the graphic representation of the instance of the action list object and by associating the graphic representation of the instance of the action list object with the graphic representation of the instance of the action date object by way of the graphical user interface.

13. The method of claim 12, wherein the bolt is displayed in the graphical user interface as a checklist.

14. The method of claim 12, further comprising:
grouping the action list objects associated with the action date object according to context, wherein the graphic representation of the action date object includes a region associated with each context; and
associating the graphic representation of the instance of the action list object with a context by attaching the instance of the action list object with the region associated with the context by way of the graphical user interface.

15. The method of claim 12, further comprising:
storing the automated task list as a constituent automated task list; and
assembling a parent automated task list from at least one constituent automated task list by associating that constituent automated task list with the parent automated task list.

16. The method of claim 15, further comprising:
providing a graphic representation in the graphical user interface of the constituent automated task list as a constituent bolt;
generating an instance of the constituent bolt when the graphic representation of the constituent bolt is selected, the instance of the constituent bolt having a corresponding graphic representation of the instance of the constituent bolt displayed in the graphical user interface; and
assembling a parent bolt that graphically represents the parent automated task list by graphically associating the graphic representation of the instance of the constituent bolt with the graphic representation of the parent bolt.

17. A method for performing an automated task list with a computer, comprising:
providing an automated task list, including:
  a parent action date component having an associated parent date property;
  a child action date component having an associated child date property;
  the child action date component associated with the parent action date component;
an action component associated with an action date component in a bolt, the action component performing a pre-configured task method when executed;
setting the date property of action date components in the bolt by iterating the bolt from parent action date component to child action date component and adding an offset value associated with the child action date to the value of the date property associated with the parent action date, wherein the offset value is either a positive or negative unit of time;
leaving the value of date property as previously set if the date property is marked as a bard date; and
executing each action component associated with the action date component based on the point in time specified in the date property of the action date component.

18. The method of claim 17, wherein the bolt further includes an action list component associated with an action date component and the action list component has at least one associated action component, the method further comprising executing each action component associated with the action list component when the action date component executes the action list component.

19. The method of claim 18, wherein the action date component selectively executes an associated action list component based on an analysis of pre-configured conditions.

20. The method of claim 18, further comprising a graphical user interface that displays the automated task list as a graphical representation of the bolt.

21. The method of claim 18, further comprising a graphical user interface that displays the automated task list as a checklist.

* * * * *